US012372741B2

(12) United States Patent
Ohtake et al.

(10) Patent No.: US 12,372,741 B2
(45) Date of Patent: Jul. 29, 2025

(54) OPTICAL SYSTEM, OPTICAL APPARATUS, AND METHOD FOR MANUFACTURING OPTICAL SYSTEM

(71) Applicant: Nikon Corporation, Tokyo (JP)

(72) Inventors: Fumiaki Ohtake, Tokyo (JP); Satoshi Miwa, Tokyo (JP); Atsuki Ito, Tokyo (JP)

(73) Assignee: Nikon Corporation, Tokyo (JP)

( * ) Notice: Subject to any disclaimer, the term of this patent is extended or adjusted under 35 U.S.C. 154(b) by 272 days.

(21) Appl. No.: 17/917,933

(22) PCT Filed: Mar. 4, 2021

(86) PCT No.: PCT/JP2021/008532
§ 371 (c)(1),
(2) Date: Oct. 9, 2022

(87) PCT Pub. No.: WO2021/220612
PCT Pub. Date: Nov. 4, 2021

(65) Prior Publication Data
US 2023/0152556 A1    May 18, 2023

(30) Foreign Application Priority Data

Apr. 27, 2020 (JP) ................................ 2020-078582
Apr. 27, 2020 (JP) ................................ 2020-078609

(51) Int. Cl.
*G02B 13/00* (2006.01)
*G02B 9/14* (2006.01)

(52) U.S. Cl.
CPC ............. *G02B 9/14* (2013.01); *G02B 13/005* (2013.01)

(58) Field of Classification Search
CPC .......... G02B 9/14; G02B 13/005; G02B 7/08; G02B 9/64; G02B 13/02
See application file for complete search history.

(56) References Cited

U.S. PATENT DOCUMENTS

2011/0122510 A1* 5/2011 Uchida .............. G02B 13/0035
                                                     359/716
2013/0100337 A1    4/2013 Eguchi
(Continued)

FOREIGN PATENT DOCUMENTS

CN        109425973 A    3/2019
JP        2013-092575 A   5/2013
(Continued)

OTHER PUBLICATIONS

"Lens Design Optimization" Yabe, Akira, SPIE, 2018, pp. 41-42 (Year: 2018).*
(Continued)

*Primary Examiner* — Balram T Parbadia
*Assistant Examiner* — John Curtis Sipes
(74) *Attorney, Agent, or Firm* — Potomac Law Group, PLLC

(57) ABSTRACT

An optical system used in an optical apparatus is configured to include a first lens group having positive refractive power, a focusing group that moves along an optical axis at focusing, and a rear group, in order from an object side, so that the first lens group includes a first-A lens group disposed on the object side of the largest air space A in the first lens group, and that all of the following conditional expressions are satisfied:

1.00<FNo×(TL/f)²<2.50 and 0.30<dA/dG1<0.85 where FNo is the f-number of the optical system focusing on infinity, TL is the total optical length of the optical system focusing on infinity, f is the focal length of the optical system focusing on infinity, dA is the length on the optical axis of the air space A, and dG1 is the length on the optical axis of the first lens group.

24 Claims, 36 Drawing Sheets

(56) References Cited

U.S. PATENT DOCUMENTS

| | | | |
|---|---|---|---|
| 2014/0307338 A1* | 10/2014 | Kawamura | G02B 9/60 359/754 |
| 2015/0130985 A1 | 5/2015 | Kawamura et al. | |
| 2016/0109690 A1 | 4/2016 | Ogata et al. | |
| 2017/0199358 A1 | 7/2017 | Kawamura | |
| 2017/0351089 A1 | 12/2017 | Gyoda et al. | |
| 2019/0064478 A1 | 2/2019 | Shimada | |
| 2023/0146383 A1* | 5/2023 | Lee | G02B 9/12 359/716 |

FOREIGN PATENT DOCUMENTS

| | | |
|---|---|---|
| JP | 2015-111254 A | 6/2015 |
| JP | 2016-148707 A | 8/2016 |
| JP | 2016-200685 A | 12/2016 |
| JP | 2017-125927 A | 7/2017 |
| JP | 2017-215492 A | 12/2017 |
| JP | 2019-056757 A | 4/2019 |

OTHER PUBLICATIONS

Office Action issued Oct. 3, 2023, in Japanese Patent Application No. 2022-517522.

International Search Report from International Patent Application No. PCT/JP2021/008532, May 25, 2021.

Office Action issued Jul. 4, 2023, in Japanese Patent Application No. 2022-517522.

Office Action issued Mar. 4, 2025, in Japanese Patent Application No. 2024-032389.

Office Action issued Apr. 1, 2025, in Chinese Patent Application No. 202180029750.X.

Decision of Refusal issued May 20, 2025, in Japanese Patent Application No. 2024-032389.

Decision of Dismissal issued May 20, 2025, in Japanese Patent Application No. 2024-032389.

* cited by examiner

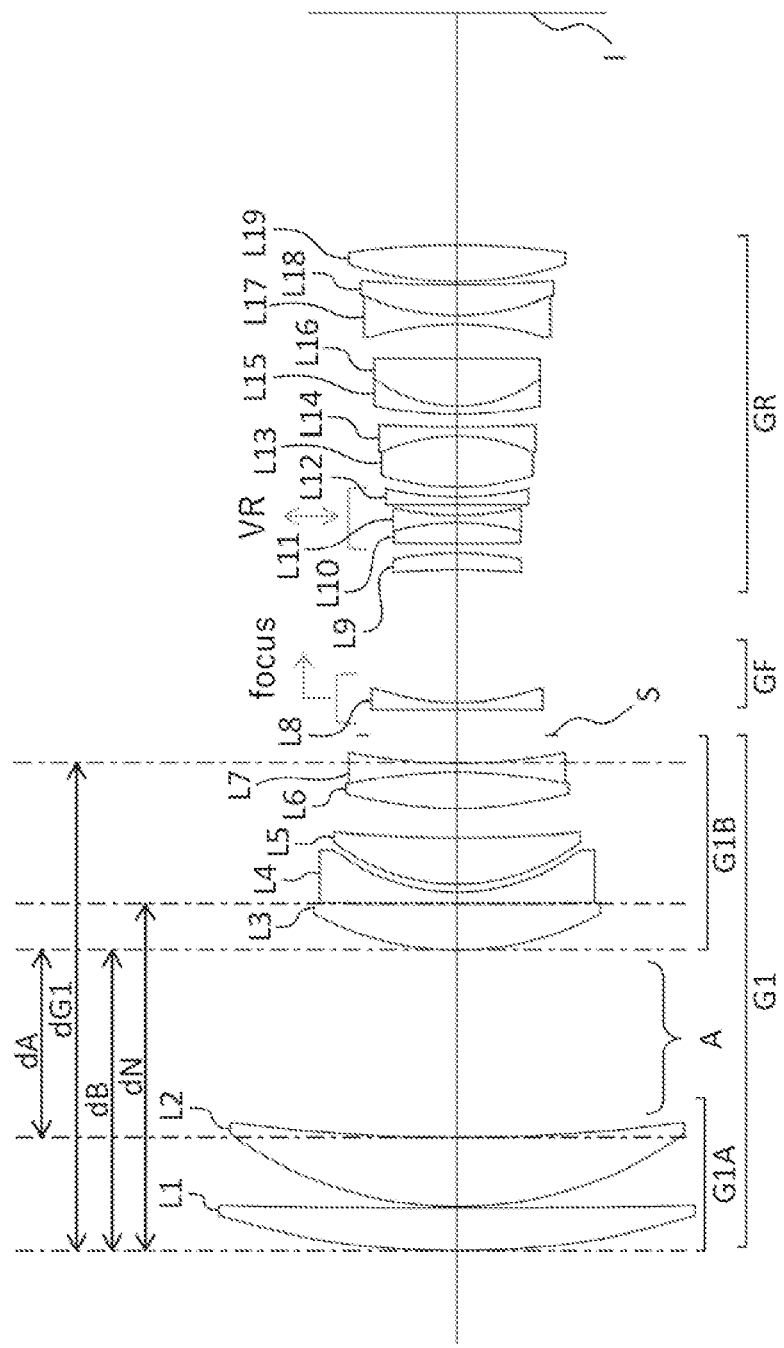

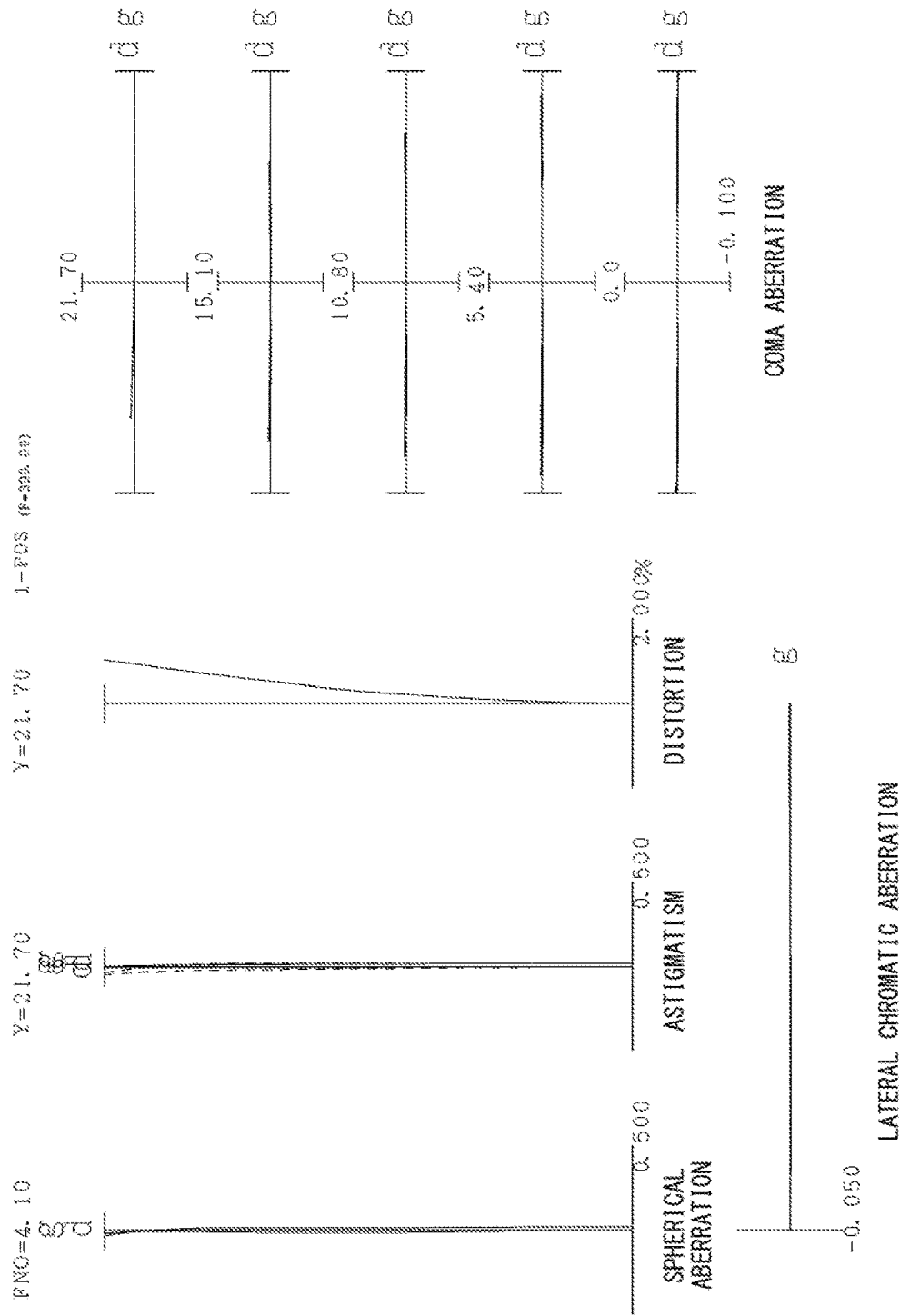

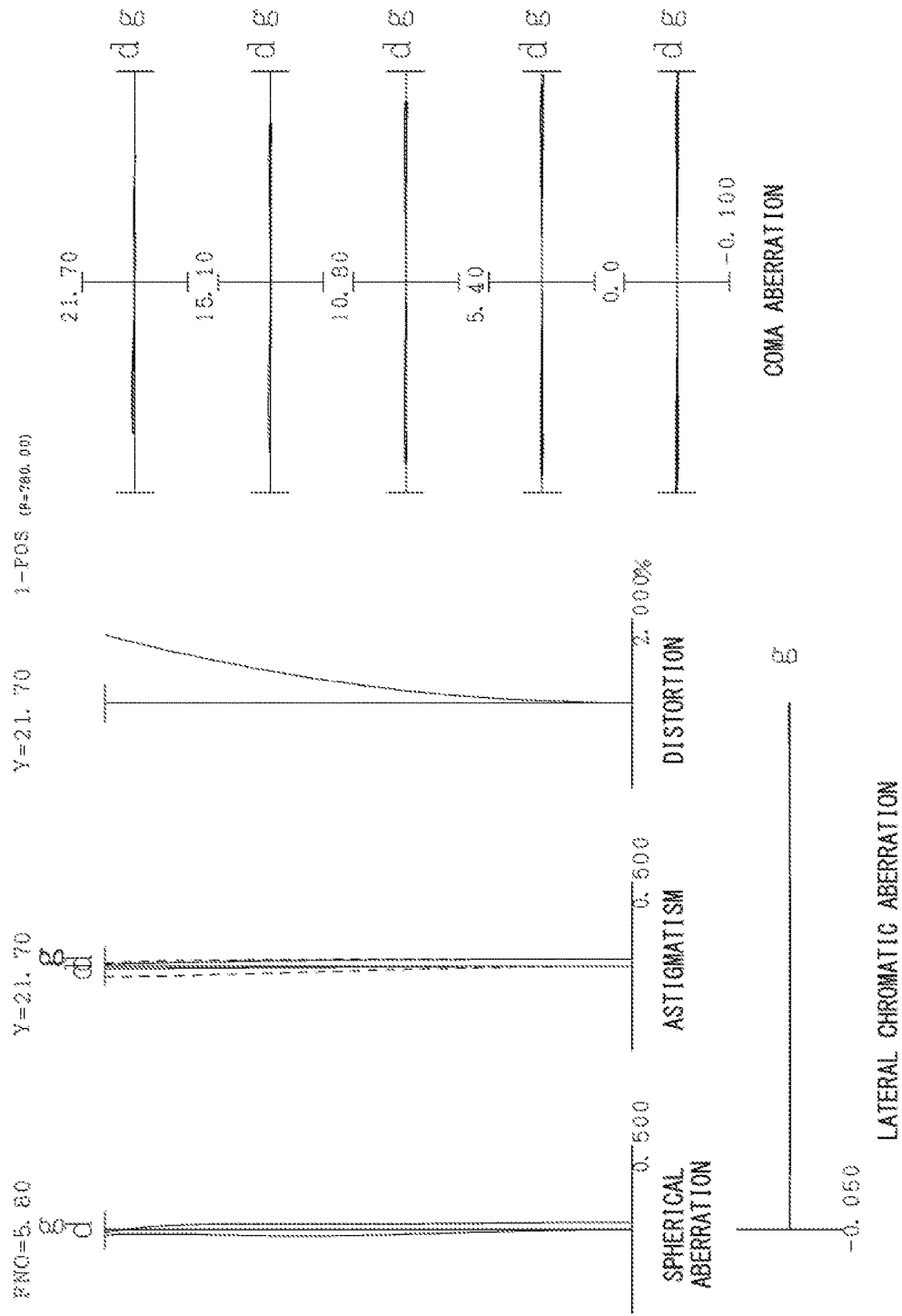

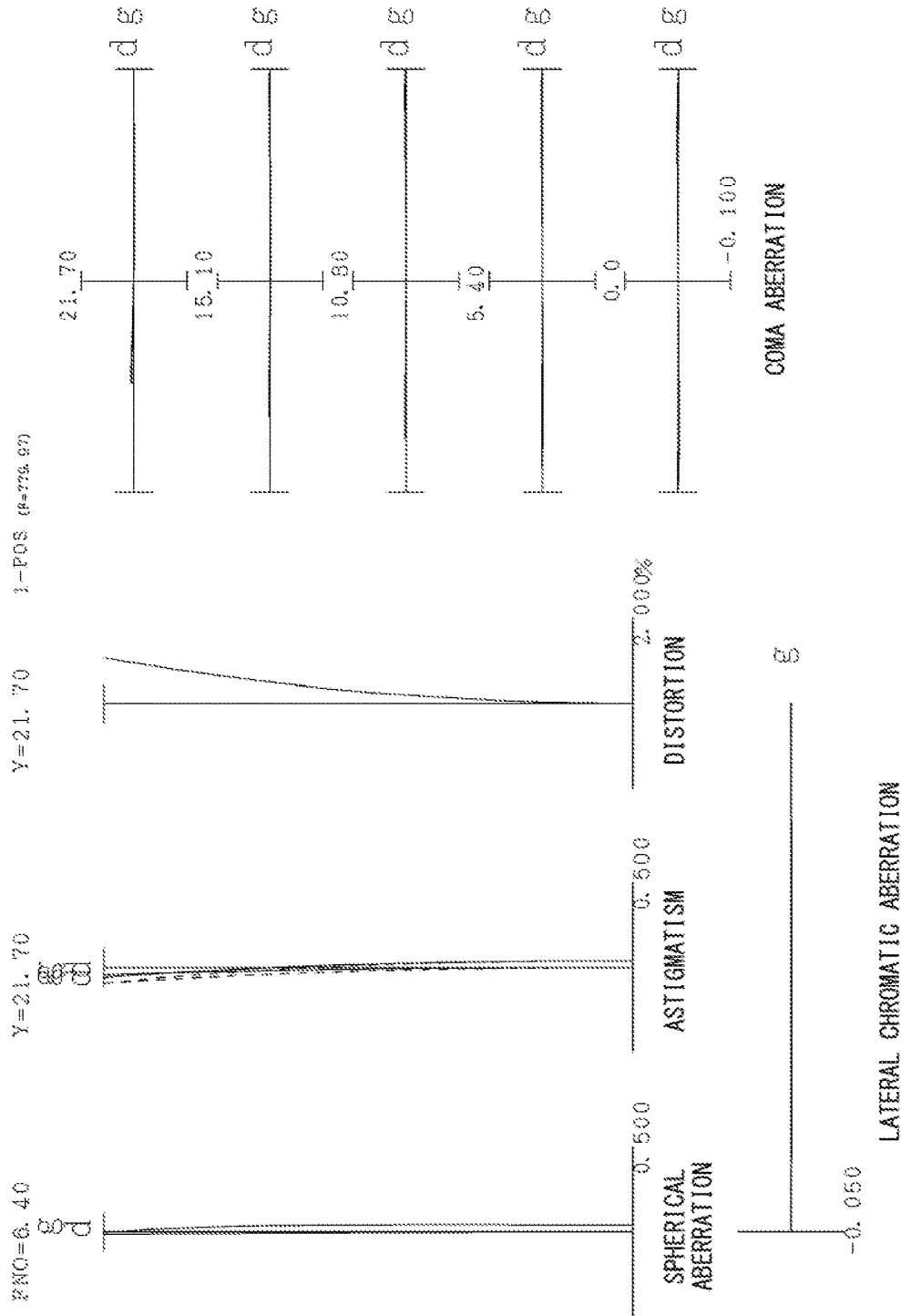

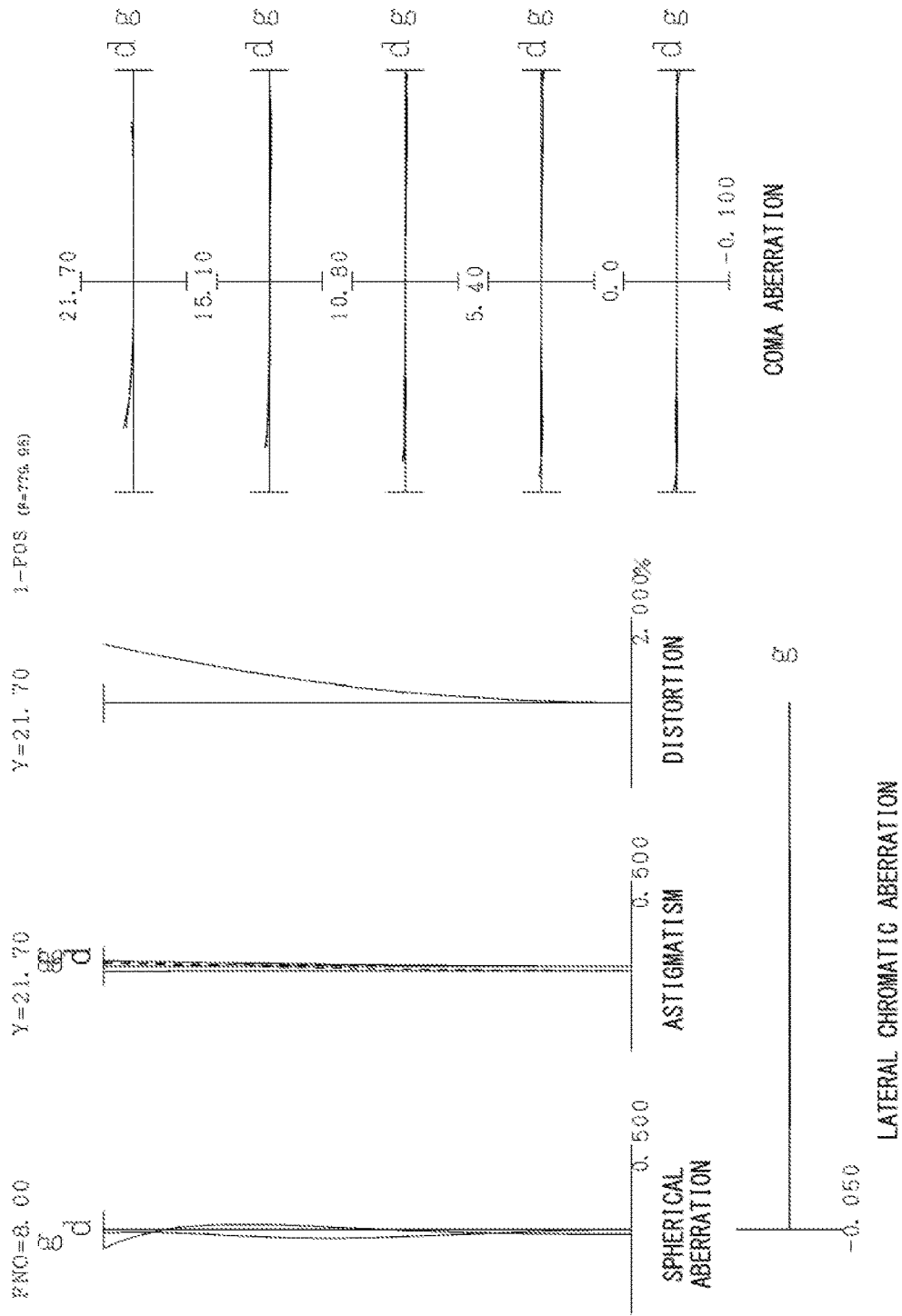

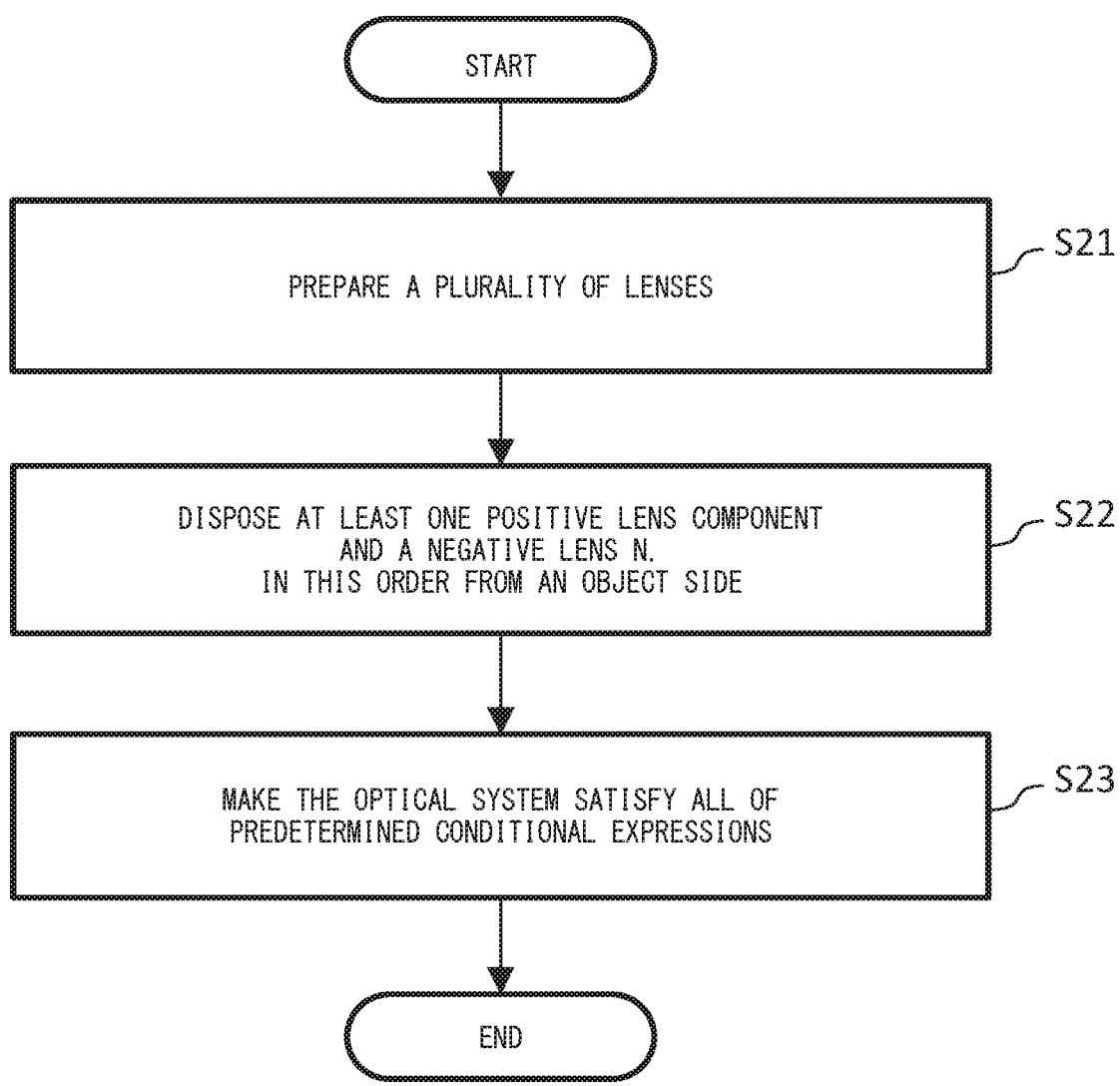

OPTICAL SYSTEM, OPTICAL APPARATUS, AND METHOD FOR MANUFACTURING OPTICAL SYSTEM

FIELD

The present invention relates to an optical system, an optical apparatus, and a method for manufacturing an optical system.

BACKGROUND

Optical systems used in cameras for photographs, electronic still cameras, video cameras and the like have been proposed (see, e.g., Patent Literature 1).

CITATION LIST

Patent Literature

Patent Literature 1: Japanese Unexamined Patent Publication No. 2016-200685

SUMMARY

An optical system of the present disclosure includes a first lens group having positive refractive power, a focusing group that moves along an optical axis at focusing, and a rear group, in order from an object side; the first lens group includes a first-A lens group disposed on the object side of the largest air space A in the first lens group; and all of the following conditional expressions are satisfied:

$$1.00 < FNo \times (TL/f)^2 < 2.50$$

$$0.30 < dA/dG1 < 0.85$$

where
FNo is the f-number of the optical system focusing on infinity,
TL is the total optical length of the optical system focusing on infinity,
f is the focal length of the optical system focusing on infinity,
dA is the length on the optical axis of the air space A, and
dG1 is the length on the optical axis of the first lens group.

An optical system of the present disclosure includes a first lens group having positive refractive power, a focusing group that moves along an optical axis at focusing, and a rear group, in order from an object side; the first lens group includes a first-A lens group disposed on the object side of the largest air space A in the first lens group; and all of the following conditional expressions are satisfied:

$$0.30 < TL/f < 0.80$$

$$0.30 < dA/dG1 < 0.85$$

where
TL is the total optical length of the optical system focusing on infinity,
f is the focal length of the optical system focusing on infinity,
dA is the length on the optical axis of the air space A, and
dG1 is the length on the optical axis of the first lens group.

An optical system of the present disclosure is an optical system including a plurality of lenses including at least one positive lens component and a negative lens N, in order from an object side; and all of the following conditional expressions are satisfied:

$$1.00 < FNo \times (TL/f)^2 < 2.50$$

$$0.18 < dN/TL < 0.45$$

where
FNo is the f-number of the optical system focusing on infinity,
TL is the total optical length of the optical system focusing on infinity,
f is the focal length of the optical system focusing on infinity, and
dN is the distance on an optical axis from a surface closest to the object side in the optical system to an object-side surface of the negative lens N.

An optical system of the present disclosure is an optical system including a plurality of lenses that includes a positive lens component closest to an object side and that includes a negative lens N disposed closest to the object side of negative lenses disposed closer to an image side than the positive lens component; and all of the following conditional expressions are satisfied:

$$1.00 < FNo \times (TL/f)^2 < 2.50$$

$$0.18 < dN/TL < 0.45$$

where
FNo is the f-number of the optical system focusing on infinity,
TL is the total optical length of the optical system focusing on infinity,
f is the focal length of the optical system focusing on infinity, and
dN is the distance on an optical axis from a surface closest to the object side in the optical system to an object-side surface of the negative lens N.

A method for manufacturing an optical system of the present disclosure is a method for manufacturing an optical system including a plurality of lenses. The method includes disposing a first lens group having positive refractive power, a focusing group that moves along an optical axis at focusing, and a rear group, in order from an object side; disposing a first-A lens group on the object side of the largest air space A in the first lens group; and arranging so that all of the following conditional expressions are satisfied:

$$1.00 < FNo \times (TL/f)^2 < 2.50$$

$$0.30 < dA/dG1 < 0.85$$

where
FNo is the f-number of the optical system focusing on infinity,
TL is the total optical length of the optical system focusing on infinity,
f is the focal length of the optical system focusing on infinity,
dA is the length on the optical axis of the air space A, and
dG1 is the length on the optical axis of the first lens group.

A method for manufacturing an optical system of the present disclosure is a method for manufacturing an optical system including a plurality of lenses. The method includes disposing at least one positive lens component and a negative lens N, in order from an object side; and arranging so that all of the following conditional expressions are satisfied:

$$1.00 < FNo \times (TL/f)^2 < 2.50$$

$$0.18 < dN/TL < 0.45$$

where

FNo is the f-number of the optical system focusing on infinity,

TL is the total optical length of the optical system focusing on infinity, f is the focal length of the optical system focusing on infinity, and dN is the distance on an optical axis from a surface closest to the object side in the optical system to an object-side surface of the negative lens N.

BRIEF DESCRIPTION OF DRAWINGS

FIG. 1A is a cross-sectional view of an optical system of a first example focusing on an object at infinity.

FIG. 4 shows aberrations of the optical system of the second example focusing on an object at infinity.

FIG. 14 shows aberrations of the optical system of the seventh example focusing on an object at infinity.

FIG. 18 shows aberrations of the optical system of the ninth example focusing on an object at infinity.

FIG. 22 shows aberrations of the optical system of the eleventh example focusing on an object at infinity.

FIG. 25 is a second flowchart outlining a method for manufacturing an optical system of the embodiment.

DESCRIPTION OF EMBODIMENTS

Figure 1B:
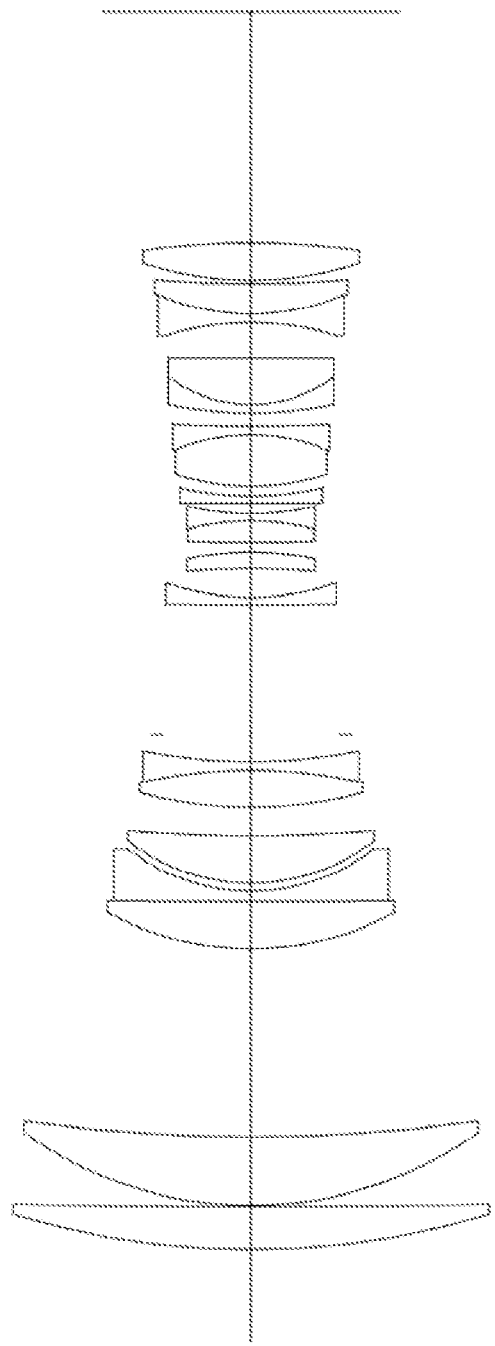
FIG. 1B is a cross-sectional view of the optical system of the first example focusing on a nearby object.

The following describes an optical system, an optical apparatus, and a method for manufacturing an optical system of an embodiment of the present application.

An optical system of the present embodiment includes a first lens group having positive refractive power, a focusing group that moves along an optical axis at focusing, and a rear group, in order from an object side; the first lens group includes a first-A lens group disposed on the object side of the largest air space A in the first lens group; and all of the following conditional expressions are satisfied:

$$1.00 < FNo \times (TL/f)^2 < 2.50 \quad (1)$$

$$0.30 < dA/dG1 < 0.85 \quad (2)$$

where

FNo is the f-number of the optical system focusing on infinity,

TL is the total optical length of the optical system focusing on infinity, f is the focal length of the optical system focusing on infinity, dA is the length on the optical axis of the air space A, and dG1 is the length on the optical axis of the first lens group.

The optical system of the present embodiment makes a correction with lenses closer to the image side than the first-A lens group, which enables achieving both reduction in size and weight and favorable optical performance. The optical system of the present embodiment can be downsized by satisfying conditional expression (1). The optical system of the present embodiment can be lightened by satisfying conditional expression (2). The effect of the optical system of the present embodiment can be further ensured by setting the upper limit of conditional expression (1) at 2.50. To further ensure the effect of the present embodiment, the upper limit of conditional expression (1) is preferably set at 2.45, 2.40, 2.35, 2.30, 2.25, or 2.20, more preferably at 2.15.

The effect of the optical system of the present embodiment can be further ensured by setting the lower limit of conditional expression (1) at 1.00. To further ensure the effect of the present embodiment, the lower limit of conditional expression (1) is preferably set at 1.10, 1.20, 1.25, or 1.30, more preferably at 1.35.

The effect of the optical system of the present embodiment can be further ensured by setting the upper limit of conditional expression (2) at 0.85. To further ensure the effect of the present embodiment, the upper limit of conditional expression (2) is preferably set at 0.80, 0.76, 0.73, or 0.70, more preferably at 0.68.

The effect of the optical system of the present embodiment can be further ensured by setting the lower limit of conditional expression (2) at 0.30. To further ensure the effect of the present embodiment, the lower limit of conditional expression (2) is preferably set at 0.31 or 0.33, more preferably at 0.35.

A small and lightweight optical system of favorable imaging performance can be achieved by the above configuration.

An optical system of the present embodiment includes a first lens group having positive refractive power, a focusing group that moves along an optical axis at focusing, and a rear group, in order from an object side; the first lens group includes a first-A lens group disposed on the object side of the largest air space A in the first lens group; and all of the following conditional expressions are satisfied:

$$0.30 < TL/f < 0.80 \tag{3}$$

$$0.30 < dA/dG1 < 0.85 \tag{2}$$

where

TL is the total optical length of the optical system focusing on infinity, f is the focal length of the optical system focusing on infinity, dA is the length on the optical axis of the air space A, and dG1 is the length on the optical axis of the first lens group.

The optical system of the present embodiment makes a correction with lenses closer to the image side than the first-A lens group, which enables achieving both reduction in size and weight and favorable optical performance. The optical system of the present embodiment can be downsized by satisfying conditional expression (3). The optical system of the present embodiment can be lightened by satisfying conditional expression (2).

The whole optical system of the present embodiment can be prevented from being too long by setting the ratio of the total optical length of the optical system to the focal length of the optical system less than the upper limit. The effect of the present embodiment can be further ensured by setting the upper limit of conditional expression (3) at 0.80. To further ensure the effect of the present embodiment, the upper limit of conditional expression (3) is preferably set at 0.78, 0.76, 0.74, or 0.72, more preferably at 0.70.

The optical system of the present embodiment can correct curvature of field favorably by setting the ratio of the total optical length of the optical system to the focal length of the optical system greater than the lower limit. The effect of the present embodiment can be further ensured by setting the lower limit of conditional expression (3) at 0.30. To further ensure the effect of the present embodiment, the lower limit of conditional expression (3) is preferably set at 0.33, 0.36, 0.40, or 0.42, more preferably at 0.44.

The effect of the optical system of the present embodiment can be further ensured by setting the upper limit of conditional expression (2) at 0.85. To further ensure the effect of the present embodiment, the upper limit of conditional expression (2) is preferably set at 0.80, 0.76, 0.73, or 0.70, more preferably at 0.68.

The effect of the optical system of the present embodiment can be further ensured by setting the lower limit of conditional expression (2) at 0.30. To further ensure the effect of the present embodiment, the lower limit of conditional expression (2) is preferably set at 0.31 or 0.33, more preferably at 0.35.

A small and lightweight optical system of favorable imaging performance can be achieved by the above configuration.

An optical system of the present embodiment is an optical system including a plurality of lenses including at least one positive lens component and a negative lens N, in order from an object side; and all of the following conditional expressions are satisfied:

$$1.00 < FNo \times (TL/f)^2 < 2.50 \tag{1}$$

$$0.18 < dN/TL < 0.45 \tag{4}$$

where

FNo is the f-number of the optical system focusing on infinity,

TL is the total optical length of the optical system focusing on infinity, f is the focal length of the optical system focusing on infinity, and dN is the distance on an optical axis from a surface closest to the object side in the optical system to an object-side surface of the negative lens N.

The optical system of the present embodiment satisfying conditional expressions (1) and (4) can be configured to have a small and lightweight object side and can correct aberrations with the image side of the optical system to achieve favorable imaging performance. A "lens component" herein refers to a single lens or a cemented lens. The effect of the optical system of the present embodiment can be further ensured by setting the upper limit of conditional expression (1) at 2.50. To further ensure the effect of the present embodiment, the upper limit of conditional expression (1) is preferably set at 2.45, 2.40, 2.35, 2.30, 2.25, or 2.20, more preferably at 2.15.

The effect of the optical system of the present embodiment can be further ensured by setting the lower limit of conditional expression (1) at 1.00. To further ensure the effect of the present embodiment, the lower limit of conditional expression (1) is preferably set at 1.10, 1.20, 1.25, or 1.30, more preferably at 1.35.

The effect of the optical system of the present embodiment can be further ensured by setting the upper limit of conditional expression (4) at 0.45. To further ensure the effect of the present embodiment, the upper limit of conditional expression (4) is preferably set at 0.42, 0.40, or 0.38, more preferably at 0.36.

The effect of the optical system of the present embodiment can be further ensured by setting the lower limit of conditional expression (4) at 0.18. To further ensure the effect of the present embodiment, the lower limit of conditional expression (4) is preferably set at 0.19, 0.20, or 0.21, more preferably at 0.22.

A small and lightweight optical system of favorable imaging performance can be achieved by the above configuration.

An optical system of the present embodiment is an optical system including a plurality of lenses that includes a positive lens component closest to an object side and that includes a negative lens N disposed closest to the object side of negative lenses disposed closer to an image side than the positive lens component; and all of the following conditional expressions are satisfied:

$$1.00 < FNo \times (TL/f)^2 < 2.50 \tag{1}$$

$$0.18 < dN/TL < 0.45 \tag{4}$$

where

FNo is the f-number of the optical system focusing on infinity,

TL is the total optical length of the optical system focusing on infinity, f is the focal length of the optical system focusing on infinity, and dN is the distance on an optical axis from a surface closest to the object side in the optical system to an object-side surface of the negative lens N.

The optical system of the present embodiment satisfying conditional expressions (1) and (4) can be configured to have a small and lightweight object side and can correct aberrations with the image side of the optical system to achieve favorable imaging performance. The effect of the optical system of the present embodiment can be further ensured by setting the upper limit of conditional expression (1) at 2.50. To further ensure the effect of the present embodiment, the upper limit of conditional expression (1) is preferably set at 2.45, 2.40, 2.35, 2.30, 2.25, or 2.20, more preferably at 2.15.

The effect of the optical system of the present embodiment can be further ensured by setting the lower limit of conditional expression (1) at 1.00. To further ensure the effect of the present embodiment, the lower limit of conditional expression (1) is preferably set at 1.10, 1.20, 1.25, or 1.30, more preferably at 1.35.

The effect of the optical system of the present embodiment can be further ensured by setting the upper limit of conditional expression (4) at 0.45. To further ensure the effect of the present embodiment, the upper limit of conditional expression (4) is preferably set at 0.42, 0.40, or 0.38, more preferably at 0.36.

The effect of the optical system of the present embodiment can be further ensured by setting the lower limit of conditional expression (4) at 0.18. To further ensure the effect of the present embodiment, the lower limit of conditional expression (4) is preferably set at 0.19, 0.20, or 0.21, more preferably at 0.22.

A small and lightweight optical system of favorable imaging performance can be achieved by the above configuration.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the following conditional expression is satisfied:

$$0.30 < dA/dG1 < 0.85 \qquad (2)$$

where dA is the length on the optical axis of the air space A, and dG1 is the length on the optical axis of the first lens group.

The whole optical system of the present embodiment can be further lightened by satisfying conditional expression (2). The effect of the optical system of the present embodiment can be further ensured by setting the upper limit of conditional expression (2) at 0.85. To further ensure the effect of the present embodiment, the upper limit of conditional expression (2) is preferably set at 0.80, 0.76, 0.73, or 0.70, more preferably at 0.68.

The effect of the optical system of the present embodiment can be further ensured by setting the lower limit of conditional expression (2) at 0.30. To further ensure the effect of the present embodiment, the lower limit of conditional expression (2) is preferably set at 0.31 or 0.33, more preferably at 0.35.

The optical system of the present embodiment preferably satisfies the following conditional expression:

$$0.30 < TL/f < 0.80. \qquad (3)$$

The optical system of the present embodiment can achieve both downsizing and favorable correction of curvature of field by satisfying conditional expression (3). The whole optical system of the present embodiment can be prevented from being too long by setting the ratio of the total optical length of the optical system to the focal length of the optical system less than the upper limit. The effect of the present embodiment can be further ensured by setting the upper limit of conditional expression (3) at 0.80. To further ensure the effect of the present embodiment, the upper limit of conditional expression (3) is preferably set at 0.78, 0.76, 0.74, or 0.72, more preferably at 0.70.

The optical system of the present embodiment can correct curvature of field favorably by setting the ratio of the total optical length of the optical system to the focal length of the optical system greater than the lower limit. The effect of the present embodiment can be further ensured by setting the lower limit of conditional expression (3) at 0.30. To further ensure the effect of the present embodiment, the lower limit of conditional expression (3) is preferably set at 0.33, 0.36, 0.40, or 0.42, more preferably at 0.44.

In the optical system of the present embodiment, the first lens group preferably includes the positive lens component and the negative lens N.

Preferably, the optical system of the present embodiment includes a first lens group, a focusing group that moves along the optical axis at focusing, and a rear group, in order from the object side; the first lens group includes a first-A lens group on the object side of the largest air space A in the first lens group and a first-B lens group on an image side of the air space A; and the following conditional expression is satisfied:

$$-2.00 < f1A/f1B < 0.30 \qquad (5)$$

where f1A is the focal length of the first-A lens group, and f1B is the focal length of the first-B lens group.

The optical system of the present embodiment can correct aberrations favorably by satisfying conditional expression (5). Setting the ratio of the focal length of the first-A lens group to the focal length of the first-B lens group less than the upper limit prevents the first-B lens group from having excessive positive power and enables the optical system of the present embodiment to correct spherical aberration and the like favorably. The effect of the present embodiment can be further ensured by setting the upper limit of conditional expression (5) at 0.30. To further ensure the effect of the present embodiment, the upper limit of conditional expression (5) is preferably set at 0.25, 0.20, 0.15, or 0.10, more preferably at 0.07.

Setting the ratio of the focal length of the first-A lens group to the focal length of the first-B lens group greater than the lower limit prevents the first-B lens group from having excessive negative power and enables the optical system of the present embodiment to correct coma aberration and the like favorably. The effect of the present embodiment can be further ensured by setting the lower limit of conditional expression (5) at −2.00. To further ensure the effect of the present embodiment, the lower limit of conditional expression (5) is preferably set at −1.60, −1.30, −1.00, or −0.80, more preferably at −0.60.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the following conditional expression is satisfied:

$$0.10 < f1A/f < 0.60 \qquad (6)$$

where f1A is the focal length of the first-A lens group.

The optical system of the present embodiment can achieve both weight reduction and favorable correction of coma aberration by satisfying conditional expression (6). Setting the ratio of the focal length of the first-A lens group to the focal length of the optical system less than the upper limit prevents the power of the first-A lens group from being low and enables reduction in the diameter of the first lens group except the first-A lens group, which enables weight reduction of the optical system of the present embodiment. The effect of the present embodiment can be further ensured by setting the upper limit of conditional expression (6) at 0.60. To further ensure the effect of the present embodiment, the upper limit of conditional expression (6) is preferably set at 0.57, 0.55, 0.52, or 0.48, more preferably at 0.45.

Setting the ratio of the focal length of the first-A lens group to the focal length of the optical system greater than the lower limit prevents the power of the first-A lens group from being high and thus enables the optical system of the present embodiment to correct coma aberration favorably. The effect of the present embodiment can be further ensured by setting the lower limit of conditional expression (6) at 0.10. To further ensure the effect of the present embodiment, the lower limit of conditional expression (6) is preferably set at 0.13, 0.16, 0.20, or 0.22, more preferably at 0.25.

Preferably, the optical system of the present embodiment includes a first lens group, a focusing group that moves along the optical axis at focusing, and a rear group, in order from the object side; the first lens group includes a first-B lens group disposed on an image side of the largest air space A in the first lens group; and the following conditional expression is satisfied:

$$0.40 < dB/dG1 < 0.85 \qquad (7)$$

where dB is the distance on the optical axis from a surface closest to the object side in the optical system to a surface closest to the object side in the first-B lens group, and dG1 is the length on the optical axis of the first lens group.

The optical system of the present embodiment can achieve both weight reduction and favorable correction of spherical aberration by satisfying conditional expression (7). The optical system of the present embodiment can correct spherical aberration favorably by setting the value of conditional expression (7) less than the upper limit. The effect of the present embodiment can be further ensured by setting the upper limit of conditional expression (7) at 0.85. To further ensure the effect of the present embodiment, the upper limit of conditional expression (7) is preferably set at 0.82, 0.80, 0.78, or 0.76, more preferably at 0.74.

Setting the value of conditional expression (7) greater than the lower limit enables reduction in the diameter of the first-B lens group and thus enables weight reduction of the optical system of the present embodiment. The effect of the present embodiment can be further ensured by setting the lower limit of conditional expression (7) at 0.40. To further ensure the effect of the present embodiment, the lower limit of conditional expression (7) is preferably set at 0.44, 0.47, 0.50, or 0.52, more preferably at 0.54.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the first-A lens group includes two or fewer positive lenses.

The optical system of the present embodiment having such a configuration can be lightened.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the following conditional expression is satisfied:

$$0.80 < fL1/fL2 < 3.30 \qquad (8)$$

where fL1 is the focal length of a first lens disposed closest to the object side in the first-A lens group, and fL2 is the focal length of a second lens disposed second from the object side in the first-A lens group.

The optical system of the present embodiment can correct spherical aberration and coma aberration favorably by satisfying conditional expression (8). Setting the ratio of the focal length of the first lens to the focal length of the second lens less than the upper limit prevents the power of the first lens from being too low and enables the optical system of the present embodiment to correct coma aberration favorably. The effect of the present embodiment can be further ensured by setting the upper limit of conditional expression (8) at 3.30. To further ensure the effect of the present embodiment, the upper limit of conditional expression (8) is preferably set at 3.20, 3.10, 3.00, or 2.90, more preferably at 2.80.

Setting the ratio of the focal length of the first lens to the focal length of the second lens greater than the lower limit prevents the power of the first lens from being too high and enables the optical system of the present embodiment to correct spherical aberration favorably. The effect of the present embodiment can be further ensured by setting the lower limit of conditional expression (8) at 0.80. To further ensure the effect of the present embodiment, the lower limit of conditional expression (8) is preferably set at 0.85, 0.90, 0.95, or 1.00, more preferably at 1.05.

Preferably, the optical system of the present embodiment includes a first lens group, a focusing group that moves along the optical axis at focusing, and a rear group, in order from the object side; the first lens group includes a first-A lens group on the object side of the largest air space A in the first lens group and a first-B lens group on an image side of the air space A; and the first-B lens group includes at least one positive lens Z satisfying the following conditional expression:

$$60.00 < vd1A\max - vdLZ \qquad (9)$$

where vd1Amax is the highest of the Abbe numbers for d-line of lenses included in the first-A lens group, and vdLZ is the Abbe number for d-line of the positive lens Z.

The optical system of the present embodiment can correct quadratic variance of axial chromatic aberration favorably by setting the value of conditional expression (9) greater than the lower limit. The effect of the present embodiment can be further ensured by setting the lower limit of conditional expression (9) at 60.00. To further ensure the effect of the present embodiment, the lower limit of conditional expression (9) is preferably set at 62.00, 63.00, 64.00, or 65.00, more preferably at 66.00.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the following conditional expression is satisfied:

$$55.00 < vd1Aave \quad (10)$$

where vd1Aave is an average of the Abbe numbers for d-line of lenses included in the first-A lens group.

The optical system of the present embodiment can correct axial chromatic aberration and lateral chromatic aberration favorably by setting the value of conditional expression (10) greater than the lower limit. The effect of the present embodiment can be further ensured by setting the lower limit of conditional expression (10) at 55.00. To further ensure the effect of the present embodiment, the lower limit of conditional expression (10) is preferably set at 60.00, 65.00, 70.00, or 75.00, more preferably at 80.00.

Preferably, the optical system of the present embodiment includes a first lens group, a focusing group that moves along the optical axis at focusing, and a rear group, in order from the object side; the first lens group includes a first-B lens group disposed on an image side of the largest air space A in the first lens group; and the first-B lens group includes at least one positive lens Z satisfying all of the following conditional expressions:

$$ndLZ + (0.01425 \times vdLZ) < 2.12 \quad (11)$$

$$vdLZ < 35.00 \quad (12)$$

$$0.702 < \theta gFLZ + (0.00316 \times vdLZ) \quad (13)$$

where ndLZ is the refractive index for d-line of the positive lens Z, vdLZ is the Abbe number for d-line of the positive lens Z, and θgFLZ is a partial dispersion ratio of the positive lens Z and is defined by the following equation:

$$\theta gFLZ = (ngLZ - nFLZ)/(nFLZ - nCLZ)$$

where the refractive indices for g-line, F-line, and C-line of the positive lens Z are denoted by ngLZ, nFLZ, and nCLZ, respectively.

The optical system of the present embodiment having such a configuration can correct aberrations favorably. Setting the value of conditional expression (11) less than the upper limit prevents the Petzval sum from being too small and enables the optical system of the present embodiment to correct curvature of field favorably. The effect of the present embodiment can be further ensured by setting the upper limit of conditional expression (11) at 2.12. To further ensure the effect of the present embodiment, the upper limit of conditional expression (11) is preferably set at 2.10, 2.09, 2.08, or 2.07, more preferably at 2.06.

The optical system of the present embodiment can correct quadratic variance of axial chromatic aberration favorably by setting the value of conditional expression (12) less than the upper limit. The effect of the present embodiment can be further ensured by setting the upper limit of conditional expression (12) at 35.00. To further ensure the effect of the present embodiment, the upper limit of conditional expression (12) is preferably set at 33.00, 31.00, 30.50, or 30.00, more preferably at 29.50.

The optical system of the present embodiment can correct quadratic variance of axial chromatic aberration favorably by setting the value of conditional expression (13) greater than the lower limit. The effect of the present embodiment can be further ensured by setting the lower limit of conditional expression (13) at 0.702. To further ensure the effect of the present embodiment, the lower limit of conditional expression (13) is preferably set at 0.704, 0.707, 0.710, or 0.712, more preferably at 0.715.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the following conditional expression is satisfied:

$$0.00 < (L1R2 + L1R1)/(L1R2 - L1R1) < 3.00 \quad (14)$$

where

L1R1 is the radius of curvature of an object-side surface of a first lens disposed closest to the object side, and L1R2 is the radius of curvature of an image-side surface of the first lens.

The optical system of the present embodiment can correct spherical aberration and coma aberration favorably by satisfying conditional expression (14). The optical system of the present embodiment can correct spherical aberration favorably by setting the value of conditional expression (14) less than the upper limit. The effect of the present embodiment can be further ensured by setting the upper limit of conditional expression (14) at 3.00. To further ensure the effect of the present embodiment, the upper limit of conditional expression (14) is preferably set at 2.70, 2.50, 2.20, or 2.00, more preferably at 1.80.

The optical system of the present embodiment can correct coma aberration favorably by setting the value of conditional expression (14) greater than the lower limit. The effect of the present embodiment can be further ensured by setting the lower limit of conditional expression (14) at 0.00. To further ensure the effect of the present embodiment, the lower limit of conditional expression (14) is preferably set at 0.20, 0.40, 0.50, or 0.60, more preferably at 0.70.

Preferably, the optical system of the present embodiment includes a first lens group, a focusing group that moves along the optical axis at focusing, and a rear group, in order from the object side; the first lens group includes a first-A lens group disposed on the object side of the largest air space A in the first lens group; and the following conditional expression is satisfied:

$$0.00 < (L2R2 + L2R1)/(L2R2 - L2R1) < 3.50 \quad (15)$$

where

L2R1 is the radius of curvature of an object-side surface of a second lens disposed second from the object side in the first-A lens group, and L2R2 is the radius of curvature of an image-side surface of the second lens.

The optical system of the present embodiment can correct spherical aberration and coma aberration favorably by satisfying conditional expression (15). The optical system of the present embodiment can correct spherical aberration favorably by setting the value of conditional expression (15)

less than the upper limit. The effect of the present embodiment can be further ensured by setting the upper limit of conditional expression (15) at 3.50. To further ensure the effect of the present embodiment, the upper limit of conditional expression (15) is preferably set at 3.20, 3.00, 2.80, or 2.60, more preferably at 2.40.

The optical system of the present embodiment can correct coma aberration favorably by setting the value of conditional expression (15) greater than the lower limit. The effect of the present embodiment can be further ensured by setting the lower limit of conditional expression (15) at 0.00. To further ensure the effect of the present embodiment, the lower limit of conditional expression (15) is preferably set at 0.20, 0.50, 0.80, or 1.00, more preferably at 1.20.

Preferably, the optical system of the present embodiment includes a first lens group, a focusing group that moves along the optical axis at focusing, and a rear group, in order from the object side; and the following conditional expression is satisfied:

$$0.10 < f1/f < 0.60 \quad (16)$$

where
f1 is the focal length of the first lens group.

The optical system of the present embodiment can achieve both downsizing and favorable correction of spherical aberration by satisfying conditional expression (16). Setting the ratio of the focal length of the first lens group to the focal length of the optical system less than the upper limit prevents the power of the first lens group from being too low and thus enables the optical system of the present embodiment to be downsized. The effect of the present embodiment can be further ensured by setting the upper limit of conditional expression (16) at 0.60. To further ensure the effect of the present embodiment, the upper limit of conditional expression (16) is preferably set at 0.56, 0.53, 0.50, or 0.48, more preferably at 0.45.

Setting the value of conditional expression (16) greater than the lower limit prevents the power of the first lens group from being too high and thus enables the optical system of the present embodiment to correct spherical aberration favorably. The effect of the present embodiment can be further ensured by setting the lower limit of conditional expression (16) at 0.10. To further ensure the effect of the present embodiment, the lower limit of conditional expression (16) is preferably set at 0.14, 0.18, 0.22, or 0.25, more preferably at 0.28.

Preferably, the optical system of the present embodiment includes a first lens group, a focusing group that moves along the optical axis at focusing, and a rear group, in order from the object side; and the following conditional expression is satisfied:

$$0.20 < (-fF)/f1 < 0.85 \quad (17)$$

where
fF is the focal length of the focusing group, and
f1 is the focal length of the first lens group.

The optical system of the present embodiment can correct spherical aberrations favorably from infinity to close range by satisfying conditional expression (17). Setting the ratio of the focal length of the focusing group to the focal length of the first lens group less than the upper limit prevents the power of the focusing group from being too low and thus enables the optical system of the present embodiment to reduce variations in curvature of field. The effect of the present embodiment can be further ensured by setting the upper limit of conditional expression (17) at 0.85. To further ensure the effect of the present embodiment, the upper limit of conditional expression (17) is preferably set at 0.80, 0.77, 0.75, or 0.72, more preferably at 0.65.

Setting the ratio of the focal length of the focusing group to the focal length of the first lens group greater than the lower limit prevents the power of the focusing group from being too high and thus enables the optical system of the present embodiment to reduce variations in axial chromatic aberration. The effect of the present embodiment can be further ensured by setting the lower limit of conditional expression (17) at 0.20. To further ensure the effect of the present embodiment, the lower limit of conditional expression (17) is preferably set at 0.24, 0.28, 0.32, or 0.36, more preferably at 0.40.

Preferably, the optical system of the present embodiment includes a first lens group, a focusing group that moves along the optical axis at focusing, and a rear group, in order from the object side; and the following conditional expression is satisfied:

$$-1.50 < (-fF)/fR < 0.60 \quad (18)$$

where
fF is the focal length of the focusing group, and
fR is the focal length of the rear group.

The optical system of the present embodiment can correct aberrations favorably by satisfying conditional expression (18). Setting the value of conditional expression (18) less than the upper limit prevents the power of the focusing group from being too low and thus enables the optical system of the present embodiment to correct curvature of field favorably. The effect of the present embodiment can be further ensured by setting the upper limit of conditional expression (18) at 0.60. To further ensure the effect of the present embodiment, the upper limit of conditional expression (18) is preferably set at 0.50, 0.40, 0.30, or 0.20, more preferably at 0.10.

Setting the value of conditional expression (18) greater than the lower limit prevents the power of the focusing group from being too high and thus enables the optical system of the present embodiment to correct lateral chromatic aberration favorably. The effect of the present embodiment can be further ensured by setting the lower limit of conditional expression (18) at −1.50. To further ensure the effect of the present embodiment, the lower limit of conditional expression (18) is preferably set at −1.40, −1.30, −1.20, or −1.10, more preferably at −1.00.

Preferably, the optical system of the present embodiment includes a first lens group, a focusing group that moves along the optical axis at focusing, and a rear group, in order from the object side; and the following conditional expression is satisfied:

$$0.30 < dF/TL < 0.70 \quad (19)$$

where
dF is the distance on the optical axis from a surface closest to the object side in the optical system to a surface closest to the object side in the focusing group.

The optical system of the present embodiment can achieve both speedup of focusing with the lightweight focusing group and reduction in variations in curvature of field by satisfying conditional expression (19). Setting the value of conditional expression (19) less than the upper limit prevents the focusing group from being placed too backward and enables the optical system of the present embodiment to reduce variations in curvature of field. The effect of the present embodiment can be further ensured by setting the upper limit of conditional expression (19) at 0.70. To further ensure the effect of the present embodiment, the upper limit of conditional expression (19) is preferably set at 0.67, 0.64, 0.61, or 0.58, more preferably at 0.56.

In the optical system of the present embodiment, setting the value of conditional expression (19) greater than the lower limit prevents the focusing group from being placed too forward and enables weight reduction of the focusing group. The effect of the present embodiment can be further ensured by setting the lower limit of conditional expression (19) at 0.30. To further ensure the effect of the present embodiment, the lower limit of conditional expression (19) is preferably set at 0.32, 0.34, 0.36, or 0.38, more preferably at 0.40.

Preferably, the optical system of the present embodiment includes a first lens group, a focusing group that moves along the optical axis at focusing, and a rear group, in order from the object side; and the following conditional expression is satisfied:

$$40.00 < vdFave \quad (20)$$

where vdFave is an average of the Abbe numbers for d-line of lenses included in the focusing group.

The optical system of the present embodiment can correct axial chromatic aberration favorably from infinity to close range by setting the value of conditional expression (20) greater than the lower limit. The effect of the present embodiment can be further ensured by setting the lower limit of conditional expression (20) at 40.00. To further ensure the effect of the present embodiment, the lower limit of conditional expression (20) is preferably set at 50.00, 55.00, 60.00, or 65.00, more preferably at 70.00.

The optical system of the present embodiment preferably satisfies the following conditional expression:

$$1.00° < 2\omega < 20.00° \quad (21)$$

where

2ω is the total angle of view of the optical system.

Conditional expression (21) is to set an appropriate value of the total angle of view of the optical system of the present embodiment. Variations in aberrations, such as coma aberration, curvature of field, and distortion, associated with focusing can be reduced by satisfying conditional expression (21). The effect of the present embodiment can be further ensured by setting the upper limit of conditional expression (21) at 20.00°. To further ensure the effect of the present embodiment, the upper limit of conditional expression (21) is preferably set at 18.00°, 16.00°, 14.00°, or 12.00°, more preferably at 10.00°.

The effect of the present embodiment can be further ensured by setting the lower limit of conditional expression (21) at 1.00°. To further ensure the effect of the present embodiment, the lower limit of conditional expression (21) is preferably set at 1.50°, 2.00°, 2.20°, or 2.50°, more preferably at 2.80°.

The optical system of the present embodiment preferably satisfies the following conditional expression:

$$0.075 < Bf/f < 0.185 \quad (22)$$

where

Bf is the back focus of the optical system.

The optical system of the present embodiment can achieve both downsizing and weight reduction by satisfying conditional expression (22). Setting the ratio of the back focus to the focal length of the optical system less than the upper limit prevents the back focus from being too long and enables the whole optical system of the present embodiment to be shortened. The effect of the present embodiment can be further ensured by setting the upper limit of conditional expression (22) at 0.185. To further ensure the effect of the present embodiment, the upper limit of conditional expression (22) is preferably set at 0.180, 0.175, 0.170, or 0.165, more preferably at 0.160.

Setting the ratio of the back focus to the focal length of the optical system greater than the lower limit ensures an appropriate back focus and enables weight reduction of the optical system of the present embodiment. The effect of the present embodiment can be further ensured by setting the lower limit of conditional expression (22) at 0.075. To further ensure the effect of the present embodiment, the lower limit of conditional expression (22) is preferably set at 0.080, 0.082, 0.085, or 0.088, more preferably at 0.090.

Preferably, the optical system of the present embodiment includes a first lens group, a focusing group that moves along the optical axis at focusing, and a rear group, in order from the object side; and the rear group includes a vibration reduction lens group movable so that movement has a component in a direction perpendicular to the optical axis to correct an image blur.

The optical system of the present embodiment having such a configuration can correct an image blur favorably.

A small and lightweight optical system of favorable imaging performance can be achieved by the above configuration.

An optical apparatus of the present embodiment includes the optical system having the above configuration. This enables achieving a small and lightweight optical apparatus of favorable imaging performance.

A method for manufacturing an optical system of the present embodiment is a method for manufacturing an optical system including a plurality of lenses. The method includes disposing a first lens group having positive refractive power, a focusing group that moves along an optical axis at focusing, and a rear group, in order from an object side; disposing a first-A lens group on the object side of the largest air space A in the first lens group; and arranging so that all of the following conditional expressions are satisfied:

$$1.00 < FNo \times (TL/f)^2 < 2.50 \quad (1)$$

$$0.30 < dA/dG1 < 0.85 \quad (2)$$

where

FNo is the f-number of the optical system focusing on infinity,

TL is the total optical length of the optical system focusing on infinity, f is the focal length of the optical system focusing on infinity, dA is the length on the optical axis of the air space A, and dG1 is the length on the optical axis of the first lens group.

A method for manufacturing an optical system of the present embodiment is a method for manufacturing an optical system including a plurality of lenses. The method includes disposing at least one positive lens component and a negative lens N, in order from an object side; and arranging so that all of the following conditional expressions are satisfied:

$$1.00 < FNo \times (TL/f)^2 < 2.50 \quad (1)$$

$$0.18 < dN/TL < 0.45 \quad (4)$$

where

FNo is the f-number of the optical system focusing on infinity,

TL is the total optical length of the optical system focusing on infinity, f is the focal length of the optical system focusing on infinity, and dN is the distance on an optical axis from a surface closest to the object side in the optical system to an object-side surface of the negative lens N.

A small and lightweight optical system of favorable imaging performance can be manufactured by such a method for manufacturing an optical system.

NUMERICAL EXAMPLES

Examples of the present application will be described below with reference to the drawings.

First Example

FIG. 1A is a cross-sectional view of an optical system of a first example focusing on an object at infinity. FIG. 1B is a cross-sectional view of the optical system of the first example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A, and the first-B lens group G1B is disposed on the image side of the air space A.

The first-A lens group G1A includes a positive meniscus lens L1 convex on the object side, and a positive meniscus lens L2 convex on the object side, in order from the object side.

The first-B lens group G1B includes a negative cemented lens composed of a positive meniscus lens L3 convex on the object side and a negative meniscus lens L4 convex on the object side; a positive meniscus lens L5 convex on the object side; and a positive cemented lens composed of a biconvex positive lens L6 and a biconcave negative lens L7, in order from the object side.

The focusing group GF includes a negative meniscus lens L8 convex on the object side.

The rear group GR includes a positive meniscus lens L9 convex on the image side; a negative cemented lens composed of a biconvex positive lens L10 and a biconcave negative lens L11; a biconcave negative lens L12; a positive cemented lens composed of a biconvex positive lens L13 and a biconcave negative lens L14; a positive cemented lens composed of a negative meniscus lens L15 convex on the object side and a biconvex positive lens L16; a negative cemented lens composed of a biconcave negative lens L17 and a positive meniscus lens L18 convex on the object side; and a biconvex positive lens L19, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L10 and the negative lens L11 and the negative lens L12, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens, and the positive meniscus lens L2 corresponds to the second lens. In the optical system of the present example, the negative meniscus lens L4 corresponds to the negative lens N, and the positive lens L6 corresponds to the positive lens Z.

In the optical system of the present example, dA is the distance on the optical axis between the image-side surface of the positive meniscus lens L2 and the object-side surface of the positive meniscus lens L3. dG1 is the distance on the optical axis between the object-side surface of the positive meniscus lens L1 and the image-side surface of the negative lens L7. dB is the distance on the optical axis between the object-side surface of the positive meniscus lens L1 and the object-side surface of the positive meniscus lens L3. dN is the distance on the optical axis between the object-side surface of the positive meniscus lens L1 and the object-side surface of the negative meniscus lens L4. In the cross-sectional views of the optical systems of the other examples described below, illustration of dA, dG1, dB, and dN will be omitted.

Table 1 below shows specifications of the optical system of the present example. In Table 1, f, Fno, and TL denote the focal length, the f-number, and the total optical length of the optical system focusing on infinity, respectively, and Bf denotes the back focus of the optical system.

In [Lens specifications], m denotes the positions of optical surfaces counted from the object side, r the radii of curvature, d the surface-to-surface distances, nd the refractive indices for d-line (wavelength 587.6 nm), and vd the Abbe numbers for d-line. In [Lens specifications], the radius of curvature r=∞. means a plane.

The unit of the focal lengths f, the radii of curvature r, and the other lengths listed in Table 1 is "mm." However, the unit is not limited thereto because the optical performance of a proportionally enlarged or reduced optical system is the same as that of the original optical system.

The above reference symbols in Table 1 will also be used similarly in the tables of the other examples described below.

TABLE 1

| [General specifications] | | | | |
|---|---|---|---|---|
| f | | | 292.50 | |
| Fno | | | 4.10 | |
| Bf | | | 35.641 | |
| image height | | | 21.700 | |
| TL | | | 190.638 | |
| 2ω | | | 8.43 | |
| [Lens specifications] | | | | |
| m | r | d | nd | vd |
| 1) | 125.140 | 6.663 | 1.537750 | 74.70 |
| 2) | 1851.356 | 0.150 | | |
| 3) | 59.805 | 10.676 | 1.437001 | 95.10 |
| 4) | 262.678 | 28.838 | | |
| 5) | 46.054 | 7.325 | 1.437001 | 95.10 |
| 6) | 4710.018 | 1.600 | 1.902650 | 35.72 |
| 7) | 30.903 | 1.232 | | |

TABLE 1-continued

| | | | | |
|---|---|---|---|---|
| 8) | 31.124 | 7.235 | 1.437001 | 95.10 |
| 9) | 211.923 | 4.436 | | |
| 10) | 64.379 | 5.654 | 1.663820 | 27.35 |
| 11) | −76.867 | 1.300 | 1.654115 | 39.68 |
| 12) | 84.138 | 4.271 | | |
| 13> | ∞ | D13 | (aperture stop) | |
| 14) | 898.004 | 1.100 | 1.496997 | 81.61 |
| 15) | 37.914 | D15 | | |
| 16) | −122.862 | 2.483 | 1.487490 | 70.32 |
| 17) | −51.275 | 1.500 | | |
| 18) | 212.753 | 3.300 | 1.620040 | 36.40 |
| 19) | −38.078 | 1.100 | 1.593190 | 67.90 |
| 20) | 42.404 | 1.650 | | |
| 21) | −1123.057 | 1.100 | 1.593490 | 67.00 |
| 22) | 48.084 | 1.500 | | |
| 23) | 36.980 | 7.966 | 1.612660 | 44.46 |
| 24) | −28.819 | 1.300 | 1.593190 | 67.90 |
| 25) | 237.490 | 2.000 | | |
| 26) | 60.518 | 1.300 | 1.922860 | 20.88 |
| 27) | 21.378 | 7.261 | 1.720467 | 34.71 |
| 28) | −1990.403 | 5.379 | | |
| 29) | −44.860 | 1.300 | 1.816000 | 46.59 |
| 30) | 36.494 | 4.671 | 1.737999 | 32.33 |
| 31) | 197.557 | 0.500 | | |
| 32) | 53.113 | 5.700 | 1.581440 | 40.98 |
| 33) | −118.041 | Bf | | |

[Focal length data of groups]

| Groups | Starting surfaces | Focal lengths |
|---|---|---|
| G1 | 1 | 121.914 |
| G1A | 1 | 103.249 |
| G1B | 5 | −276.316 |
| GF | 14 | −79.683 |
| GR | 16 | −342.518 |
| f1 | 1 | −48.395 |
| f2 | 6 | 105.403 |
| f3 | 9 | 64.392 |
| f4 | 13 | −112.410 |
| f5 | 19 | 134.882 |
| f6 | 22 | 81.543 |
| f7 | 24 | −60.633 |

[Variable distance data]

| | At focusing on infinity | At focusing on a nearby object |
|---|---|---|
| D13 | 4.000 | 19.946 |
| D15 | 20.506 | 4.560 |

Figure 2:
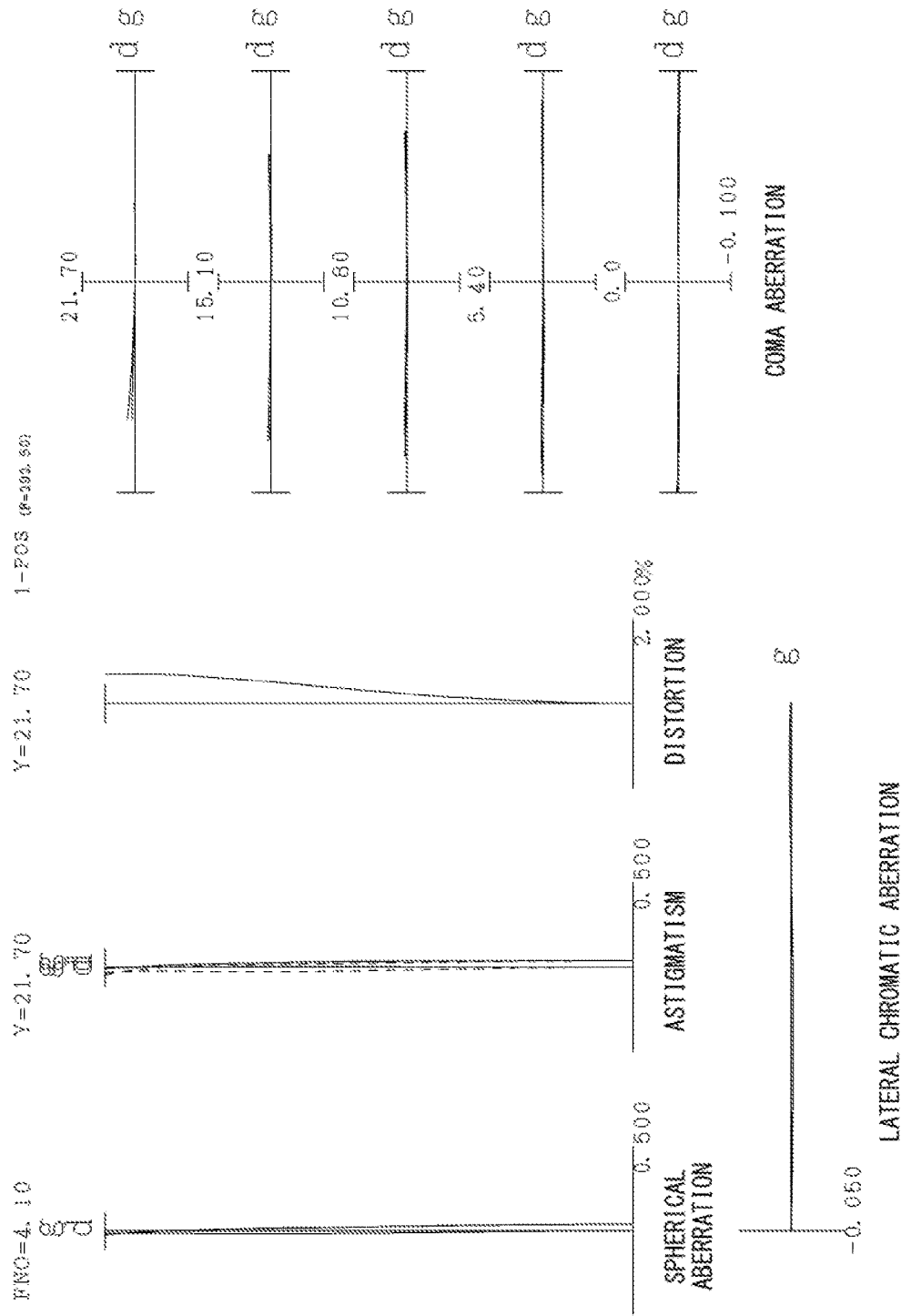
FIG. 2 shows aberrations of the optical system of the first example focusing on an object at infinity.

FIG. 2 shows aberrations of the optical system of the first example focusing on an object at infinity.

In the graphs of aberrations, FNO and Y denote f-number and image height, respectively. More specifically, the graph of spherical aberration shows the f-number corresponding to the maximum aperture, the graphs of astigmatism and distortion show the maximum of image height, and the graph of coma aberration shows the values of image height. d and g denote d-line and g-line (wavelength 435.8 nm), respectively. In the graph of astigmatism, the solid lines and the broken lines show a sagittal plane and a meridional plane, respectively. The reference symbols in the graphs of aberrations of the present example will also be used in those of the other examples described below.

The graphs of aberrations suggest that the optical system of the present example effectively reduces variations in aberrations at focusing and has high optical performance.

Second Example

Figure 3A:
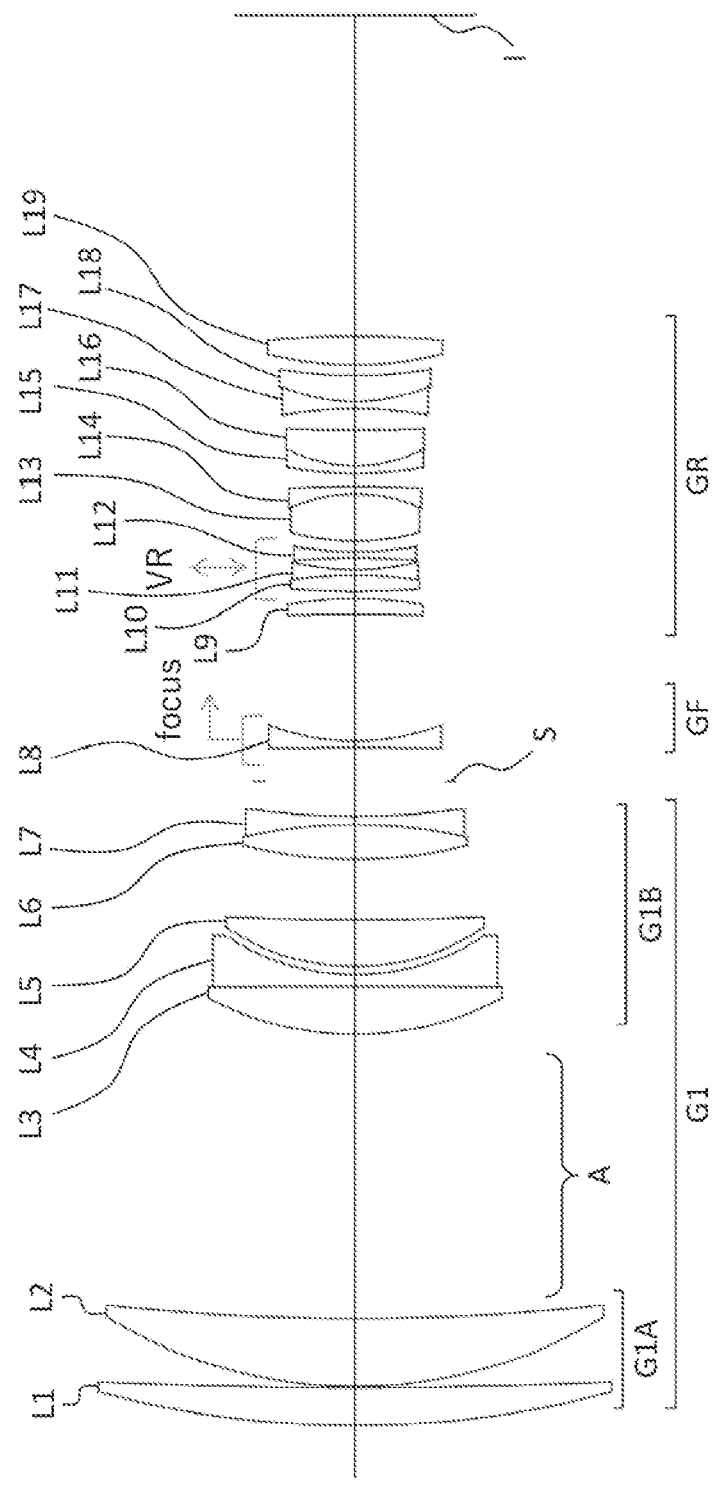
FIG. 3A is a cross-sectional view of an optical system of a second example focusing on an object at infinity.
Figure 3B:
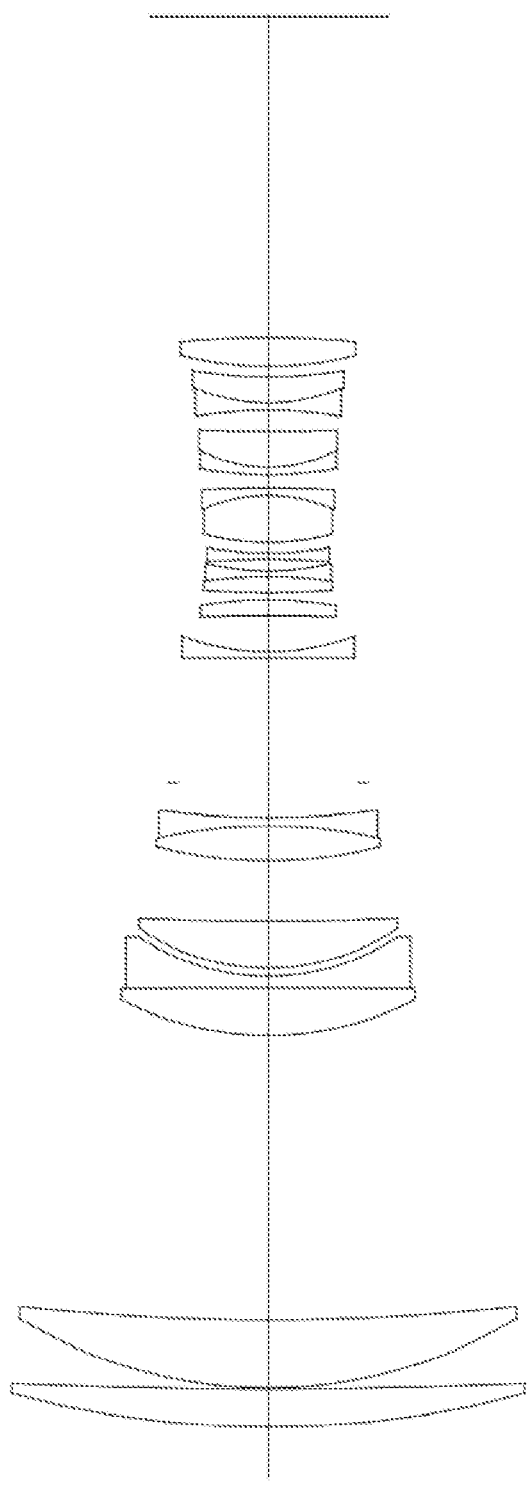
FIG. 3B is a cross-sectional view of the optical system of the second example focusing on a nearby object.

FIG. 3A is a cross-sectional view of an optical system of a second example focusing on an object at infinity. FIG. 3B is a cross-sectional view of the optical system of the second example focusing on a nearby object.

The optical system of the present example includes a first lens group G1 having positive refractive power, a focusing group GF having negative refractive power, and a rear group GR having positive refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A, and the first-B lens group G1B is disposed on the image side of the air space A.

The first-A lens group G1A includes a positive meniscus lens L1 convex on the object side, and a positive meniscus lens L2 convex on the object side, in order from the object side.

The first-B lens group G1B includes a negative cemented lens composed of a biconvex positive lens L3 and a biconcave negative lens L4; a positive meniscus lens L5 convex on the object side; and a positive cemented lens composed of a biconvex positive lens L6 and a biconcave negative lens L7, in order from the object side.

The focusing group GF includes a biconcave negative lens L8.

The rear group GR includes a positive meniscus lens L9 convex on the image side; a negative cemented lens composed of a biconvex positive lens L10 and a biconcave negative lens L11; a biconcave negative lens L12; a positive cemented lens composed of a biconvex positive lens L13 and a negative meniscus lens L14 convex on the image side; a positive cemented lens composed of a negative meniscus lens L15 convex on the object side and a positive meniscus lens L16 convex on the object side; a negative cemented lens composed of a biconcave negative lens L17 and a positive meniscus lens L18 convex on the object side; and a biconvex positive lens L19, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L10 and the negative lens L11 and the negative lens L12, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens, and the positive meniscus lens L2 corresponds to the second lens. In the optical system of the present example, the negative lens L4 corresponds to the negative lens N, and the positive lens L6 corresponds to the positive lens Z.

In the optical system of the present example, dA is the distance on the optical axis between the image-side surface of the positive meniscus lens L2 and the object-side surface of the positive lens L3. dG1 is the distance on the optical axis between the object-side surface of the positive meniscus lens L1 and the image-side surface of the negative lens L7. dB is the distance on the optical axis between the object-side surface of the positive meniscus lens L1 and the object-side surface of the positive lens L3. dN is the distance on the optical axis between the object-side surface of the positive meniscus lens L1 and the object-side surface of the negative lens L4.

Table 2 below shows specifications of the optical system of the present example.

TABLE 2

[General specifications]

| | |
|---|---|
| f | 390.00 |
| Fno | 4.10 |
| Bf | 60.901 |
| image height | 21.700 |
| TL | 267.445 |
| 2ω | 6.30 |

[Lens specifications]

| m | r | d | nd | νd |
|---|---|---|---|---|
| 1) | 187.004 | 7.233 | 1.537750 | 74.70 |
| 2) | 1083.302 | 0.200 | | |
| 3) | 90.597 | 12.867 | 1.433837 | 95.16 |
| 4) | 430.769 | 53.926 | | |
| 5) | 60.452 | 9.061 | 1.437001 | 95.10 |
| 6) | −2517.992 | 2.200 | 1.902650 | 35.72 |
| 7) | 43.878 | 1.547 | | |
| 8) | 43.725 | 8.825 | 1.437001 | 95.10 |
| 9) | 492.119 | 11.552 | | |
| 10) | 89.096 | 6.561 | 1.663820 | 27.35 |
| 11) | −94.634 | 1.600 | 1.654115 | 39.68 |
| 12) | 141.270 | 6.541 | | |
| 13> | ∞ | D13 | (aperture stop) | |
| 14) | −2070.936 | 1.200 | 1.496997 | 81.61 |
| 15) | 46.571 | D15 | | |
| 16) | −370.106 | 2.907 | 1.487490 | 70.32 |
| 17) | −72.395 | 1.500 | | |
| 18) | 178.417 | 3.000 | 1.737999 | 32.33 |
| 19) | −91.168 | 1.100 | 1.593190 | 67.90 |
| 20) | 49.487 | 2.200 | | |
| 21) | −130.831 | 1.100 | 1.593490 | 67.00 |
| 22) | 65.238 | 2.000 | | |
| 23) | 47.376 | 9.008 | 1.579570 | 53.74 |
| 24) | −30.682 | 1.400 | 1.593190 | 67.90 |
| 25) | −219.958 | 2.409 | | |
| 26) | 72.361 | 1.400 | 1.922860 | 20.88 |
| 27) | 26.665 | 6.906 | 1.720467 | 34.71 |
| 28) | 352.438 | 3.947 | | |
| 29) | −84.126 | 1.400 | 1.816000 | 46.59 |
| 30) | 35.011 | 5.000 | 1.737999 | 32.33 |
| 31) | 83.719 | 2.000 | | |
| 32) | 67.601 | 5.368 | 1.801000 | 34.92 |
| 33) | −179.297 | Bf | | |

[Focal length data of groups]

| Groups | Starting surfaces | Focal lengths |
|---|---|---|
| G1 | 1 | 168.518 |
| G1A | 1 | 161.845 |
| G1B | 5 | −1807.658 |
| GF | 14 | −91.627 |
| GR | 16 | 1823.408 |

[Variable distance data]

| | At focusing on infinity | At focusing on a nearby object |
|---|---|---|
| D13 | 6.480 | 23.792 |
| D15 | 24.107 | 6.795 |

FIG. 4 shows aberrations of the optical system of the second example focusing on an object at infinity.

The graphs of aberrations suggest that the optical system of the present example effectively reduces variations in aberrations at focusing and has high optical performance.

Third Example

Figure 5A:
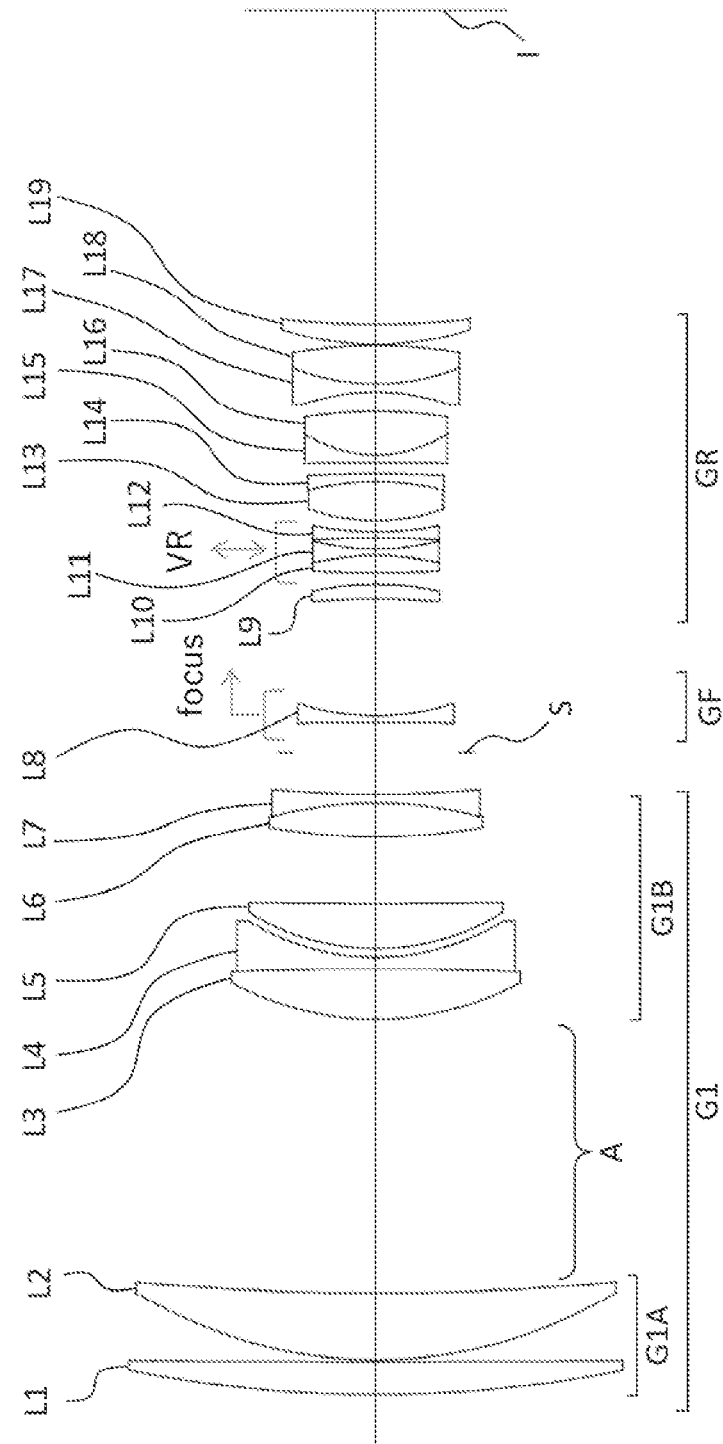
FIG. 5A is a cross-sectional view of an optical system of a third example focusing on an object at infinity.
Figure 5B:
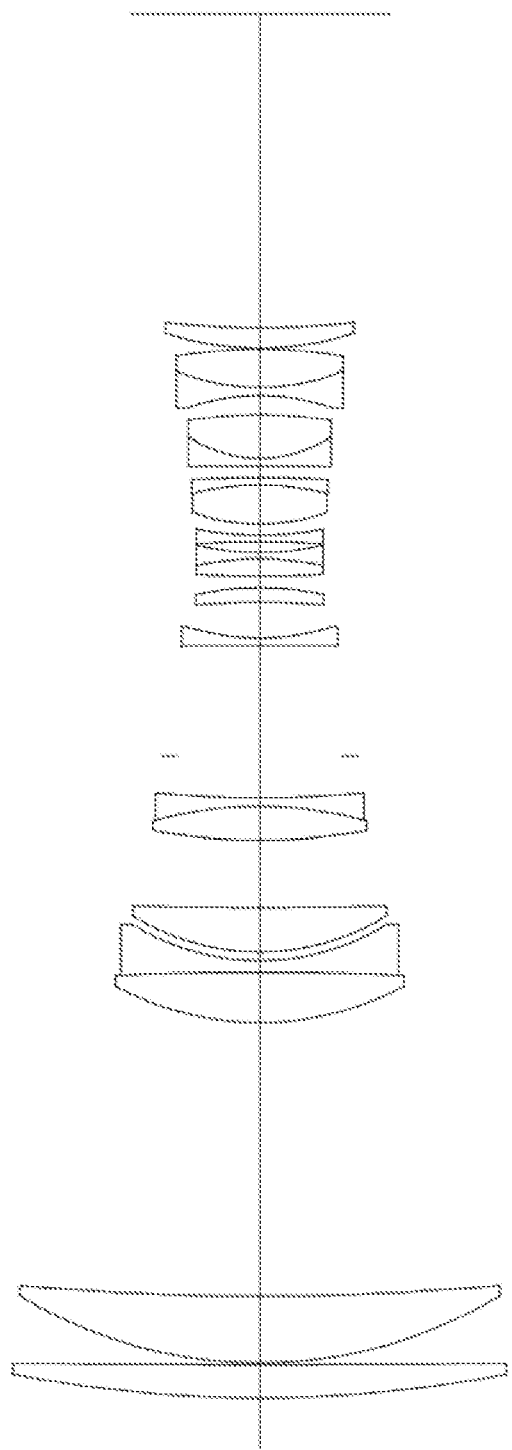
FIG. 5B is a cross-sectional view of the optical system of the third example focusing on a nearby object.

FIG. 5A is a cross-sectional view of an optical system of a third example focusing on an object at infinity. FIG. 5B is a cross-sectional view of the optical system of the third example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A and the first-B lens group G1B is disposed on the image side of the air space A.

The first-A lens group G1A includes a positive meniscus lens L1 convex on the object side, and a positive meniscus lens L2 convex on the object side, in order from the object side.

The first-B lens group G1B includes a negative cemented lens composed of a biconvex positive lens L3 and a biconcave negative lens L4; a positive meniscus lens L5 convex on the object side; and a positive cemented lens composed of a biconvex positive lens L6 and a biconcave negative lens L7, in order from the object side.

The focusing group GF includes a biconcave negative lens L8.

The rear group GR includes a positive meniscus lens L9 convex on the image side; a negative cemented lens composed of a biconvex positive lens L10 and a biconcave negative lens L11; a biconcave negative lens L12; a positive cemented lens composed of a biconvex positive lens L13 and a negative meniscus lens L14 convex on the image side; a negative cemented lens composed of a biconcave negative lens L15 and a biconvex positive lens L16; a negative cemented lens composed of a biconcave negative lens L17 and a biconvex positive lens L18; and a positive meniscus lens L19 convex on the object side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L10 and the negative lens L11 and the negative lens L12, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens, and the positive meniscus lens L2 corresponds to the second lens. In the optical system of the present example, the negative lens L4 corresponds to the negative lens N, and the positive lens L6 corresponds to the positive lens Z.

In the optical system of the present example, dA is the distance on the optical axis between the image-side surface of the positive meniscus lens L2 and the object-side surface of the positive lens L3. dG1 is the distance on the optical axis between the object-side surface of the positive meniscus lens L1 and the image-side surface of the negative lens L7. dB is the distance on the optical axis between the object-side surface of the positive meniscus lens L1 and the object-side surface of the positive lens L3. dN is the distance on the optical axis between the object-side surface of the positive meniscus lens L1 and the object-side surface of the negative lens L4.

Table 3 below shows specifications of the optical system of the present example.

TABLE 3

[General specifications]

| | |
|---|---|
| f | 390.00 |
| Fno | 4.60 |
| Bf | 55.218 |
| image height | 21.700 |
| TL | 243.435 |
| 2ω | 6.30 |

[Lens specifications]

| m | r | d | nd | νd |
|---|---|---|---|---|
| 1) | 221.433 | 5.870 | 1.537750 | 74.70 |
| 2) | 4228.581 | 0.300 | | |
| 3) | 81.234 | 11.748 | 1.437001 | 95.10 |
| 4) | 472.777 | 48.082 | | |
| 5) | 53.231 | 8.876 | 1.437001 | 95.10 |
| 6) | −626.318 | 2.000 | 1.900430 | 37.37 |
| 7) | 42.149 | 1.500 | | |
| 8) | 41.831 | 7.935 | 1.437001 | 95.10 |
| 9) | 1105.379 | 11.821 | | |
| 10) | 109.247 | 5.876 | 1.663820 | 27.35 |
| 11) | −70.652 | 1.500 | 1.672999 | 38.26 |
| 12) | 195.927 | 7.351 | | |
| 13>) | ∞ | D13 | (aperture stop) | |
| 14) | −1280.351 | 1.200 | 1.496997 | 81.61 |
| 15) | 43.128 | D15 | | |
| 16) | −115.551 | 2.531 | 1.487490 | 70.32 |
| 17) | −51.834 | 2.000 | | |
| 18) | 184.433 | 3.000 | 1.647690 | 33.72 |
| 19) | −50.330 | 1.100 | 1.593190 | 67.90 |
| 20) | 44.097 | 2.000 | | |
| 21) | −159.759 | 1.100 | 1.593490 | 67.00 |
| 22) | 56.912 | 2.000 | | |
| 23) | 35.605 | 6.762 | 1.737999 | 32.33 |
| 24) | −45.880 | 1.400 | 1.763850 | 48.49 |
| 25) | −190.397 | 2.000 | | |
| 26) | −742.135 | 1.400 | 1.922860 | 20.88 |
| 27) | 23.106 | 7.608 | 1.620040 | 36.40 |
| 28) | −75.897 | 3.414 | | |
| 29) | −37.788 | 1.400 | 1.763850 | 48.49 |
| 30) | 38.546 | 6.695 | 1.737999 | 32.33 |
| 31) | −86.210 | 0.200 | | |
| 32) | 52.571 | 3.600 | 1.581440 | 40.98 |
| 33) | 147.363 | Bf | | |

[Focal length data of groups]

| Groups | Starting surfaces | Focal lengths |
|---|---|---|
| G1 | 1 | 150.216 |
| G1A | 1 | 147.690 |
| G1B | 5 | −2684.159 |
| GF | 14 | −89.923 |
| GR | 16 | −443.717 |

[Variable distance data]

| | At focusing on infinity | At focusing on a nearby object |
|---|---|---|
| D13 | 5.381 | 19.508 |
| D15 | 20.568 | 6.440 |

Figure 6:
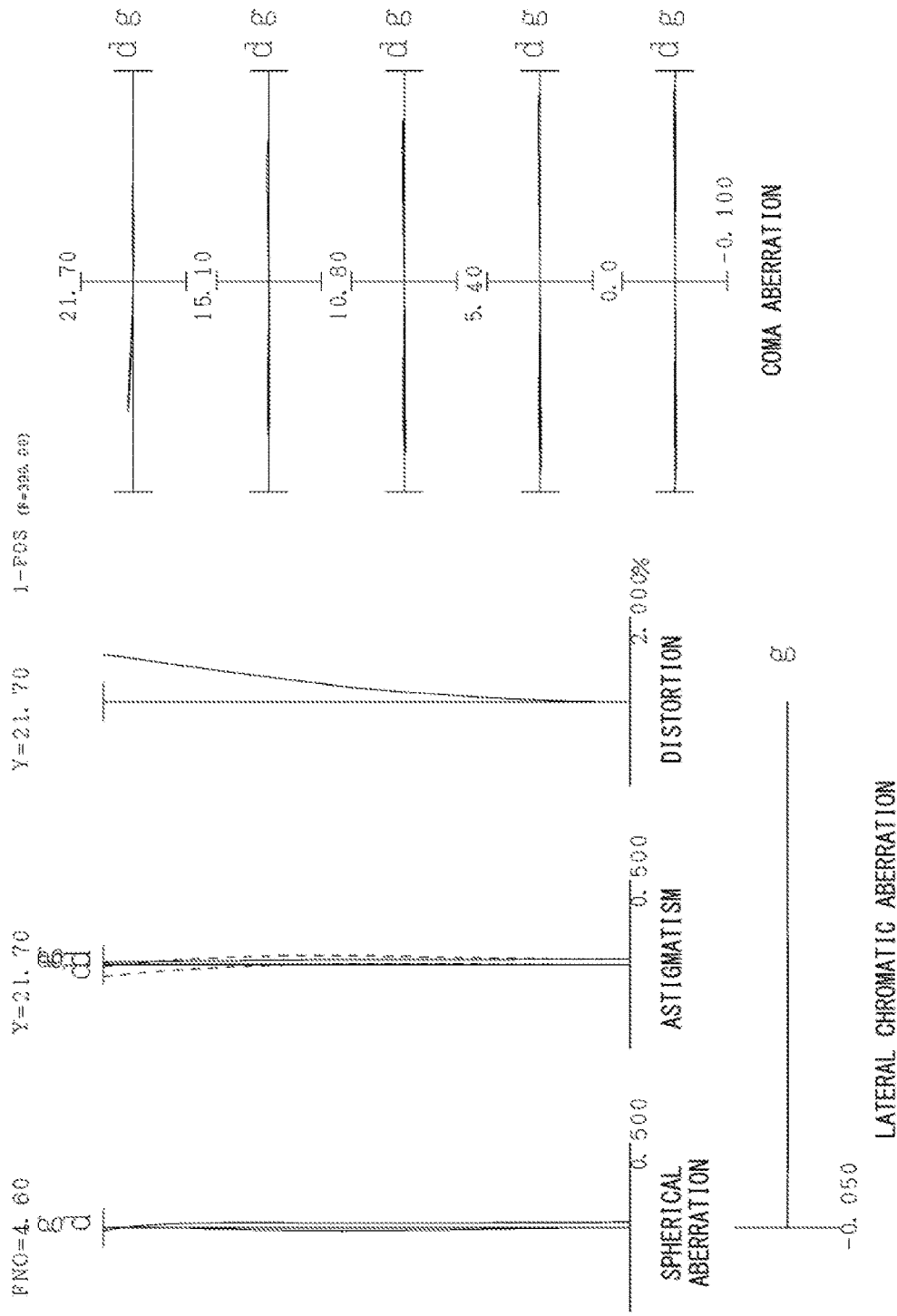
FIG. 6 shows aberrations of the optical system of the third example focusing on an object at infinity.

FIG. 6 shows aberrations of the optical system of the third example focusing on an object at infinity.

The graphs of aberrations suggest that the optical system of the present example effectively reduces variations in aberrations at focusing and has high optical performance.

Fourth Example

Figure 7A:
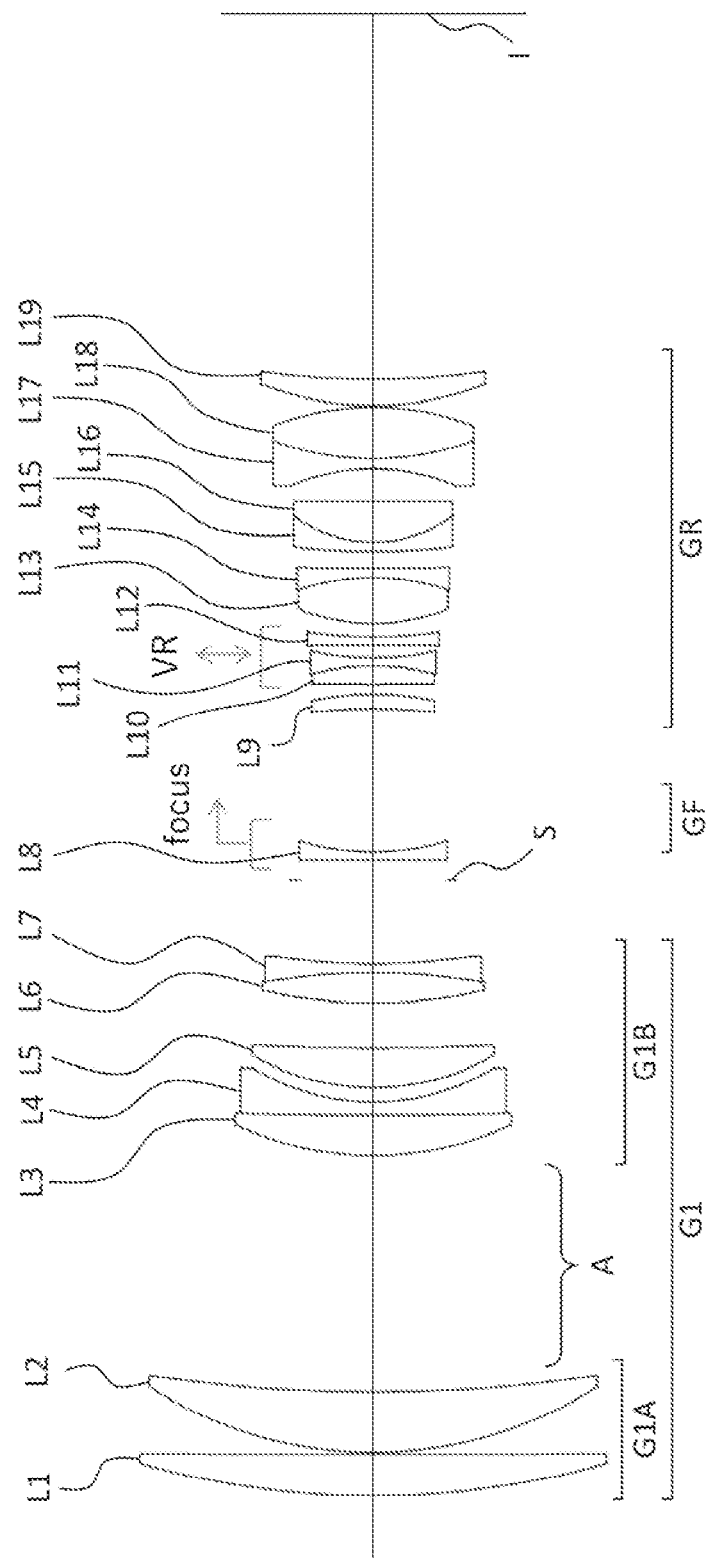
FIG. 7A is a cross-sectional view of an optical system of a fourth example focusing on an object at infinity.
Figure 7B:
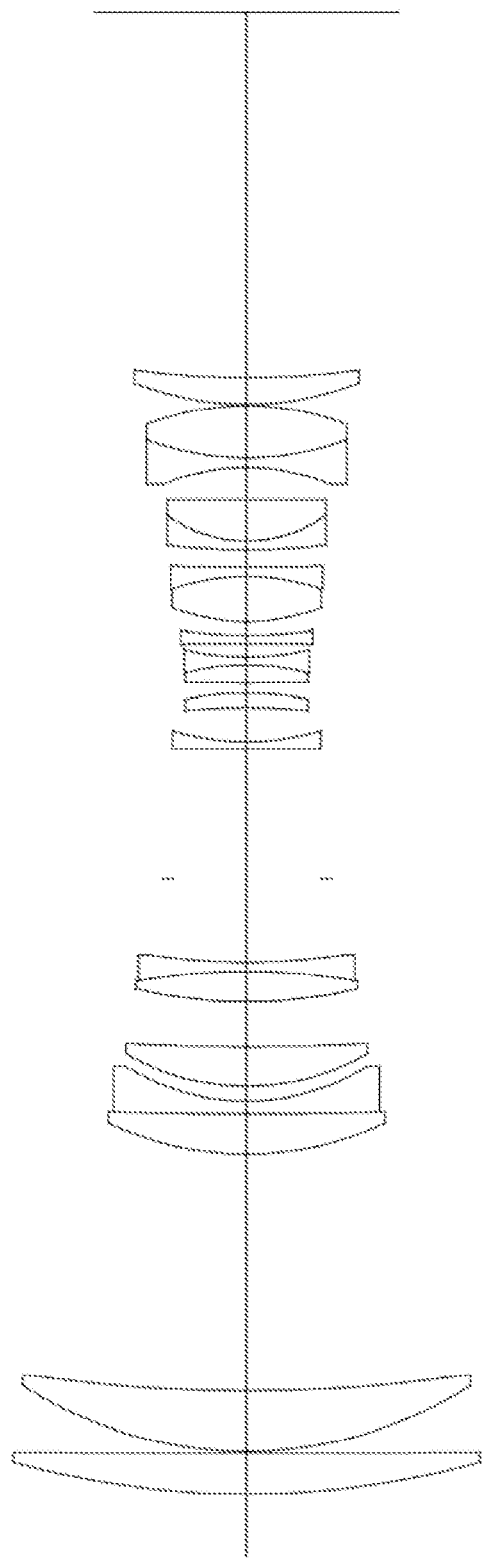
FIG. 7B is a cross-sectional view of the optical system of the fourth example focusing on a nearby object.

FIG. 7A is a cross-sectional view of an optical system of a fourth example focusing on an object at infinity. FIG. 7B is a cross-sectional view of the optical system of the fourth example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A and the first-B lens group G1B is disposed on the image side of the air space A.

The first-A lens group G1A includes a positive meniscus lens L1 convex on the object side, and a positive meniscus lens L2 convex on the object side, in order from the object side.

The first-B lens group G1B includes a negative cemented lens composed of a positive meniscus lens L3 convex on the object side and a negative meniscus lens L4 convex on the object side; a positive meniscus lens L5 convex on the object side; and a positive cemented lens composed of a biconvex positive lens L6 and a biconcave negative lens L7, in order from the object side.

The focusing group GF includes a negative meniscus lens L8 convex on the object side.

The rear group GR includes a positive meniscus lens L9 convex on the image side; a negative cemented lens composed of a biconvex positive lens L10 and a biconcave negative lens L11; a biconcave negative lens L12; a positive cemented lens composed of a biconvex positive lens L13 and a biconcave negative lens L14; a negative cemented lens composed of a negative meniscus lens L15 convex on the object side and a biconvex positive lens L16; a negative cemented lens composed of a biconcave negative lens L17 and a biconvex positive lens L18; and a positive meniscus lens L19 convex on the object side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L10 and the negative lens L11 and the negative lens L12, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens, and the positive meniscus lens L2 corresponds to the second lens. In the optical system of the present example, the negative meniscus lens L4 corresponds to the negative lens N, and the positive lens L6 corresponds to the positive lens Z.

In the optical system of the present example, dA is the distance on the optical axis between the image-side surface of the positive meniscus lens L2 and the object-side surface of the positive meniscus lens L3. dG1 is the distance on the optical axis between the object-side surface of the positive meniscus lens L1 and the image-side surface of the negative lens L7. dB is the distance on the optical axis between the object-side surface of the positive meniscus lens L1 and the object-side surface of the positive meniscus lens L3. dN is the distance on the optical axis between the object-side surface of the positive meniscus lens L1 and the object-side surface of the negative meniscus lens L4.

Table 4 below shows specifications of the optical system of the present example.

TABLE 4

[General specifications]

| | |
|---|---|
| f | 390.00 |
| Fno | 5.77 |
| Bf | 54.579 |
| image height | 21.700 |
| TL | 221.435 |
| 2ω | 6.35 |

[Lens specifications]

| m | r | d | nd | νd |
|---|---|---|---|---|
| 1) | 129.411 | 6.119 | 1.497000 | 81.61 |
| 2) | 4105.548 | 0.300 | | |
| 3) | 61.730 | 9.074 | 1.437000 | 95.00 |
| 4) | 230.361 | 35.312 | | |
| 5) | 48.186 | 5.994 | 1.437000 | 95.00 |
| 6) | 581.000 | 2.000 | 1.902650 | 35.73 |
| 7) | 34.413 | 2.138 | | |
| 8) | 35.952 | 5.925 | 1.437000 | 95.00 |
| 9) | 353.395 | 6.718 | | |
| 10) | 70.865 | 4.563 | 1.663820 | 27.35 |
| 11) | −93.974 | 1.300 | 1.785900 | 44.17 |
| 12) | 95.404 | 12.499 | | |
| 13> | ∞ | D13 | (aperture stop) | |
| 14) | 9370.670 | 1.200 | 1.497000 | 81.61 |
| 15) | 37.965 | D15 | | |
| 16) | −85.435 | 2.194 | 1.487490 | 70.31 |
| 17) | −44.298 | 1.500 | | |
| 18) | 442.035 | 2.700 | 1.595509 | 39.24 |
| 19) | −37.068 | 1.200 | 1.593190 | 67.90 |
| 20) | 43.657 | 2.000 | | |
| 21) | −387.508 | 1.200 | 1.593490 | 67.00 |
| 22) | 68.415 | 2.000 | | |
| 23) | 30.027 | 6.830 | 1.581440 | 40.98 |
| 24) | −33.765 | 1.400 | 1.593190 | 67.90 |
| 25) | 639.490 | 2.500 | | |
| 26) | 97.030 | 1.400 | 1.922860 | 20.88 |
| 27) | 20.045 | 6.147 | 1.620040 | 36.40 |
| 28) | −13075.855 | 4.849 | | |
| 29) | −31.154 | 1.400 | 1.816000 | 46.59 |
| 30) | 42.152 | 7.769 | 1.738000 | 32.26 |
| 31) | −42.051 | 0.200 | | |
| 32) | 45.857 | 4.009 | 1.603420 | 38.03 |
| 33) | 125.000 | Bf | | |

[Focal length data of groups]

| Groups | Starting surfaces | Focal lengths |
|---|---|---|
| G1 | 1 | 141.309 |
| G1A | 1 | 111.803 |
| G1B | 5 | −226.733 |
| GF | 14 | −76.703 |
| GR | 16 | −741.023 |

[Variable distance data]

| | At focusing on infinity | At focusing on a nearby object |
|---|---|---|
| D13 | 3.000 | 19.346 |
| D15 | 21.414 | 5.069 |

Figure 8:
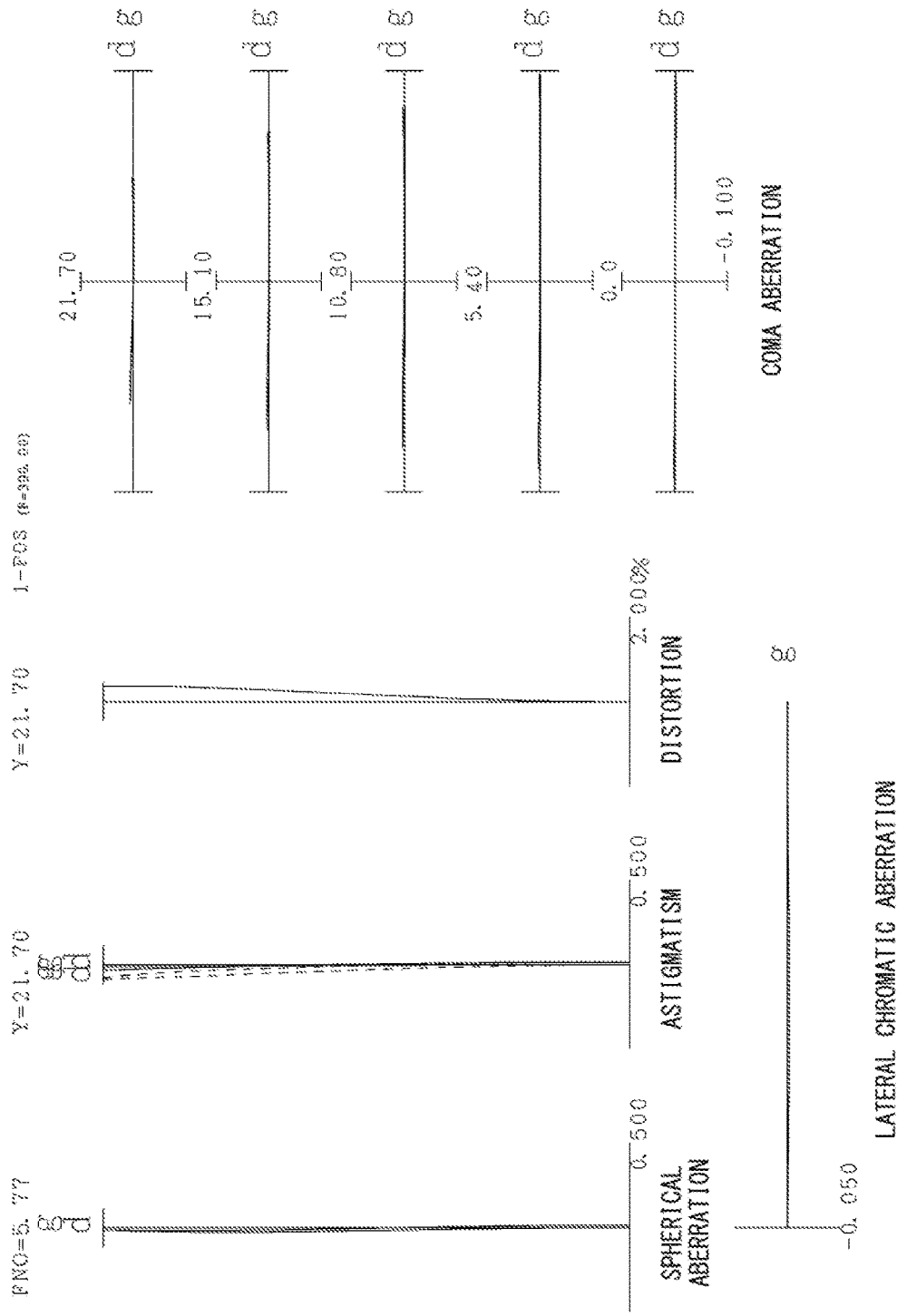
FIG. 8 shows aberrations of the optical system of the fourth example focusing on an object at infinity.

FIG. 8 shows aberrations of the optical system of the fourth example focusing on an object at infinity.

The graphs of aberrations suggest that the optical system of the present example effectively reduces variations in aberrations at focusing and has high optical performance.

Fifth Example

Figure 9A:
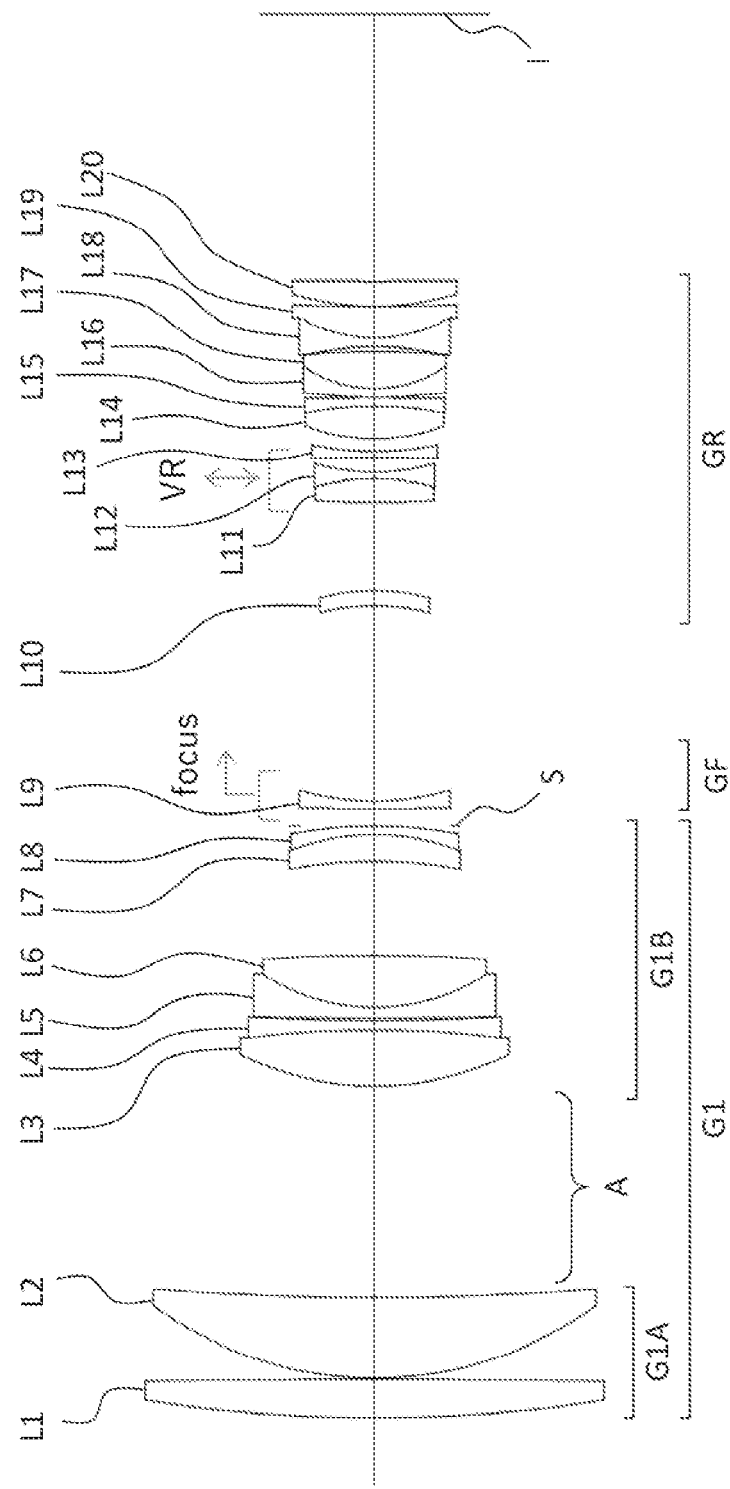
FIG. 9A is a cross-sectional view of an optical system of a fifth example focusing on an object at infinity.
Figure 9B:
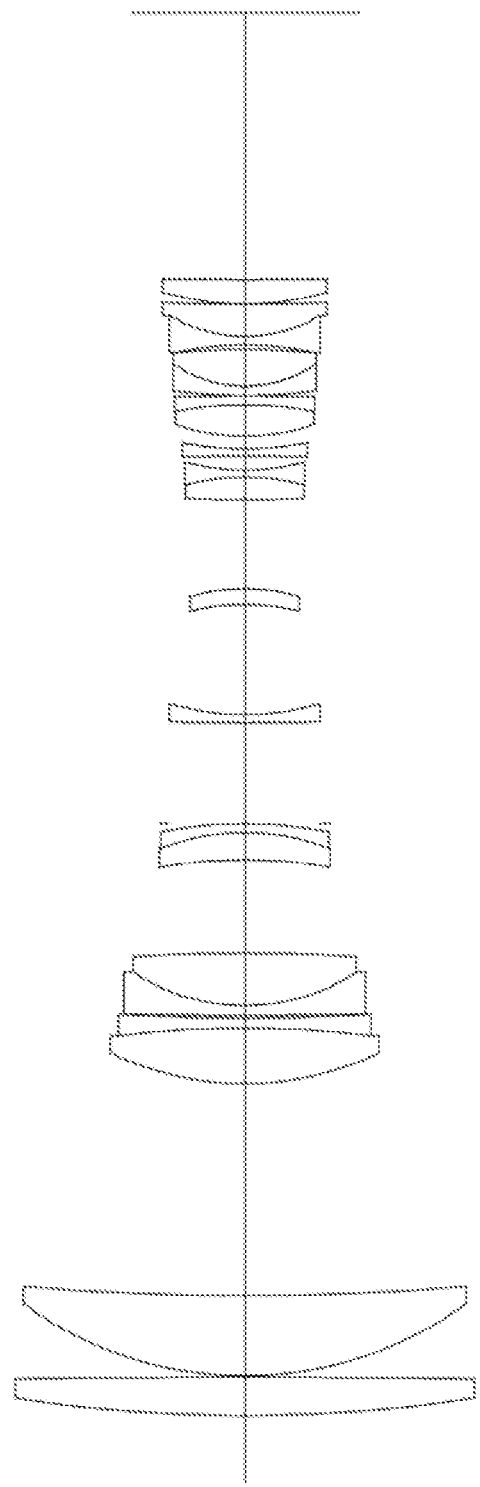
FIG. 9B is a cross-sectional view of the optical system of the fifth example focusing on a nearby object.

FIG. 9A is a cross-sectional view of an optical system of a fifth example focusing on an object at infinity. FIG. 9B is a cross-sectional view of the optical system of the fifth example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power separated by the largest air space A in the first lens group; the first-A lens group G1A is disposed on the object side of the air space A and the first-B lens group G1B is disposed on the image side of the air space A.

The first-A lens group G1A includes a biconvex positive lens L1 and a positive meniscus lens L2 convex on the object side, in order from the object side.

The first-B lens group G1B includes a positive cemented lens composed of a biconvex positive lens L3 and a biconcave negative lens L4; a negative cemented lens composed of a negative meniscus lens L5 convex on the object side and a biconvex positive lens L6; and a positive cemented lens composed of a positive meniscus lens L7 convex on the image side and a negative meniscus lens L8 convex on the image side, in order from the object side.

The focusing group GF includes a negative meniscus lens L9 convex on the object side.

The rear group GR includes a positive meniscus lens L10 convex on the image side; a negative cemented lens composed of a biconvex positive lens L11 and a biconcave negative lens L12; a biconcave negative lens L13; a positive cemented lens composed of a biconvex positive lens L14 and a negative meniscus lens L15 convex on the image side; a positive cemented lens composed of a negative meniscus lens L16 convex on the object side and a biconvex positive lens L17; a negative cemented lens composed of a biconcave negative lens L18 and a positive meniscus lens L19 convex on the object side; and a positive meniscus lens L20 convex on the object side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L11 and the negative lens L12 and the negative lens L13, which are lenses included in the rear group GR, are configured as a vibration reduction lens group movable so that movement has a component in a direction perpendicular to the optical axis to correct an image blur.

In the optical system of the present example, the positive lens L1 corresponds to the first lens, and the positive meniscus lens L2 corresponds to the second lens. In the optical system of the present example, the negative lens L4 corresponds to the negative lens N, and the positive meniscus lens L7 corresponds to the positive lens Z.

In the optical system of the present example, dA is the distance on the optical axis between the image-side surface of the positive meniscus lens L2 and the object-side surface of the positive lens L3. dG1 is the distance on the optical axis between the object-side surface of the positive lens L1 and the image-side surface of the negative meniscus lens L8. dB is the distance on the optical axis between the object-side surface of the positive lens L1 and the object-side surface of the positive lens L3. dN is the distance on the optical axis between the object-side surface of the positive lens L1 and the object-side surface of the negative lens L4.

Table 5 below shows specifications of the optical system of the present example.

TABLE 5

[General specifications]

| | |
|---|---|
| f | 489.98 |
| Fno | 5.77 |
| Bf | 53.163 |
| image height | 21.700 |
| TL | 270.475 |
| 2ω | 5.05 |

[Lens specifications]

| m | r | d | nd | vd |
|---|---|---|---|---|
| 1) | 301.516 | 7.653 | 1.518600 | 69.89 |
| 2) | −2994.078 | 0.248 | | |
| 3) | 74.588 | 16.015 | 1.433837 | 95.16 |
| 4) | 529.942 | 42.196 | | |
| 5) | 60.571 | 11.051 | 1.437001 | 95.10 |
| 6) | −204.604 | 2.000 | 1.816000 | 46.59 |
| 7) | 358.323 | 0.509 | | |
| 8) | 1130.257 | 2.000 | 1.816000 | 46.59 |
| 9) | 40.518 | 10.429 | 1.437001 | 95.10 |
| 10) | −366.911 | 18.665 | | |
| 11) | −92.650 | 5.315 | 1.663820 | 27.35 |
| 12) | −46.744 | 1.750 | 1.612660 | 44.46 |
| 13) | −89.781 | 0.100 | | |
| 14> | ∞ | D14 | (aperture stop) | |
| 15) | 546.830 | 1.500 | 1.496997 | 81.61 |
| 16) | 50.544 | D16 | | |
| 17) | −43.675 | 3.106 | 1.487490 | 70.32 |
| 18) | −39.919 | 17.617 | | |
| 19) | 196.739 | 4.641 | 1.603420 | 38.03 |
| 20) | −46.252 | 1.375 | 1.593190 | 67.90 |
| 21) | 44.844 | 2.750 | | |
| 22) | −2713.065 | 1.375 | 1.593490 | 67.00 |
| 23) | 63.562 | 2.500 | | |
| 24) | 38.733 | 6.368 | 1.581440 | 40.98 |
| 25) | −73.473 | 1.750 | 1.593190 | 67.90 |
| 26) | −1339.601 | 0.100 | | |
| 27) | 112.830 | 1.750 | 1.922860 | 20.88 |
| 28) | 24.865 | 7.420 | 1.737999 | 32.33 |
| 29) | −148.051 | 0.889 | | |

TABLE 5-continued

| 30) | −62.799 | 1.750 | 1.816000 | 46.59 |
|---|---|---|---|---|
| 31) | 29.752 | 6.237 | 1.737999 | 32.33 |
| 32) | 306.380 | 0.100 | | |
| 33) | 56.901 | 4.936 | 1.603420 | 38.03 |
| 34) | 1041.086 | Bf | | |

[Focal length data of groups]

| Groups | Starting surfaces | Focal lengths |
|---|---|---|
| G1 | 1 | 178.023 |
| G1A | 1 | 144.638 |
| G1B | 5 | −410.279 |
| GF | 15 | −112.168 |
| GR | 17 | −261.402 |

[Variable distance data]

| | At focusing on infinity | At focusing on a nearby object |
|---|---|---|
| D14 | 3.286 | 20.151 |
| D16 | 38.932 | 22.067 |

Figure 10:
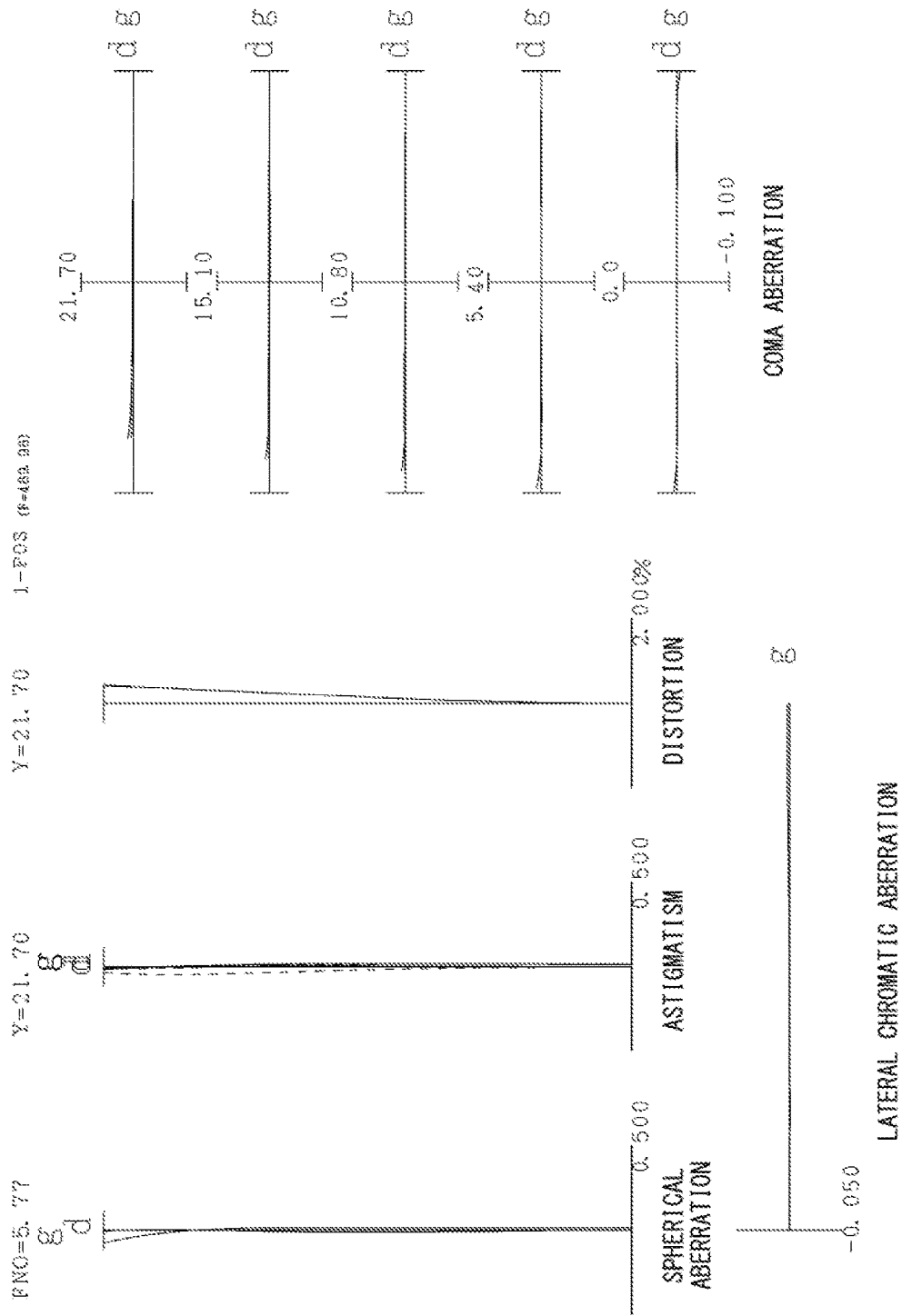
FIG. 10 shows aberrations of the optical system of the fifth example focusing on an object at infinity.

FIG. 10 shows aberrations of the optical system of the fifth example focusing on an object at infinity.

The graphs of aberrations suggest that the optical system of the present example effectively reduces variations in aberrations at focusing and has high optical performance.

Sixth Example

Figure 11A:
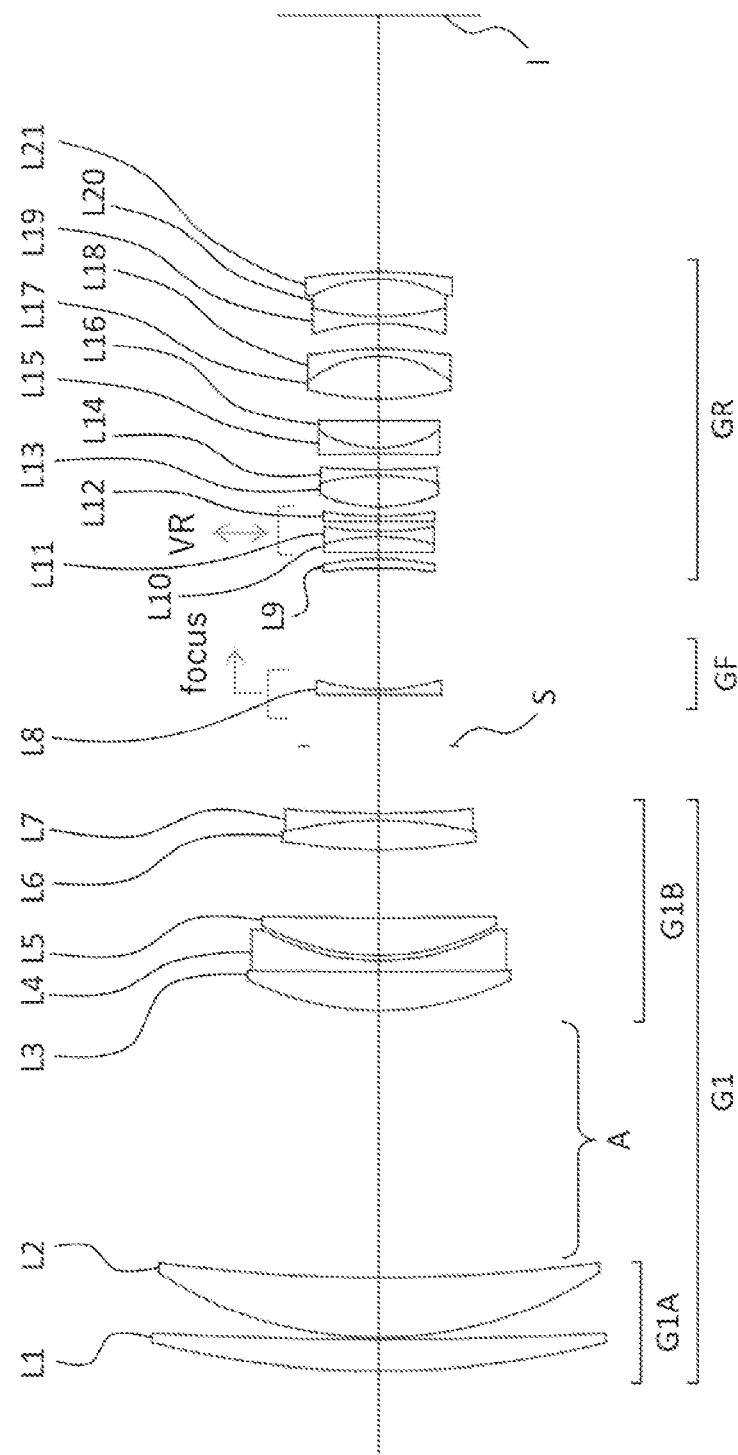
FIG. 11A is a cross-sectional view of an optical system of a sixth example focusing on an object at infinity.
Figure 11B:
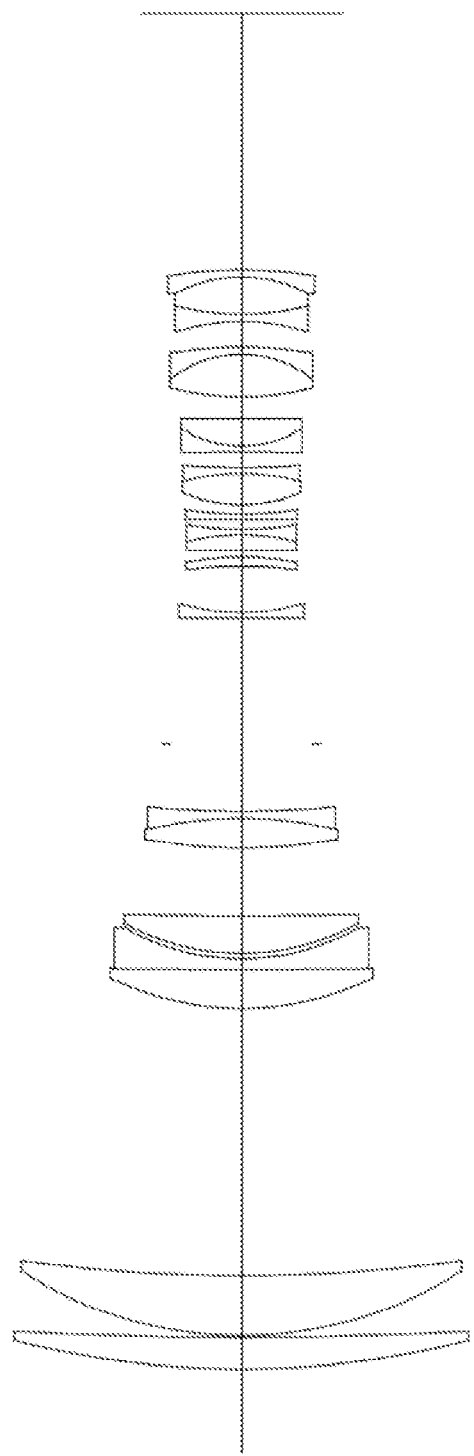
FIG. 11B is a cross-sectional view of the optical system of the sixth example focusing on a nearby object.

FIG. 11A is a cross-sectional view of an optical system of a sixth example focusing on an object at infinity. FIG. 11B is a cross-sectional view of the optical system of the sixth example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power separated by the largest air space A in the first lens group; the first-A lens group G1A is disposed on the object side of the air space A and the first-B lens group G1B is disposed on the image side of the air space A.

The first-A lens group G1A includes a positive meniscus lens L1 convex on the object side, and a positive meniscus lens L2 convex on the object side, in order from the object side.

The first-B lens group G1B includes a negative cemented lens composed of a positive meniscus lens L3 convex on the object side and a negative meniscus lens L4 convex on the object side; a positive meniscus lens L5 convex on the object side; and a positive cemented lens composed of a biconvex positive lens L6 and a biconcave negative lens L7, in order from the object side.

The focusing group GF includes a biconcave negative lens L8.

The rear group GR includes a positive meniscus lens L9 convex on the image side; a negative cemented lens composed of a positive meniscus lens L10 convex on the image side and a biconcave negative lens L11; a biconcave negative lens L12; a positive cemented lens composed of a biconvex positive lens L13 and a biconcave negative lens L14; a negative cemented lens composed of a biconcave negative lens L15 and a biconvex positive lens L16; a positive cemented lens composed of a biconvex positive lens L17 and a negative meniscus lens L18 convex on the image side; and a negative cemented lens composed of a biconcave negative lens L19, a biconvex positive lens L20, and a negative meniscus lens L21 convex on the image side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive meniscus lens L10 and the negative lens L11 and the negative lens L12, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens, and the positive meniscus lens L2 corresponds to the second lens. In the optical system of the present example, the negative meniscus lens L4 corresponds to the negative lens N, and the positive lens L6 corresponds to the positive lens Z.

In the optical system of the present example, dA is the distance on the optical axis between the image-side surface of the positive meniscus lens L2 and the object-side surface of the positive meniscus lens L3. dG1 is the distance on the optical axis between the object-side surface of the positive meniscus lens L1 and the image-side surface of the negative lens L7. dB is the distance on the optical axis between the object-side surface of the positive meniscus lens L1 and the object-side surface of the positive meniscus lens L3. dN is the distance on the optical axis between the object-side surface of the positive meniscus lens L1 and the object-side surface of the negative meniscus lens L4.

Table 6 below shows specifications of the optical system of the present example.

TABLE 6

[General specifications]

| | |
|---|---|
| f | 582.00 |
| Fno | 5.80 |
| Bf | 57.650 |
| image height | 21.700 |
| TL | 305.483 |
| 2ω | 4.20 |

[Lens specifications]

| m | r | d | nd | vd |
|---|---|---|---|---|
| 1) | 209.874 | 7.062 | 1.537750 | 74.70 |
| 2) | 952.422 | 0.400 | | |
| 3) | 91.788 | 13.513 | 1.433837 | 95.16 |
| 4) | 361.924 | 60.210 | | |
| 5) | 66.958 | 8.900 | 1.437001 | 95.10 |
| 6) | 1878.152 | 2.300 | 1.902650 | 35.72 |
| 7) | 52.955 | 1.200 | | |
| 8) | 54.318 | 8.485 | 1.437001 | 95.10 |
| 9) | 954.336 | 15.349 | | |
| 10) | 115.853 | 6.613 | 1.663820 | 27.35 |
| 11) | −90.371 | 1.600 | 1.834810 | 42.73 |
| 12) | 221.211 | 15.183 | | |
| 13> | ∞ | D13 | (aperture stop) | |
| 14) | −19374.039 | 1.200 | 1.496997 | 81.61 |
| 15) | 46.568 | D15 | | |
| 16) | −106.679 | 2.037 | 1.487490 | 70.32 |

TABLE 6-continued

| | | | | |
|---|---|---|---|---|
| 17) | −61.741 | 1.500 | | |
| 18) | −2608.847 | 3.600 | 1.612660 | 44.46 |
| 19) | −47.129 | 1.200 | 1.593190 | 67.90 |
| 20) | 69.720 | 2.300 | | |
| 21) | −1020.983 | 1.200 | 1.593490 | 67.00 |
| 22) | 91.287 | 2.000 | | |
| 23) | 33.441 | 7.067 | 1.581440 | 40.98 |
| 24) | −48.899 | 1.400 | 1.593190 | 67.90 |
| 25) | 173.712 | 3.445 | | |
| 26) | −751.444 | 1.400 | 1.922860 | 20.88 |
| 27) | 25.644 | 6.052 | 1.620040 | 36.40 |
| 28) | −1371.263 | 5.043 | | |
| 29) | 65.099 | 9.464 | 1.737999 | 32.33 |
| 30) | −26.310 | 1.600 | 1.638540 | 55.34 |
| 31) | −90.430 | 5.913 | | |
| 32) | −46.530 | 1.600 | 1.883000 | 40.66 |
| 33) | 59.262 | 8.391 | 1.737999 | 32.33 |
| 34) | −30.461 | 1.600 | 1.883000 | 40.66 |
| 35) | −104.675 | Bf | | |

[Focal length data of groups]

| Groups | Starting surfaces | Focal lengths |
|---|---|---|
| G1 | 1 | 206.631 |
| G1A | 1 | 179.755 |
| G1B | 5 | −499.661 |
| GF | 14 | −93.471 |
| GR | 16 | −277.391 |

[Variable distance data]

| | At focusing on infinity | At focusing on a nearby object |
|---|---|---|
| D13 | 11.493 | 28.469 |
| D15 | 27.470 | 10.494 |

Figure 12:
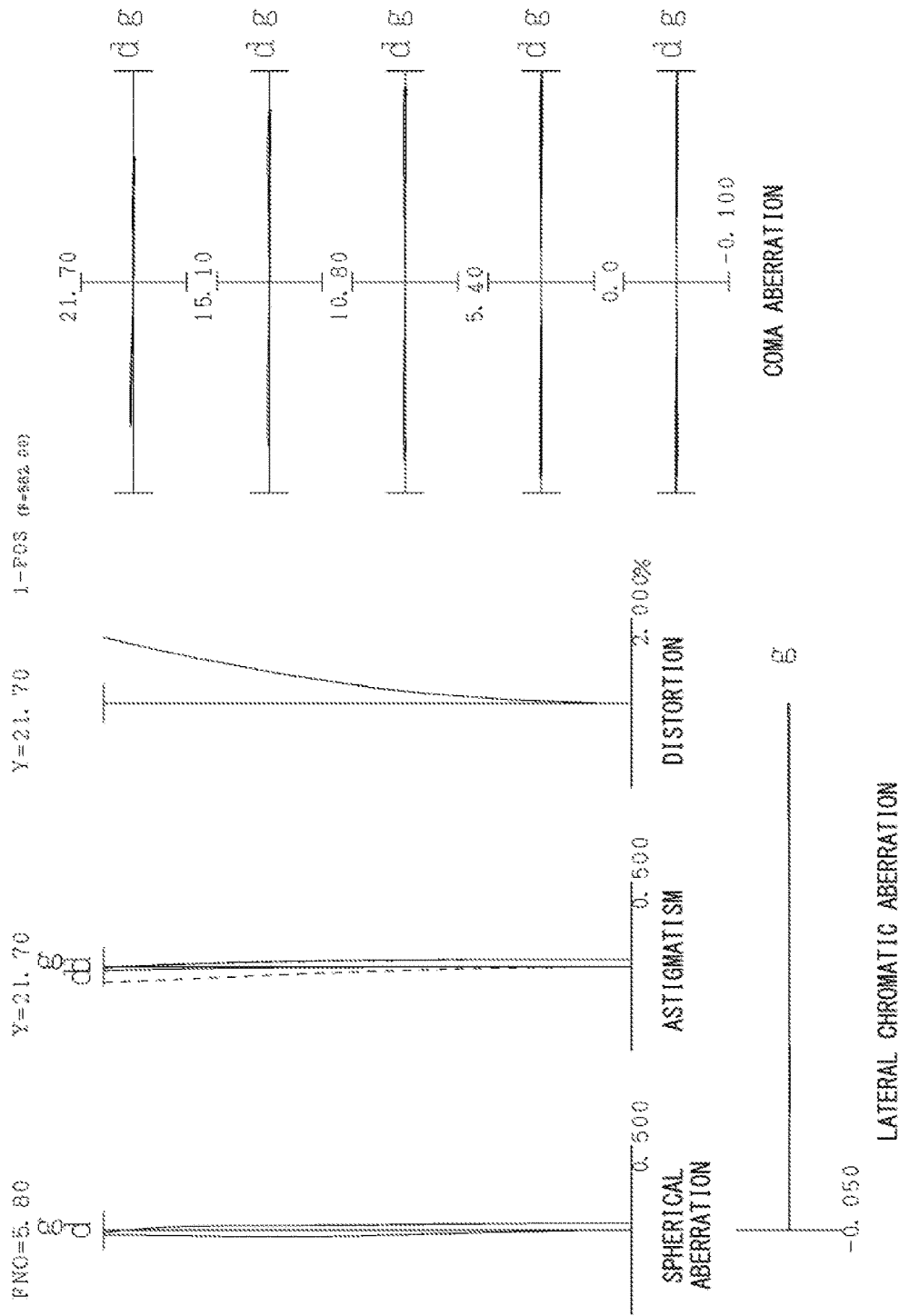
FIG. 12 shows aberrations of the optical system of the sixth example focusing on an object at infinity.

FIG. 12 shows aberrations of the optical system of the sixth example focusing on an object at infinity.

The graphs of aberrations suggest that the optical system of the present example effectively reduces variations in aberrations at focusing and has high optical performance.

Seventh Example

Figure 13A:
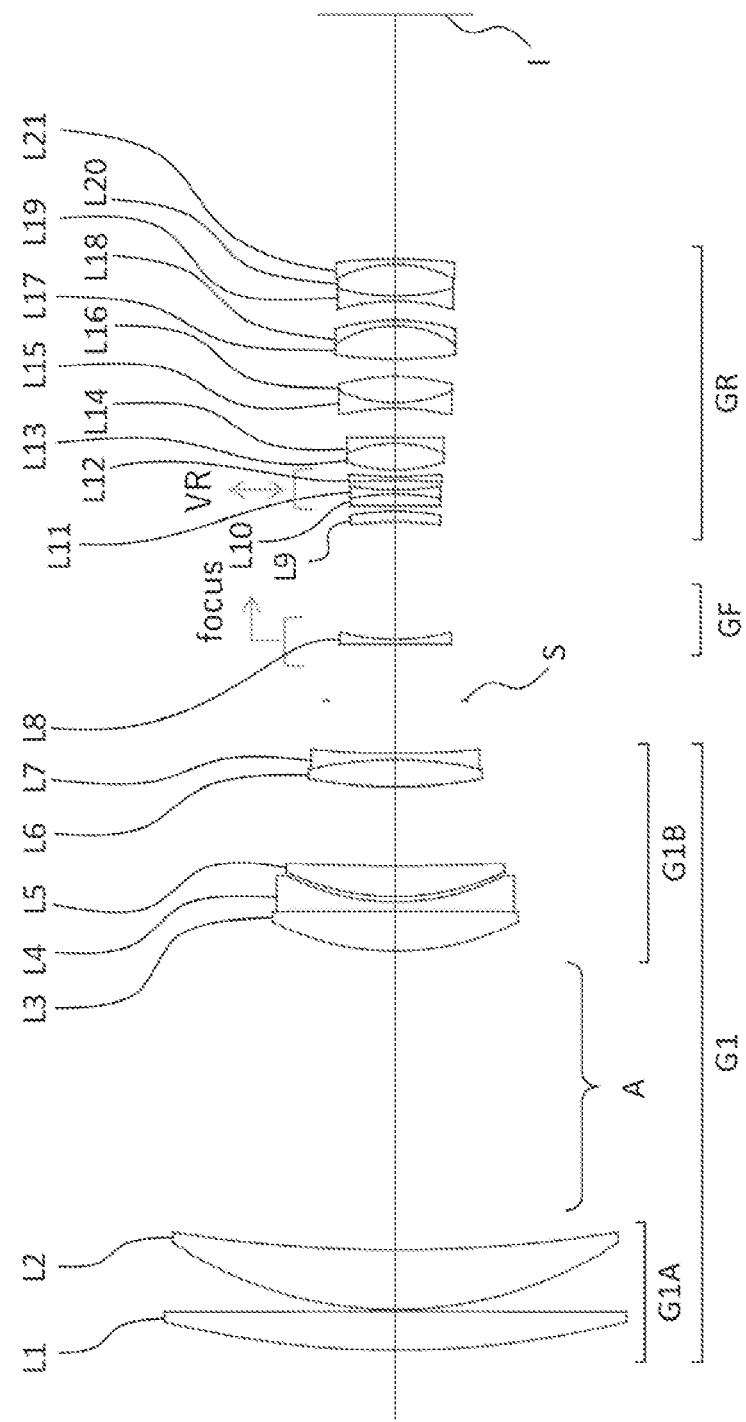
FIG. 13A is a cross-sectional view of an optical system of a seventh example focusing on an object at infinity.
Figure 13B:
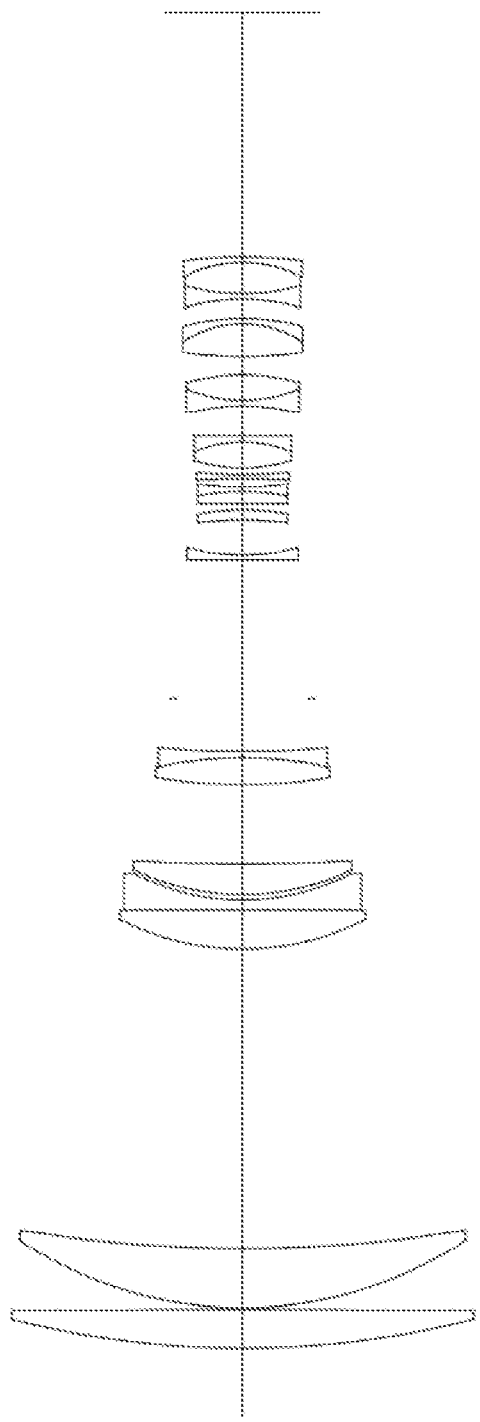
FIG. 13B is a cross-sectional view of the optical system of the seventh example focusing on a nearby object.

FIG. 13A is a cross-sectional view of an optical system of a seventh example focusing on an object at infinity. FIG. 13B is a cross-sectional view of the optical system of the seventh example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A, and the first-B lens group G1B is disposed on the image side of the air space A.

The first-A lens group G1A includes a biconvex positive lens L1 and a positive meniscus lens L2 convex on the object side, in order from the object side.

The first-B lens group G1B includes a negative cemented lens composed of a biconvex positive lens L3 and a biconcave negative lens L4; a positive meniscus lens L5 convex on the object side; and a negative cemented lens composed of a biconvex positive lens L6 and a biconcave negative lens L7, in order from the object side.

The focusing group GF includes a biconcave negative lens L8.

The rear group GR includes a positive meniscus lens L9 convex on the image side; a negative cemented lens composed of a biconvex positive lens L10 and a biconcave negative lens L11; a biconcave negative lens L12; a positive cemented lens composed of a biconvex positive lens L13 and a biconcave negative lens L14; a negative cemented lens composed of a biconcave negative lens L15 and a biconvex positive lens L16; a positive cemented lens composed of a biconvex positive lens L17 and a negative meniscus lens L18 convex on the image side; and a negative cemented lens composed of a biconcave negative lens L19, a biconvex positive lens L20, and a negative meniscus lens L21 convex on the image side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L10 and the negative lens L11 and the negative lens L12, which are lenses included in the rear group GR, are configured as a vibration reduction lens group movable so that movement has a component in a direction perpendicular to the optical axis to correct an image blur.

In the optical system of the present example, the positive lens L1 corresponds to the first lens, and the positive meniscus lens L2 corresponds to the second lens. In the optical system of the present example, the negative lens L4 corresponds to the negative lens N, and the positive lens L6 corresponds to the positive lens Z.

In the optical system of the present example, dA is the distance on the optical axis between the image-side surface of the positive meniscus lens L2 and the object-side surface of the positive lens L3. dG1 is the distance on the optical axis between the object-side surface of the positive lens L1 and the image-side surface of the negative lens L7. dB is the distance on the optical axis between the object-side surface of the positive lens L1 and the object-side surface of the positive lens L3. dN is the distance on the optical axis between the object-side surface of the positive lens L1 and the object-side surface of the negative lens L4.

Table 7 below shows specifications of the optical system of the present example.

TABLE 7

[General specifications]

| | |
|---|---|
| f | 780.00 |
| Fno | 5.80 |
| Bf | 72.401 |
| image height | 21.700 |
| TL | 395.435 |
| 2ω | 3.14 |

[Lens specifications]

| m | r | d | nd | vd |
|---|---|---|---|---|
| 1) | 278.114 | 11.437 | 1.433837 | 95.16 |
| 2) | −9931.397 | 0.536 | | |
| 3) | 118.790 | 17.646 | 1.433837 | 95.16 |
| 4) | 411.233 | 88.454 | | |
| 5) | 80.169 | 11.750 | 1.437001 | 95.10 |
| 6) | −7177.582 | 2.800 | 1.902650 | 35.72 |

TABLE 7-continued

| | | | | |
|---|---|---|---|---|
| 7) | 70.344 | 1.582 | | |
| 8) | 75.393 | 9.074 | 1.437001 | 95.10 |
| 9) | 609.803 | 23.491 | | |
| 10) | 149.143 | 7.987 | 1.663820 | 27.35 |
| 11) | −111.061 | 1.800 | 1.834810 | 42.73 |
| 12) | 276.625 | 15.689 | | |
| 13> | ∞ | D13 | (aperture stop) | |
| 14) | −2132.794 | 1.400 | 1.487490 | 70.32 |
| 15) | 59.025 | D15 | | |
| 16) | −100.905 | 3.000 | 1.552981 | 55.07 |
| 17) | −67.183 | 1.500 | | |
| 18) | 913.713 | 3.800 | 1.581440 | 40.98 |
| 19) | −64.402 | 1.200 | 1.593190 | 67.90 |
| 20) | 77.939 | 2.700 | | |
| 21) | −251.245 | 1.200 | 1.593490 | 67.00 |
| 22) | 144.773 | 2.000 | | |
| 23) | 48.967 | 7.712 | 1.581440 | 40.98 |
| 24) | −36.112 | 1.600 | 1.593190 | 67.90 |
| 25) | 2585.012 | 8.971 | | |
| 26) | −64.468 | 1.600 | 1.922860 | 20.88 |
| 27) | 41.597 | 7.601 | 1.620040 | 36.40 |
| 28) | −60.377 | 5.315 | | |
| 29) | 118.399 | 9.843 | 1.737999 | 32.33 |
| 30) | −31.787 | 1.600 | 1.593490 | 67.00 |
| 31) | −65.797 | 5.539 | | |
| 32) | −61.040 | 1.600 | 1.883000 | 40.66 |
| 33) | 62.377 | 9.440 | 1.737999 | 32.33 |
| 34) | −36.957 | 1.600 | 1.883000 | 40.66 |
| 35) | −146.016 | Bf | | |

[Focal length data of groups]

| Groups | Starting surfaces | Focal lengths |
|---|---|---|
| G1 | 1 | 279.705 |
| G1A | 1 | 236.223 |
| G1B | 5 | −511.433 |
| GF | 14 | −117.794 |
| GR | 16 | −437.474 |

[Variable distance data]

| | At focusing on infinity | At focusing on a nearby object |
|---|---|---|
| D13 | 16.594 | 41.036 |
| D15 | 34.974 | 10.531 |

FIG. 14 shows aberrations of the optical system of the seventh example focusing on an object at infinity.

The graphs of aberrations suggest that the optical system of the present example effectively reduces variations in aberrations at focusing and has high optical performance.

Eighth Example

Figure 15A:
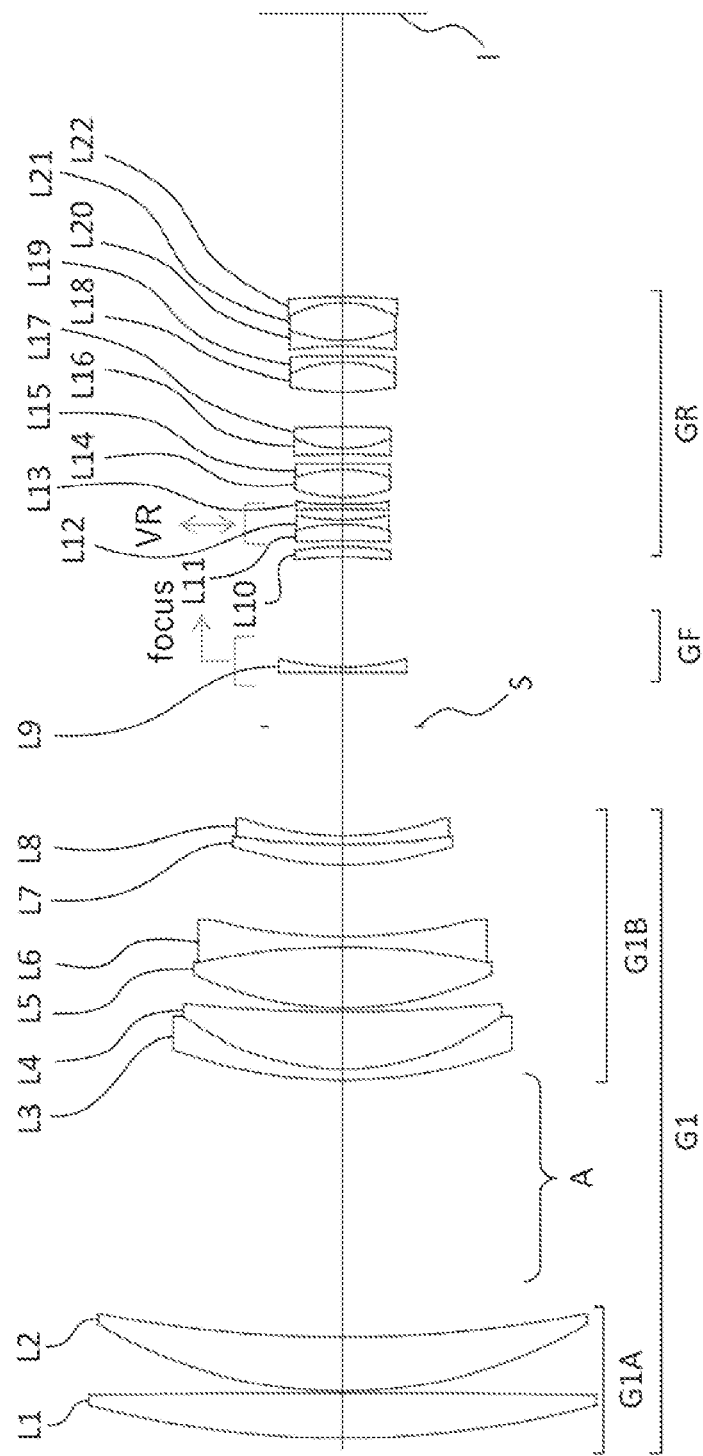
FIG. 15A is a cross-sectional view of an optical system of an eighth example focusing on an object at infinity.
Figure 15B:
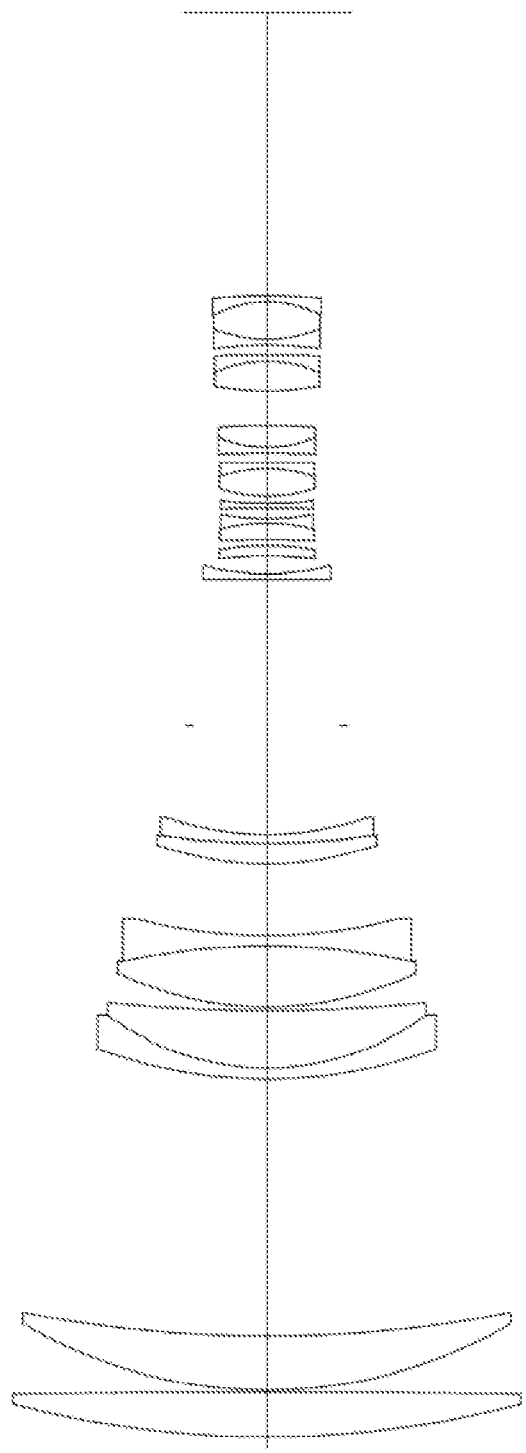
FIG. 15B is a cross-sectional view of the optical system of the eighth example focusing on a nearby object.

FIG. 15A is a cross-sectional view of an optical system of an eighth example focusing on an object at infinity. FIG. 15B is a cross-sectional view of the optical system of the eighth example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A and the first-B lens group G1B is disposed on the image side of the air space A.

The first-A lens group G1A includes a biconvex positive lens L1 and a positive meniscus lens L2 convex on the object side, in order from the object side.

The first-B lens group G1B includes a negative cemented lens composed of a negative meniscus lens L3 convex on the object side and a positive meniscus lens L4 convex on the object side; a positive cemented lens composed of a biconvex positive lens L5 and a biconcave negative lens L6; and a negative cemented lens composed of a positive meniscus lens L7 convex on the object side and a negative meniscus lens L8 convex on the object side, in order from the object side.

The focusing group GF includes a negative meniscus lens L9 convex on the object side.

The rear group GR includes a positive meniscus lens L10 convex on the image side; a negative cemented lens composed of a positive meniscus lens L11 convex on the image side and a biconcave negative lens L12; a biconcave negative lens L13; a positive cemented lens composed of a biconvex positive lens L14 and a biconcave negative lens L15; a negative cemented lens composed of a biconcave negative lens L16 and a biconvex positive lens L17; a positive cemented lens composed of a biconvex positive lens L18 and a negative meniscus lens L19 convex on the image side; and a negative cemented lens composed of a biconcave negative lens L20, a biconvex positive lens L21, and a negative meniscus lens L22 convex on the image side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive meniscus lens L11 and the negative lens L12 and the negative lens L13, which are lenses included in the rear group GR, are configured as a vibration reduction lens group movable so that movement has a component in a direction perpendicular to the optical axis to correct an image blur.

In the optical system of the present example, the positive lens L1 corresponds to the first lens, and the positive meniscus lens L2 corresponds to the second lens. In the optical system of the present example, the negative meniscus lens L3 corresponds to the negative lens N, and the positive meniscus lens L7 corresponds to the positive lens Z.

In the optical system of the present example, dA is the distance on the optical axis between the image-side surface of the positive meniscus lens L2 and the object-side surface of the negative meniscus lens L3. dG1 is the distance on the optical axis between the object-side surface of the positive lens L1 and the image-side surface of the negative meniscus lens L8. dB is the distance on the optical axis between the object-side surface of the positive lens L1 and the object-side surface of the negative meniscus lens L3. dN is the distance on the optical axis between the object-side surface of the positive lens L1 and the object-side surface of the negative meniscus lens L3.

Table 8 below shows specifications of the optical system of the present example.

TABLE 8

[General specifications]

| | |
|---|---|
| f | 779.95 |
| Fno | 5.80 |
| Bf | 76.376 |

TABLE 8-continued

| | |
|---|---|
| image height | 21.700 |
| TL | 383.444 |
| 2ω | 3.14 |

[Lens specifications]

| m | r | d | nd | νd |
|---|---|---|---|---|
| 1) | 267.172 | 12.157 | 1.433837 | 95.16 |
| 2) | −3942.417 | 0.536 | | |
| 3) | 129.878 | 14.435 | 1.433837 | 95.16 |
| 4) | 334.092 | 69.154 | | |
| 5) | 130.441 | 3.000 | 1.883000 | 40.66 |
| 6) | 71.048 | 15.415 | 1.437001 | 95.10 |
| 7) | 408.661 | 1.000 | | |
| 8) | 90.710 | 16.409 | 1.437001 | 95.10 |
| 9) | −185.763 | 2.800 | 1.487490 | 70.32 |
| 10) | 138.066 | 19.365 | | |
| 11) | 88.996 | 5.626 | 1.663820 | 27.35 |
| 12) | 214.056 | 2.100 | 1.883000 | 40.66 |
| 13) | 78.689 | 29.715 | | |
| 14> | ∞ | D14 | (aperture stop) | |
| 15) | 16674.224 | 1.400 | 1.487490 | 70.32 |
| 16) | 64.208 | D16 | | |
| 17) | −116.010 | 3.000 | 1.552981 | 55.07 |
| 18) | −69.086 | 1.500 | | |
| 19) | −644.448 | 4.500 | 1.612660 | 44.46 |
| 20) | −48.050 | 1.200 | 1.593190 | 67.90 |
| 21) | 72.757 | 2.700 | | |
| 22) | −880.699 | 1.200 | 1.593490 | 67.00 |
| 23) | 104.682 | 2.000 | | |
| 24) | 40.326 | 7.576 | 1.581440 | 40.98 |
| 25) | −39.781 | 1.600 | 1.593190 | 67.90 |
| 26) | 960.480 | 2.513 | | |
| 27) | −280.010 | 1.600 | 1.922860 | 20.88 |
| 28) | 34.990 | 5.733 | 1.620040 | 36.40 |
| 29) | −146.116 | 9.399 | | |
| 30) | 73.204 | 7.919 | 1.620040 | 36.40 |
| 31) | −32.773 | 1.600 | 1.593190 | 67.90 |
| 32) | −531.178 | 2.818 | | |
| 33) | −112.016 | 1.600 | 1.883000 | 40.66 |
| 34) | 37.168 | 9.936 | 1.737999 | 32.33 |
| 35) | −32.206 | 1.600 | 1.883000 | 40.66 |
| 36) | −153.819 | Bf | | |

[Focal length data of groups]

| Groups | Starting surfaces | Focal lengths |
|---|---|---|
| G1 | 1 | 271.114 |
| G1A | 1 | 262.482 |
| G1B | 5 | −704.528 |
| GF | 15 | −132.223 |
| GR | 17 | −196.255 |

[Variable distance data]

| | At focusing on infinity | At focusing on a nearby object |
|---|---|---|
| D14 | 14.482 | 39.187 |
| D16 | 29.480 | 4.775 |

Figure 16:
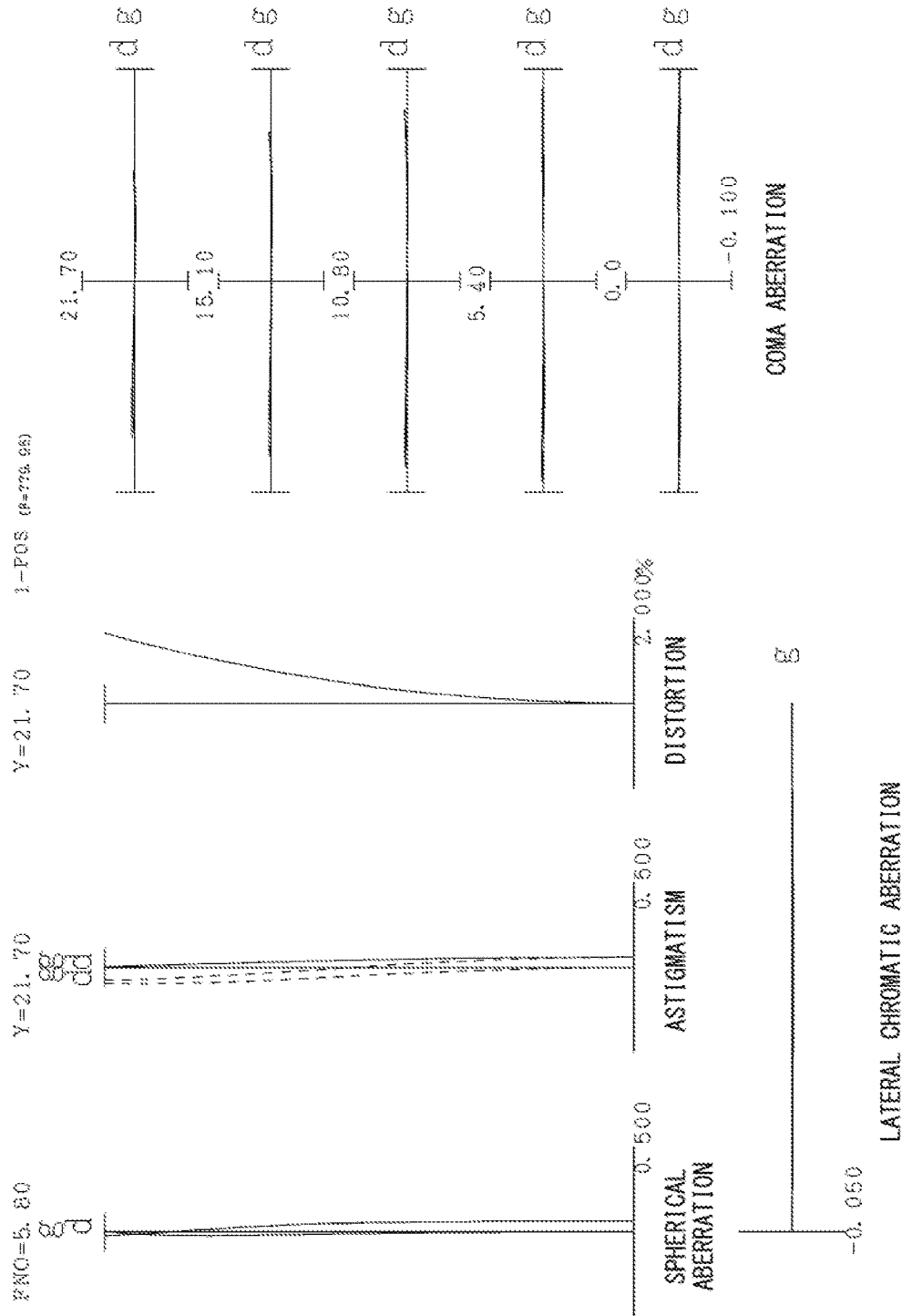
FIG. 16 shows aberrations of the optical system of the eighth example focusing on an object at infinity.

FIG. 16 shows aberrations of the optical system of the eighth example focusing on an object at infinity.

The graphs of aberrations suggest that the optical system of the present example effectively reduces variations in aberrations at focusing and has high optical performance.

Ninth Example

Figure 17A:
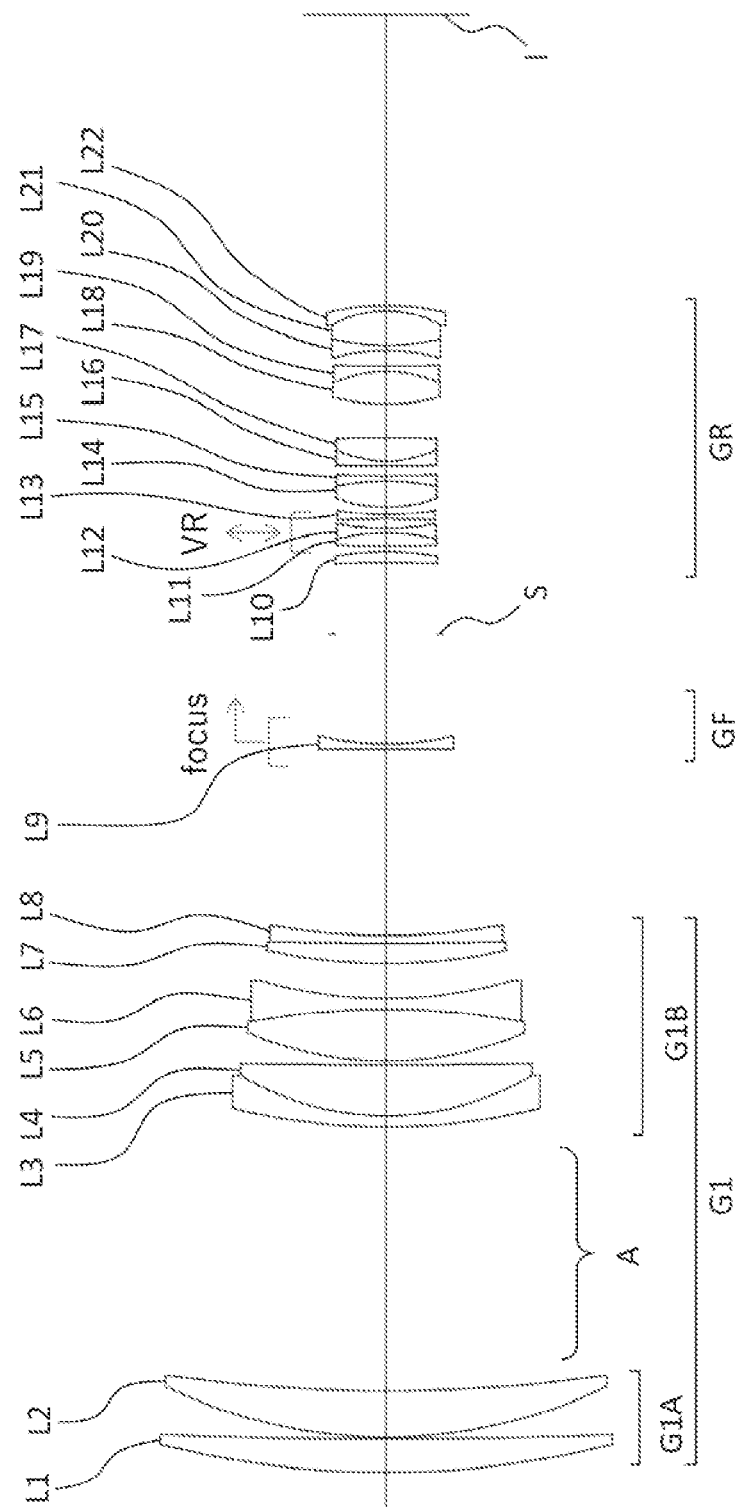
FIG. 17A is a cross-sectional view of an optical system of a ninth example focusing on an object at infinity.
Figure 17B:
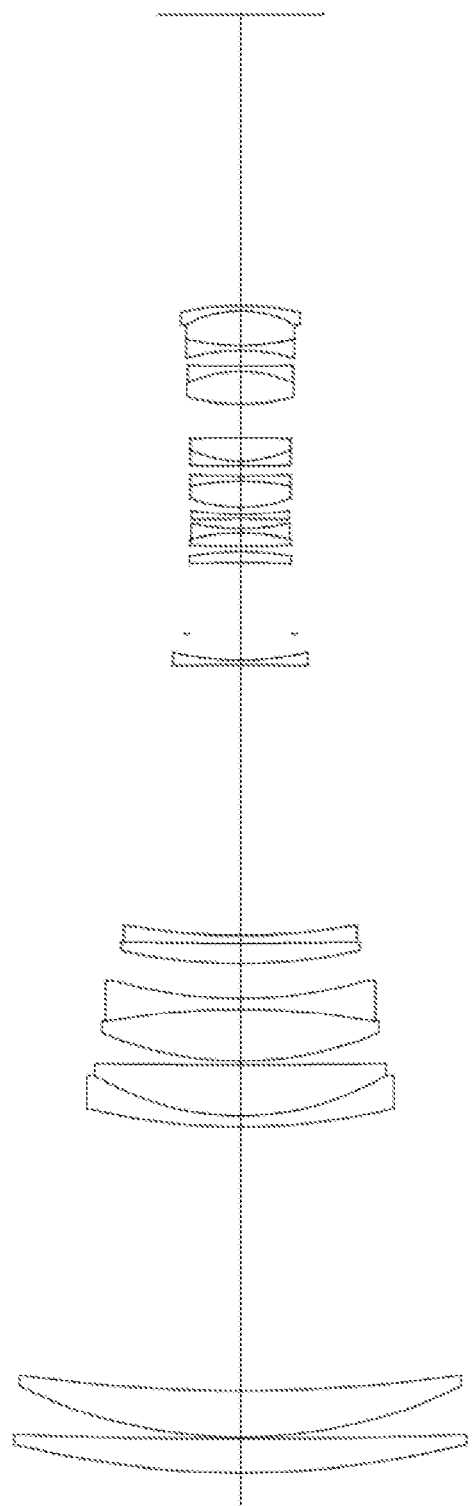
FIG. 17B is a cross-sectional view of the optical system of the ninth example focusing on a nearby object.

FIG. 17A is a cross-sectional view of an optical system of a ninth example focusing on an object at infinity. FIG. 17B is a cross-sectional view of the optical system of the ninth example focusing on a nearby object.

The optical system of the present example includes a first lens group G1 having positive refractive power, a focusing group GF having negative refractive power, and a rear group GR having negative refractive power, in order from the object side. An aperture stop S is disposed between the focusing group GF and the rear group GR. The first lens group G1 includes a first-A lens group G1A having positive refractive power and a first-B lens group G1B having negative refractive power, separated by the largest air space A in the first lens group; the first-A lens group G1A is disposed on the object side of the air space A and the first-B lens group G1B is disposed on the image side of the air space A.

The first-A lens group G1A includes a positive meniscus lens L1 convex on the object side, and a positive meniscus lens L2 convex on the object side, in order from the object side.

The first-B lens group G1B includes a negative cemented lens composed of a negative meniscus lens L3 convex on the object side and a positive meniscus lens L4 convex on the object side; a positive cemented lens composed of a biconvex positive lens L5 and a biconcave negative lens L6; and a negative cemented lens composed of a positive meniscus lens L7 convex on the object side and a negative meniscus lens L8 convex on the object side, in order from the object side.

The focusing group GF includes a biconcave negative lens L9.

The rear group GR includes a positive meniscus lens L10 convex on the image side; a negative cemented lens composed of a biconvex positive lens L11 and a biconcave negative lens L12; a biconcave negative lens L13; a positive cemented lens composed of a biconvex positive lens L14 and a biconcave negative lens L15; a negative cemented lens composed of a negative meniscus lens L16 convex on the object side and a biconvex positive lens L17; a positive cemented lens composed of a biconvex positive lens L18 and a biconcave negative lens L19; and a negative cemented lens composed of a biconcave negative lens L20, a biconvex positive lens L21, and a negative meniscus lens L22 convex on the image side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive lens L11 and the negative lens L12 and the negative lens L13, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens, and the positive meniscus lens L2 corresponds to the second lens. In the optical system of the present example, the negative meniscus lens L3 corresponds to the negative lens N, and the positive meniscus lens L7 corresponds to the positive lens Z.

In the optical system of the present example, dA is the distance on the optical axis between the image-side surface of the positive meniscus lens L2 and the object-side surface of the negative meniscus lens L3. dG1 is the distance on the optical axis between the object-side surface of the positive meniscus lens L1 and the image-side surface of the negative meniscus lens L8. dB is the distance on the optical axis between the object-side surface of the positive meniscus lens L1 and the object-side surface of the negative meniscus lens L3. dN is the distance on the optical axis between the object-side surface of the positive meniscus lens L1 and the object-side surface of the negative meniscus lens L3.

Table 9 below shows specifications of the optical system of the present example.

TABLE 9

[General specifications]

| | |
|---|---|
| f | 779.97 |
| Fno | 6.40 |
| Bf | 79.800 |
| image height | 21.700 |
| TL | 399.450 |
| 2ω | 3.15 |

[Lens specifications]

| m | r | d | nd | vd |
|---|---|---|---|---|
| 1) | 255.258 | 9.091 | 1.537750 | 74.70 |
| 2) | 1685.759 | 0.500 | | |
| 3) | 138.346 | 12.666 | 1.433837 | 95.16 |
| 4) | 418.938 | 72.302 | | |
| 5) | 177.080 | 3.000 | 1.883000 | 40.66 |
| 6) | 76.888 | 13.971 | 1.437001 | 95.10 |
| 7) | 2084.544 | 1.000 | | |
| 8) | 95.651 | 14.302 | 1.437001 | 95.10 |
| 9) | −201.556 | 2.800 | 1.487490 | 70.32 |
| 10) | 121.665 | 9.654 | | |
| 11) | 151.928 | 5.707 | 1.663820 | 27.35 |
| 12) | 1406.765 | 2.100 | 1.902650 | 35.72 |
| 13) | 183.823 | D13 | | |
| 14) | −1678.708 | 1.300 | 1.487490 | 70.32 |
| 15) | 76.764 | D15 | | |
| 16> | ∞ | 19.548 | (aperture stop) | |
| 17) | −279.837 | 3.000 | 1.487490 | 70.32 |
| 18) | −80.022 | 1.500 | | |
| 19) | 412.066 | 3.500 | 1.612660 | 44.46 |
| 20) | −55.502 | 1.200 | 1.593190 | 67.90 |
| 21) | 63.474 | 2.700 | | |
| 22) | −284.371 | 1.200 | 1.593490 | 67.00 |
| 23) | 84.284 | 2.000 | | |
| 24) | 38.563 | 7.200 | 1.581440 | 40.98 |
| 25) | −69.150 | 1.400 | 1.593190 | 67.90 |
| 26) | 285.565 | 2.553 | | |
| 27) | 348.792 | 1.400 | 1.922860 | 20.88 |
| 28) | 31.874 | 6.500 | 1.620040 | 36.40 |
| 29) | −610.498 | 9.220 | | |
| 30) | 59.656 | 9.000 | 1.620040 | 36.40 |
| 31) | −34.040 | 1.400 | 1.593190 | 67.90 |
| 32) | 549.515 | 4.295 | | |
| 33) | −54.352 | 1.400 | 1.883000 | 40.66 |
| 34) | 60.916 | 9.500 | 1.737999 | 32.33 |
| 35) | −29.296 | 1.400 | 1.883000 | 40.66 |
| 36) | −73.592 | Bf | | |

[Focal length data of groups]

| Groups | Starting surfaces | Focal lengths |
|---|---|---|
| G1 | 1 | 266.946 |
| G1A | 1 | 255.843 |
| G1B | 5 | −1307.740 |
| GF | 14 | −150.545 |
| GR | 17 | −208.953 |

[Variable distance data]

| | At focusing on infinity | At focusing on a nearby object |
|---|---|---|
| D13 | 51.181 | 73.947 |
| D15 | 30.161 | 7.394 |

FIG. 18 shows aberrations of the optical system of the ninth example focusing on an object at infinity.

The graphs of aberrations suggest that the optical system of the present example effectively reduces variations in aberrations at focusing and has high optical performance.

Tenth Example

Figure 19A:
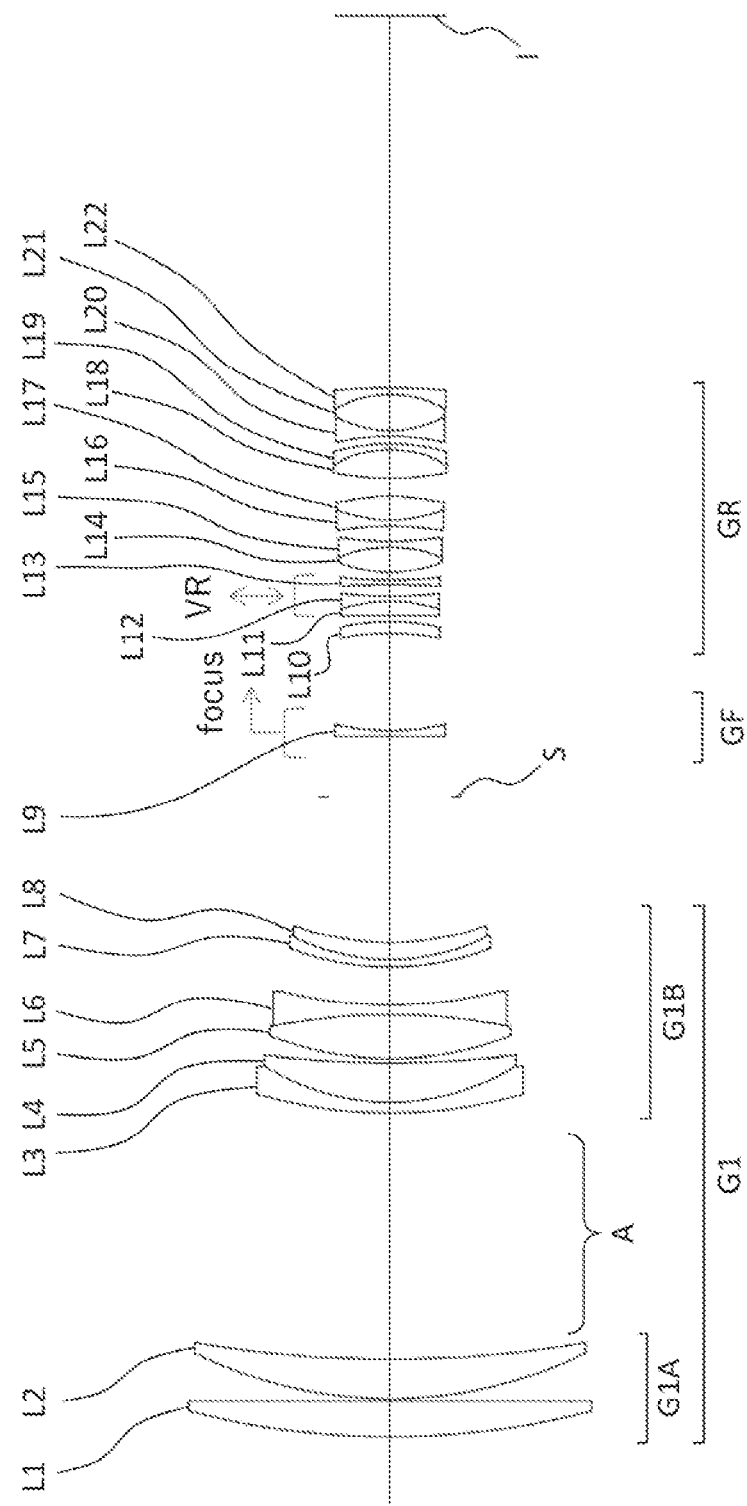
FIG. 19A is a cross-sectional view of an optical system of a tenth example focusing on an object at infinity.
Figure 19B:
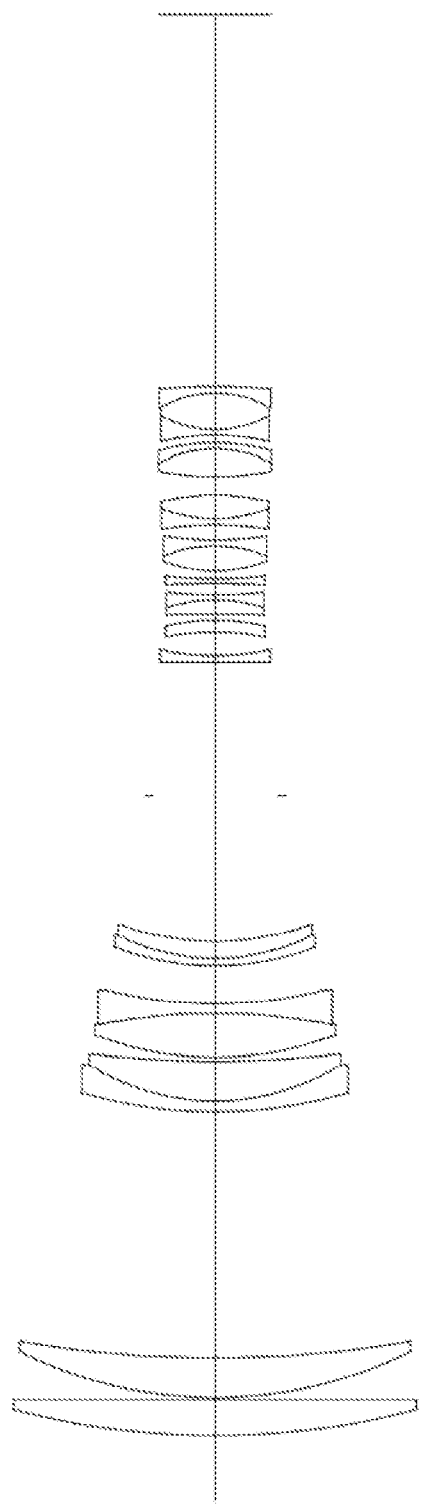
FIG. 19B is a cross-sectional view of the optical system of the tenth example focusing on a nearby object.

FIG. 19A is a cross-sectional view of an optical system of a tenth example focusing on an object at infinity. FIG. 19B is a cross-sectional view of the optical system of the tenth example focusing on a nearby object.

The optical system of the present example includes a first lens group G1 having positive refractive power, a focusing group GF having negative refractive power, and a rear group GR having negative refractive power, in order from the object side. An aperture stop S is disposed between the first lens group G1 and the focusing group GF. The first lens group G1 includes a first-A lens group G1A having positive refractive power and a first-B lens group G1B having negative refractive power, separated by the largest air space A in the first lens group; the first-A lens group G1A is disposed on the object side of the air space A and the first-B lens group G1B is disposed on the image side of the air space A.

The first-A lens group G1A includes a biconvex positive lens L1 and a positive meniscus lens L2 convex on the object side, in order from the object side.

The first-B lens group G1B includes a negative cemented lens composed of a negative meniscus lens L3 convex on the object side and a positive meniscus lens L4 convex on the object side; a positive cemented lens composed of a biconvex positive lens L5 and a biconcave negative lens L6; and a negative cemented lens composed of a negative meniscus lens L7 convex on the object side and a positive meniscus lens L8 convex on the object side, in order from the object side.

The focusing group GF includes a biconcave negative lens L9.

The rear group GR includes a positive meniscus lens L10 convex on the image side; a negative cemented lens composed of a positive meniscus lens L11 convex on the image side and a biconcave negative lens L12; a biconcave negative lens L13; a positive cemented lens composed of a biconvex positive lens L14 and a biconcave negative lens L15; a negative cemented lens composed of a biconcave negative lens L16 and a biconvex positive lens L17; a positive cemented lens composed of a biconvex positive lens L18 and a negative meniscus lens L19 convex on the image side; and a negative cemented lens composed of a biconcave negative lens L20, a biconvex positive lens L21, and a negative meniscus lens L22 convex on the image side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive meniscus lens L11 and the negative lens L12 and the negative lens L13, which are lenses included in the rear group GR, are configured as a vibration reduction lens group movable so that movement has a component in a direction perpendicular to the optical axis to correct an image blur.

In the optical system of the present example, the positive lens L1 corresponds to the first lens, and the positive meniscus lens L2 corresponds to the second lens. In the optical system of the present example, the negative meniscus lens L3 corresponds to the negative lens N, and the positive meniscus lens L8 corresponds to the positive lens Z.

In the optical system of the present example, dA is the distance on the optical axis between the image-side surface of the positive meniscus lens L2 and the object-side surface of the negative meniscus lens L3. dG1 is the distance on the optical axis between the object-side surface of the positive lens L1 and the image-side surface of the positive meniscus lens L8. dB is the distance on the optical axis between the object-side surface of the positive lens L1 and the object-side surface of the negative meniscus lens L3. dN is the distance on the optical axis between the object-side surface of the positive lens L1 and the object-side surface of the negative meniscus lens L3.

Table 10 below shows specifications of the optical system of the present example.

TABLE 10

| [General specifications] | |
|---|---|
| f | 780.00 |
| Fno | 8.00 |
| Bf | 92.159 |
| image height | 21.700 |
| TL | 351.452 |
| 2ω | 3.13 |

| [Lens specifications] | | | | |
|---|---|---|---|---|
| m | r | d | nd | νd |
| 1) | 195.329 | 8.988 | 1.433837 | 95.16 |
| 2) | −26364.519 | 0.500 | | |
| 3) | 109.812 | 9.691 | 1.433837 | 95.16 |
| 4) | 284.676 | 60.820 | | |
| 5) | 114.988 | 2.700 | 1.883000 | 40.66 |
| 6) | 58.226 | 9.887 | 1.437001 | 95.10 |
| 7) | 257.690 | 1.000 | | |
| 8) | 82.822 | 10.837 | 1.437001 | 95.10 |
| 9) | −150.828 | 2.500 | 1.487490 | 70.32 |
| 10) | 114.026 | 9.268 | | |
| 11) | 69.040 | 1.800 | 1.883000 | 40.66 |
| 12) | 52.239 | 4.278 | 1.663820 | 27.35 |
| 13) | 68.880 | 36.122 | | |
| 14> | ∞ | D14 | (aperture stop) | |
| 15) | −6404.001 | 1.400 | 1.487490 | 70.32 |
| 16) | 60.905 | D16 | | |
| 17) | −62.158 | 3.000 | 1.487490 | 70.32 |
| 18) | −50.943 | 1.500 | | |
| 19) | −348.240 | 3.500 | 1.612660 | 44.46 |
| 20) | −40.905 | 1.200 | 1.593190 | 67.90 |
| 21) | 107.146 | 2.700 | | |
| 22) | −282.696 | 1.200 | 1.593490 | 67.00 |
| 23) | 118.438 | 2.000 | | |
| 24) | 34.139 | 6.300 | 1.581440 | 40.98 |
| 25) | −31.938 | 1.400 | 1.593190 | 67.90 |
| 26) | 86.990 | 3.741 | | |
| 27) | −81.495 | 1.400 | 1.922860 | 20.88 |
| 28) | 36.499 | 6.000 | 1.620040 | 36.40 |
| 29) | −51.643 | 4.422 | | |
| 30) | 70.463 | 7.000 | 1.664460 | 35.87 |
| 31) | −28.039 | 1.400 | 1.593190 | 67.90 |
| 32) | −52.198 | 2.000 | | |
| 33) | −52.381 | 1.400 | 1.883000 | 40.66 |
| 34) | 27.748 | 9.000 | 1.737999 | 32.33 |
| 35) | −26.889 | 1.400 | 1.883000 | 40.66 |
| 36) | −195.546 | Bf | | |

| [Focal length data of groups] | | |
|---|---|---|
| Groups | Starting surfaces | Focal lengths |
| G1 | 1 | 232.062 |
| G1A | 1 | 213.189 |

TABLE 10-continued

| | | |
|---|---|---|
| G1B | 5 | −700.761 |
| GF | 15 | −123.749 |
| GR | 17 | −139.187 |

[Variable distance data]

| | At focusing on infinity | At focusing on a nearby object |
|---|---|---|
| D14 | 14.926 | 33.005 |
| D16 | 24.011 | 5.933 |

Figure 20:
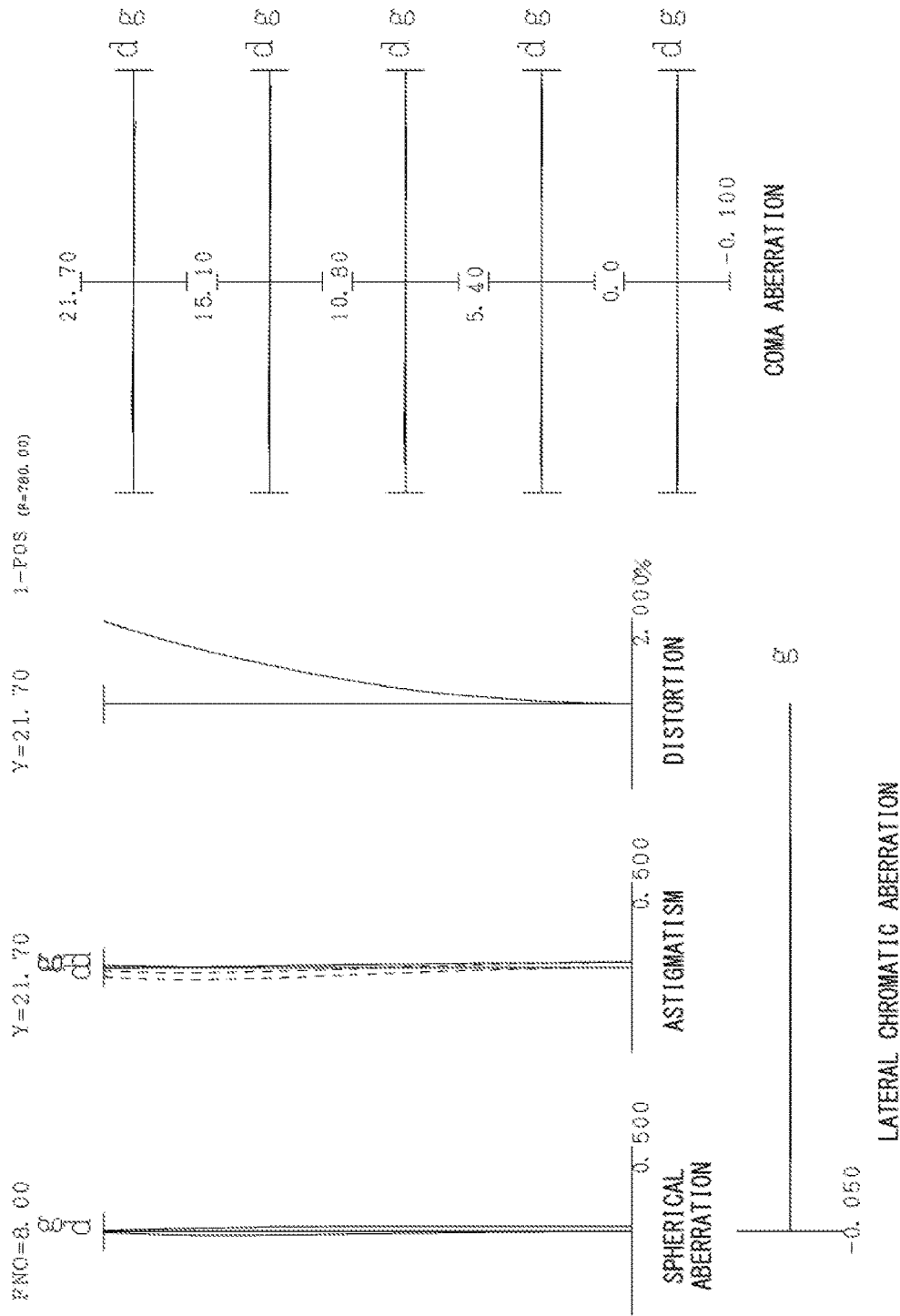
FIG. 20 shows aberrations of the optical system of the tenth example focusing on an object at infinity.

FIG. 20 shows aberrations of the optical system of the tenth example focusing on an object at infinity.

The graphs of aberrations suggest that the optical system of the present example effectively reduces variations in aberrations at focusing and has high optical performance.

Eleventh Example

Figure 21A:
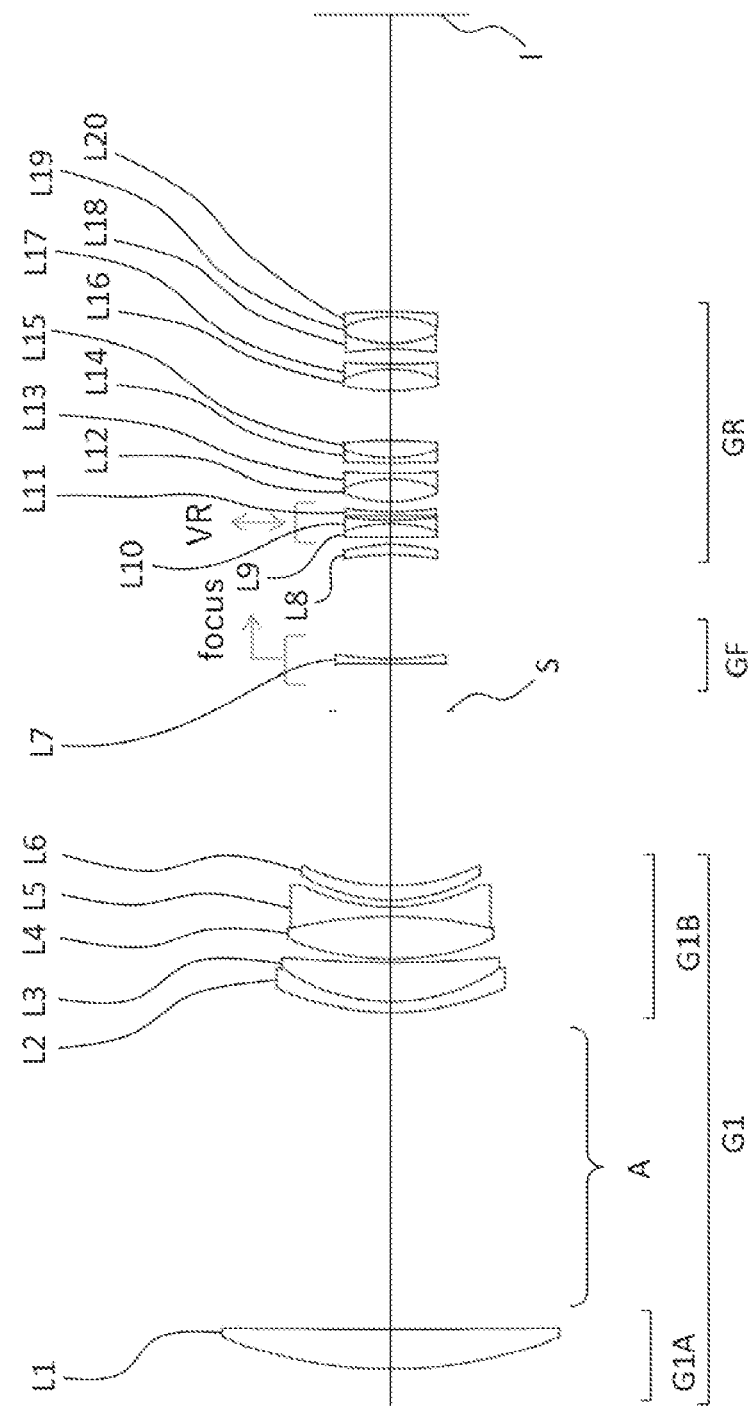
FIG. 21A is a cross-sectional view of an optical system of an eleventh example focusing on an object at infinity.
Figure 21B:
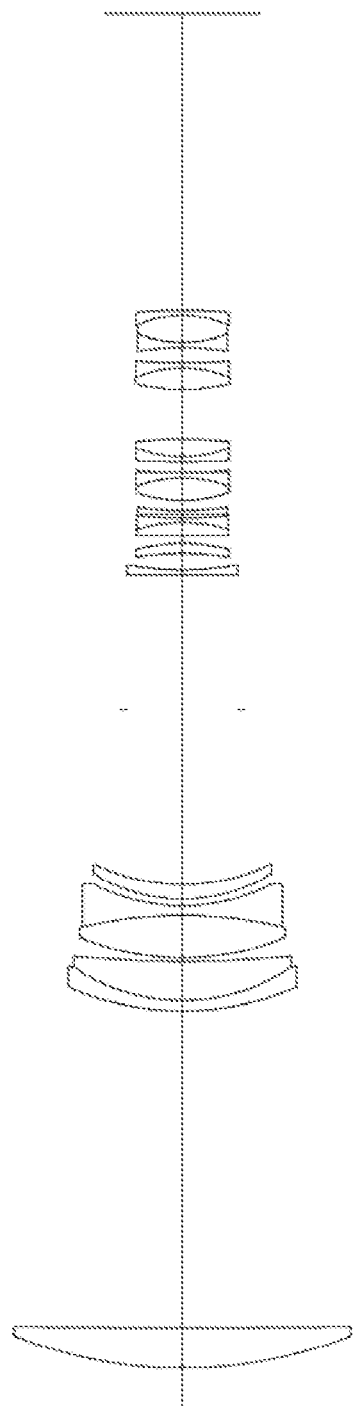
FIG. 21B is a cross-sectional view of the optical system of the eleventh example focusing on a nearby object.

FIG. 21A is a cross-sectional view of an optical system of an eleventh example focusing on an object at infinity. FIG. 21B is a cross-sectional view of the optical system of the eleventh example focusing on a nearby object.

The optical system of the present example includes a first lens group G1 having positive refractive power, a focusing group GF having negative refractive power, and a rear group GR having negative refractive power, in order from the object side.

An aperture stop S is disposed between the first lens group G1 and the focusing group GF. The first lens group G1 includes a first-A lens group G1A having positive refractive power and a first-B lens group G1B having positive refractive power, separated by the largest air space A in the first lens group; the first-A lens group G1A is disposed on the object side of the air space A and the first-B lens group G1B is disposed on the image side of the air space A.

The first-A lens group G1A includes a positive meniscus lens L1 convex on the object side.

The first-B lens group G1B includes a positive cemented lens composed of a negative meniscus lens L2 convex on the object side and a positive meniscus lens L3 convex on the object side; a negative cemented lens composed of a biconvex positive lens L4 and a biconcave negative lens L5; and a positive meniscus lens L6 convex on the object side, in order from the object side.

The focusing group GF includes a biconcave negative lens L7.

The rear group GR includes a positive meniscus lens L8 convex on the image side; a negative cemented lens composed of a positive meniscus lens L9 convex on the image side and a biconcave negative lens L10; a planoconcave negative lens L11 concave on the image side; a positive cemented lens composed of a biconvex positive lens L12 and a biconcave negative lens L13; a negative cemented lens composed of a negative meniscus lens L14 convex on the object side and a biconvex positive lens L15; a positive cemented lens composed of a biconvex positive lens L16 and a biconcave negative lens L17; and a negative cemented lens composed of a biconcave negative lens L18, a biconvex positive lens L19, and a negative meniscus lens L20 convex on the image side, in order from the object side.

An imaging device (not shown) constructed from CCD, CMOS or the like is disposed on an image plane I.

The optical system of the present example focuses by moving the focusing group GF along the optical axis. When the focus is shifted from infinity to a nearby object, the focusing group GF moves from the object side toward the image side.

In the optical system of the present example, the negative cemented lens composed of the positive meniscus lens L9 and the negative lens L10 and the negative lens L11, which are lenses included in the rear group GR, are configured as a vibration reduction lens group movable so that movement has a component in a direction perpendicular to the optical axis to correct an image blur.

In the optical system of the present example, the positive meniscus lens L1 corresponds to the first lens. In the optical system of the present example, the negative meniscus lens L2 corresponds to the negative lens N, and the positive meniscus lens L6 corresponds to the positive lens Z.

In the optical system of the present example, dA is the distance on the optical axis between the image-side surface of the positive meniscus lens L1 and the object-side surface of the negative meniscus lens L2. dG1 is the distance on the optical axis between the object-side surface of the positive meniscus lens L1 and the image-side surface of the positive meniscus lens L6. dB is the distance on the optical axis between the object-side surface of the positive meniscus lens L1 and the object-side surface of the negative meniscus lens L2. dN is the distance on the optical axis between the object-side surface of the positive meniscus lens L1 and the object-side surface of the negative meniscus lens L2.

Table 11 below shows specifications of the optical system of the present example.

TABLE 11

[General specifications]

| | |
|---|---|
| f | 779.95 |
| Fno | 8.00 |
| Bf | 87.483 |
| image height | 21.700 |
| TL | 399.482 |
| 2ω | 3.14 |

[Lens specifications]

| m | r | d | nd | νd |
|---|---|---|---|---|
| 1) | 136.085 | 11.698 | 1.433837 | 95.16 |
| 2) | 2886.820 | 93.585 | | |
| 3) | 84.536 | 3.000 | 1.900430 | 37.37 |
| 4) | 57.130 | 11.614 | 1.437001 | 95.10 |
| 5) | 342.893 | 1.000 | | |
| 6) | 77.480 | 12.561 | 1.496997 | 81.61 |
| 7) | −125.841 | 2.800 | 1.589130 | 61.22 |
| 8) | 56.630 | 2.000 | | |
| 9) | 49.759 | 4.345 | 1.663820 | 27.35 |
| 10) | 60.512 | 51.451 | | |
| 11> | ∞ | D11 | (aperture stop) | |
| 12) | −1013.842 | 1.400 | 1.487490 | 70.32 |
| 13) | 88.130 | D13 | | |
| 14) | −77.126 | 3.000 | 1.487490 | 70.32 |
| 15) | −53.565 | 2.000 | | |
| 16) | −3867.417 | 4.000 | 1.617720 | 49.81 |
| 17) | −42.148 | 1.200 | 1.593190 | 67.90 |
| 18) | 116.314 | 1.200 | | |
| 19) | ∞ | 1.200 | 1.593490 | 67.00 |
| 20) | 81.561 | 3.000 | | |
| 21) | 40.019 | 6.700 | 1.531720 | 48.78 |
| 22) | −37.697 | 1.500 | 1.593190 | 67.90 |
| 23) | 238.406 | 3.118 | | |
| 24) | 345.221 | 1.500 | 1.922860 | 20.88 |
| 25) | 38.137 | 5.300 | 1.603420 | 38.03 |
| 26) | −123.170 | 14.480 | | |
| 27) | 62.684 | 6.500 | 1.620040 | 36.40 |
| 28) | −35.175 | 1.500 | 1.593190 | 67.90 |
| 29) | 189.726 | 4.455 | | |

TABLE 11-continued

| 30) | −79.833 | 1.500 | 1.883000 | 40.66 |
| 31) | 36.649 | 8.000 | 1.737999 | 32.33 |
| 32) | −30.820 | 1.500 | 1.883000 | 40.66 |
| 33) | −167.720 | Bf | | |

[Focal length data of groups]

| Groups | Starting surfaces | Focal lengths |
|---|---|---|
| G1 | 1 | 277.319 |
| G1A | 1 | 328.772 |
| G1B | 3 | 7228.305 |
| GF | 12 | −166.256 |
| GR | 14 | −168.016 |

[Variable distance data]

| | At focusing on infinity | At focusing on a nearby object |
|---|---|---|
| D11 | 13.975 | 40.029 |
| D13 | 30.918 | 4.865 |

FIG. 22 shows aberrations of the optical system of the eleventh example focusing on an object at infinity.

The graphs of aberrations suggest that the optical system of the present example effectively reduces variations in aberrations at focusing and has high optical performance.

According to the above examples, a small and lightweight optical system of favorable imaging performance can be achieved.

The following is a list of the conditional expressions and the values for the conditional expressions in the examples.

FNo, TL, and f are the f-number, the total optical length, and the focal length of the optical system focusing on infinity, respectively. dA is the length on the optical axis of the air space A, and dG1 is the length on the optical axis of the first lens group. dN is the distance on the optical axis from a surface closest to the object side in the optical system to an object-side surface of the negative lens N. f1A is the focal length of the first-A lens group, and f1B is the focal length of the first-B lens group. dB is the distance on the optical axis from a surface closest to the object side in the optical system to a surface closest to the object side in the first-B lens group. fL1 is the focal length of a first lens disposed closest to the object side, and fL2 is the focal length of a second lens disposed second from the object side. vd1Amax is the highest of the Abbe numbers for d-line of lenses included in the first-A lens group, and vdLZ is the Abbe number for d-line of the positive lens Z. vd1Aave is an average of the Abbe numbers for d-line of lenses included in the first-A lens group.

ndLZ is the refractive index for d-line of the positive lens Z, and θgFLZ is a partial dispersion ratio of the positive lens Z and is defined by the following equation:

$$\theta gFLZ = (ngLZ - nFLZ)/(nFLZ - nCLZ)$$

where the refractive indices for g-line, F-line, and C-line of the positive lens Z are denoted by ngLZ, nFLZ, and nCLZ, respectively.

L1R1 is the radius of curvature of an object-side surface of a first lens disposed closest to the object side, and L1R2 is the radius of curvature of an image-side surface of the first lens. L2R1 is the radius of curvature of an object-side surface of a second lens disposed second from the object side, and L2R2 is the radius of curvature of an image-side surface of the second lens. f1 is the focal length of the first lens group. fF is the focal length of the focusing group. fR is the focal length of the rear group. dF is the distance on the optical axis from a surface closest to the object side in the optical system to a surface closest to the object side in the focusing group. vdFave is an average of the Abbe numbers for d-line of lenses included in the focusing group. 2ω is the total angle of view of the optical system. BF is the back focus of the optical system.

LIST OF CONDITIONAL EXPRESSIONS (1) $Fno*(TL/f)^2$
(2) dA/dG1
(3) TL/f
(4) dN/TL
(5) f1A/f1B
(6) f1A/f
(7) dB/dG1
(8) fL1/fL2
(9) vd1Amax−vdLZ
(10) vd1Aave
(11) ndLZ+(0.01425*vdLZ)
(12) vdLZ
(13) θgFLZ+(0.00316*vdLZ)
(14) (L1R2+L1R1)/(L1R2−L1R1)
(15) (L2R2+L2R1)/(L2R2−L2R1)
(16) f1/f
(17) (−fF)/f1
(18) (−fF)/fR
(19) dF/TL
(20) vdFave
(21) 2ω
(22) Bf/f

VALUES FOR CONDITIONAL EXPRESSIONS

Example 1 Example 2 Example 3 Example 4
Example 5 Example 6

| | Example 1 | Example 2 | Example 3 | Example 4 |
|---|---|---|---|---|
| (1) | 1.742 | 1.928 | 1.792 | 1.860 |
| | 1.877 | 1.597 | | |
| (2) | 0.384 | 0.467 | 0.456 | 0.444 |
| | 0.358 | 0.479 | | |
| (3) | 0.652 | 0.686 | 0.624 | 0.568 |
| | 0.570 | 0.525 | | |
| (4) | 0.281 | 0.311 | 0.308 | 0.257 |
| | 0.276 | 0.295 | | |
| (5) | −0.374 | −0.090 | −0.055 | −0.493 |
| | −0.353 | −0.360 | | |
| (6) | 0.353 | 0.415 | 0.379 | 0.287 |
| | 0.295 | 0.309 | | |
| (7) | 0.617 | 0.642 | 0.626 | 0.640 |
| | 0.561 | 0.646 | | |
| (8) | 1.429 | 1.603 | 1.953 | 1.415 |
| | 2.670 | 1.785 | | |
| (9) | 67.75 | 67.81 | 67.75 | 67.75 |
| | 67.81 | 67.81 | | |
| (10) | 84.90 | 84.93 | 84.90 | 88.36 |
| | 82.53 | 84.93 | | |
| (11) | 2.054 | 2.054 | 2.054 | 2.054 |
| | 2.054 | 2.054 | | |
| (12) | 27.35 | 27.35 | 27.35 | 27.35 |
| | 27.35 | 27.35 | | |
| (13) | 0.120 | 0.120 | 0.120 | 0.120 |
| | 0.120 | 0.120 | | |
| (14) | 1.145 | 1.417 | 1.111 | 1.065 |
| | 0.817 | 1.565 | | |
| (15) | 1.590 | 1.533 | 1.415 | 1.732 |
| | 1.328 | 1.680 | | |
| (16) | 0.417 | 0.432 | 0.385 | 0.362 |
| | 0.363 | 0.355 | | |

-continued

| | | | | |
|---|---|---|---|---|
| (17) | 0.654 0.630 | 0.544 0.452 | 0.599 | 0.543 |
| (18) | −0.233 −0.429 | 0.050 −0.337 | −0.203 | −0.104 |
| (19) | 0.437 0.434 | 0.481 0.499 | 0.486 | 0.429 |
| (20) | 81.61 81.61 | 81.61 81.61 | 81.61 | 81.61 |
| (21) | 8.43 | 6.30 6.30 | 6.35 | 5.05 4.20 |
| (22) | 0.122 0.108 | 0.156 0.099 | 0.142 | 0.140 |

Example 7  Example 8  Example 9  Example 10
Example 11

| | | | | |
|---|---|---|---|---|
| (1) | 1.490 2.099 | 1.402 | 1.679 | 1.624 |
| (2) | 0.501 0.656 | 0.427 | 0.492 | 0.497 |
| (3) | 0.507 0.512 | 0.492 | 0.512 | 0.451 |
| (4) | 0.328 0.264 | 0.251 | 0.237 | 0.228 |
| (5) | −0.462 0.045 | −0.373 | −0.196 | −0.304 |
| (6) | 0.303 0.422 | 0.337 | 0.328 | 0.273 |
| (7) | 0.669 0.738 | 0.594 | 0.643 | 0.654 |
| (8) | 1.650 (N/A) | 1.204 | 1.188 | 1.103 |
| (9) | 67.81 67.81 | 67.81 | 67.81 | 67.81 |
| (10) | 95.16 95.16 | 95.16 | 84.93 | 95.16 |
| (11) | 2.054 2.054 | 2.054 | 2.054 | 2.054 |
| (12) | 27.35 27.35 | 27.35 | 27.35 | 27.35 |
| (13) | 0.120 0.120 | 0.120 | 0.120 | 0.120 |
| (14) | 0.946 1.099 | 0.873 | 1.357 | 0.985 |
| (15) | 1.812 (N/A) | 2.272 | 1.986 | 2.256 |
| (16) | 0.359 0.356 | 0.348 | 0.342 | 0.298 |
| (17) | 0.421 0.600 | 0.488 | 0.564 | 0.533 |
| (18) | −0.269 −0.990 | −0.674 | −0.720 | −0.889 |
| (19) | 0.528 0.521 | 0.538 | 0.496 | 0.493 |
| (20) | 70.32 70.32 | 70.32 | 70.32 | 70.32 |
| (21) | 3.14 | 3.14 | 3.15 | 3.13 3.14 |
| (22) | 0.093 0.112 | 0.098 | 0.102 | 0.118 |

The above examples illustrate specific examples of the present invention, and the present invention is not limited thereto. The following details can be appropriately employed unless the optical performance of the optical system of the embodiment of the present application is lost.

The lens surfaces of the lenses constituting any of the optical systems of the above examples may be covered with antireflection coating having high transmittance in a wide wavelength range. This reduces flares and ghosts, and enables achieving optical performance with high contrast.

Next, a camera including the optical system of the present embodiment is described with reference to FIG. 23.

Figure 23:
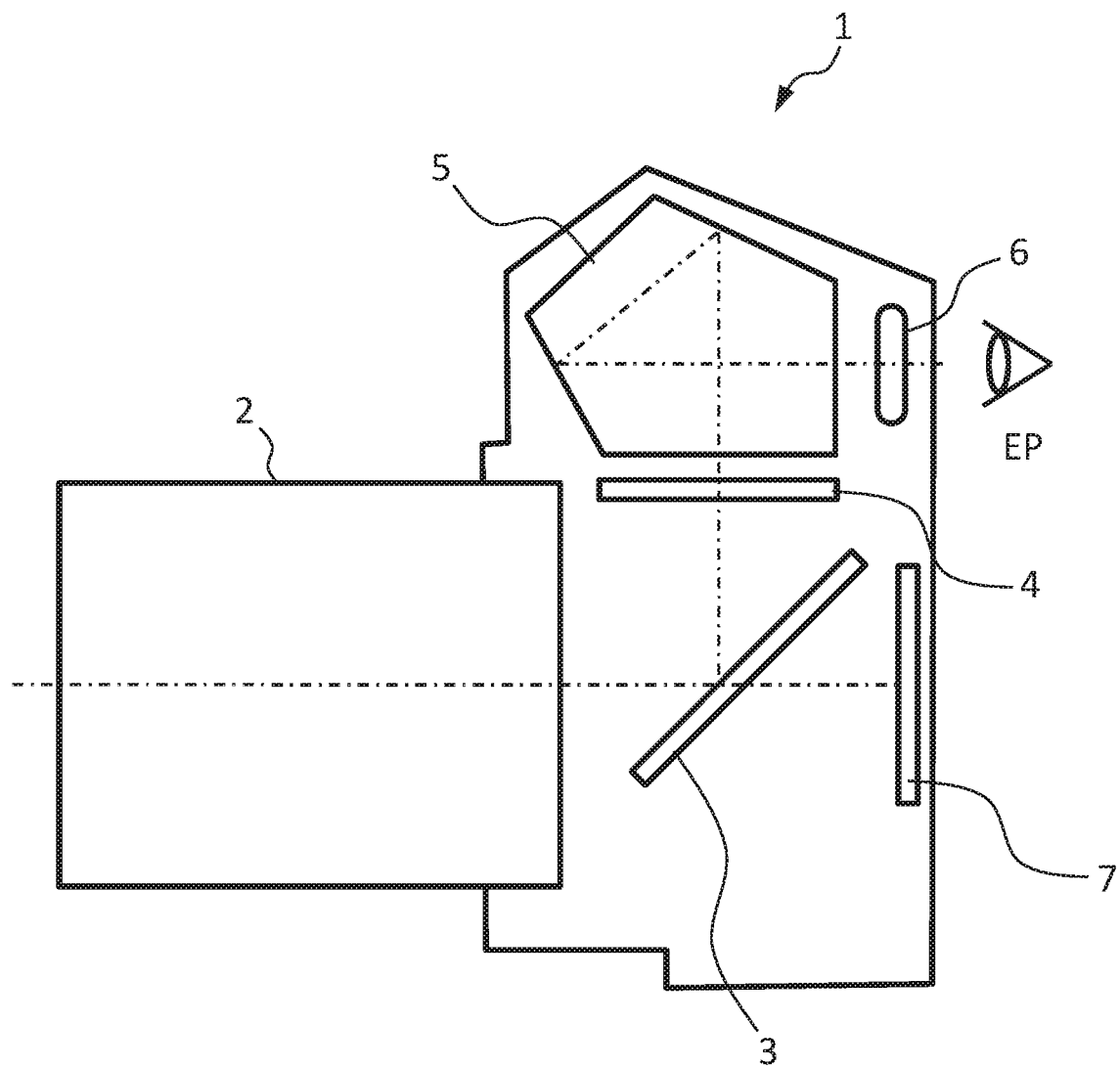
FIG. 23 schematically shows a camera including an optical system of the embodiment.

FIG. 23 schematically shows a camera including the optical system of the present embodiment.

The camera 1 is a camera of an interchangeable lens type including the optical system according to the first example as an imaging lens 2.

In the camera 1, light from an object (subject) (not shown) is condensed by the imaging lens 2, and forms an image on a focusing glass 4 via a quick-return mirror 3. The light forming an image on the focusing glass 4 is reflected multiple times in a pentaprism 5 and guided to an eyepiece 6. This enables a photographer who positions his/her eye at an eye point EP to observe an image of the subject as an erect image.

When a release button (not shown) is pressed by the photographer, the quick-return mirror 3 moves outside the optical path, causing the light from the subject (not shown) to reach an imaging device 7. Then the light from the subject is captured by the imaging device 7 and stored in a memory (not shown) as a subject image. In this way, the photographer can take a picture of the subject with the camera 1.

The optical system of the first example included in the camera 1 as the imaging lens 2 is a small and lightweight optical system of favorable imaging performance. Thus the camera 1 can be small and achieve favorable optical performance. A camera configured by including any of the optical systems of the second to eleventh examples as the imaging lens 2 can have the same effect as the camera 1.

Figure 24:
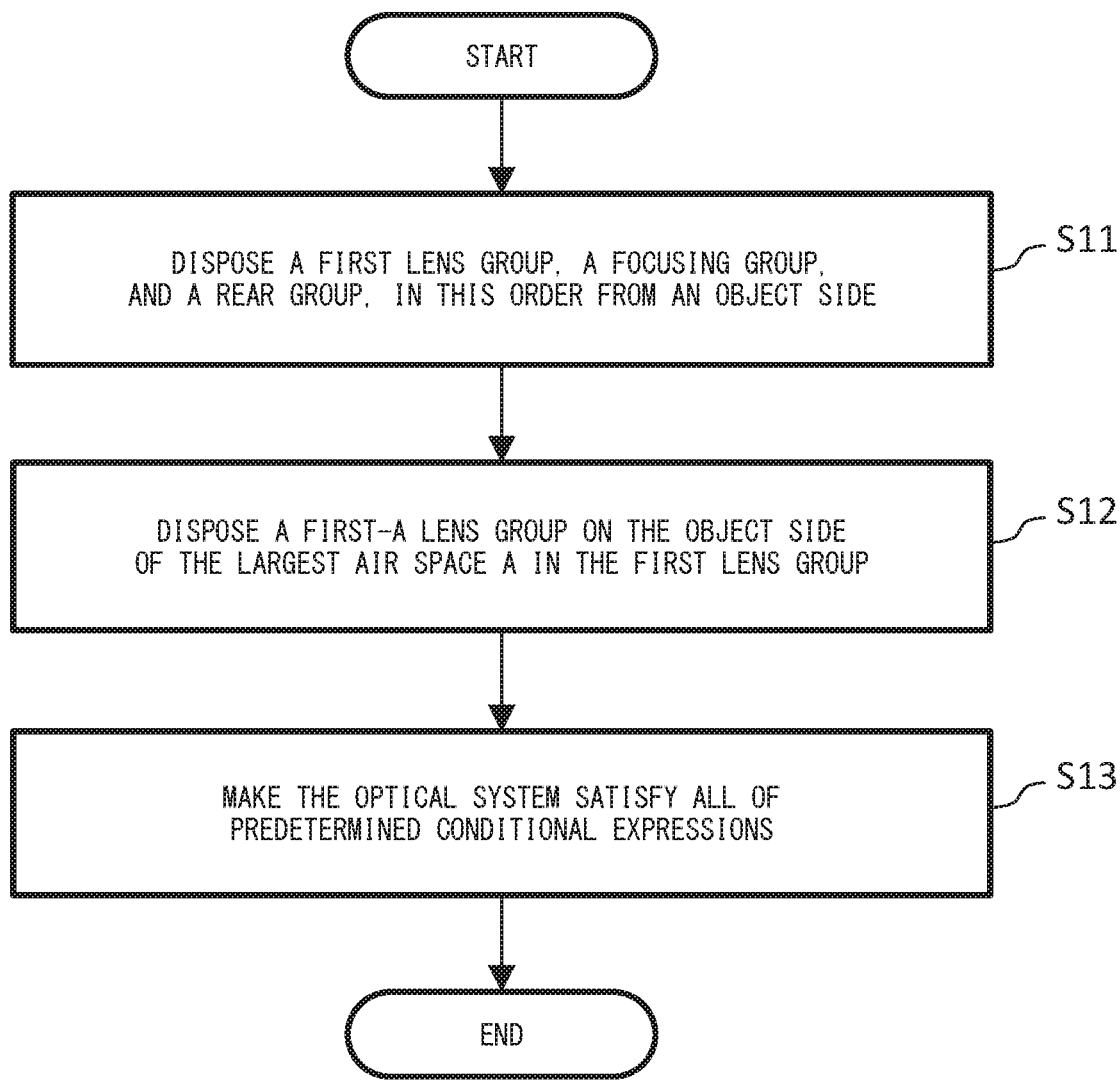
FIG. 24 is a first flowchart outlining a method for manufacturing an optical system of the embodiment.

Finally, methods for manufacturing an optical system of the present embodiment are described in outline with reference to FIGS. 24 and 25.

FIG. 24 is a first flowchart outlining a method for manufacturing an optical system of the present embodiment.

The method for manufacturing an optical system of the present embodiment shown in FIG. 24 is a method for manufacturing an optical system including a plurality of lenses and includes the following steps S11, S12, and S13:

Step S11: disposing a first lens group having positive refractive power, a focusing group that moves along an optical axis at focusing, and a rear group, in order from an object side;

Step S12: disposing a first-A lens group on the object side of the largest air space A in the first lens group; and Step S13: making the optical system satisfy all of predetermined conditional expressions:

$$1.00 < FNo \times (TL/f)^2 < 2.50 \qquad (1)$$

$$0.30 < dA/dG1 < 0.85 \qquad (2)$$

where

FNo is the f-number of the optical system focusing on infinity,

TL is the total optical length of the optical system focusing on infinity, f is the focal length of the optical system focusing on infinity, dA is the length on the optical axis of the air space A, and dG1 is the length on the optical axis of the first lens group.

A small and lightweight optical system of favorable imaging performance can be manufactured by the method for manufacturing an optical system of the present embodiment.

FIG. 25 is a second flowchart outlining a method for manufacturing an optical system of the present embodiment.

The method for manufacturing an optical system of the present embodiment shown in FIG. 25 is a method for manufacturing an optical system including a plurality of lenses and includes the following steps S21, S22, and S23:

Step S21: preparing a plurality of lenses;
Step S22: disposing at least one positive lens component and a negative lens N, in order from an object side; and
Step S23: making the optical system satisfy all of predetermined conditional expressions:

$$1.00 < FNo \times (TL/f)^2 < 2.50 \quad (1)$$

$$0.18 < dN/TL < 0.45 \quad (4)$$

where
FNo is the f-number of the optical system focusing on infinity,
TL is the total optical length of the optical system focusing on infinity,
f is the focal length of the optical system focusing on infinity, and
dN is the distance on an optical axis from a surface closest to the object side in the optical system to an object-side surface of the negative lens N.

A small and lightweight optical system of favorable imaging performance can be manufactured by the method for manufacturing an optical system of the present embodiment.

Note that those skilled in the art can make various changes, substitutions, and modifications without departing from the spirit and scope of the present invention.

REFERENCE SIGNS LIST

S aperture stop
I image plane
1 camera
2 imaging lens
7 imaging device

The invention claimed is:
1. An optical system comprising:
a first lens group having positive refractive power, a focusing group that moves along an optical axis at focusing, and a rear group, in order from an object side, wherein
the first lens group includes a first-A lens group disposed on the object side of the largest air space A in the first lens group, and
all of the following conditional expressions are satisfied:

$$1.00 < FNo \times (TL/f)^2 < 2.50$$

$$0.30 < dA/dG1 < 0.85$$

$$0.20 < (L1R2+L1R1)/(L1R2-L1R1) < 3.00$$

where
FNo is the f-number of the optical system focusing on infinity,
TL is the total optical length of the optical system focusing on infinity,
f is the focal length of the optical system focusing on infinity,
dA is the length on the optical axis of the air space A,
dG1 is the length on the optical axis of the first lens group,
L1R1 is the radius of curvature of an object-side surface of a first lens disposed closet to the object side in the first-A lens group, and
L1R2 is the radius of curvature of an image-side surface of the first lens.
2. The optical system according to claim 1, wherein
the first lens group includes a first-B lens group on an image side of the air space A, and
the following conditional expression is satisfied:

$$-2.00 < f1A/f1B < 0.30$$

where
f1A is the focal length of the first-A lens group, and
f1B is the focal length of the first-B lens group.
3. The optical system according to claim 1,
the following conditional expression is satisfied:

$$0.10 < f1A/f < 0.60$$

where
f1A is the focal length of the first-A lens group.
4. The optical system according to claim 1, wherein
the first lens group includes a first-B lens group disposed on an image side of the largest air space A in the first lens group, and
the following conditional expression is satisfied:

$$0.40 < dB/dG1 < 0.85$$

where
dB is the distance on the optical axis from a surface closest to the object side in the optical system to a surface closest to the object side in the first-B lens group, and
dG1 is the length on the optical axis of the first lens group.
5. The optical system according to claim 1, wherein
the first-A lens group includes two or fewer positive lenses.
6. The optical system according to claim 1, wherein the following conditional expression is satisfied:

$$0.80 < fL1/fL2 < 3.30$$

where
fL1 is the focal length of the first lens disposed closest to the object side in the first-A lens group, and
fL2 is the focal length of a second lens disposed second from the object side in the first-A lens group.
7. The optical system according to claim 1, wherein
the first lens group includes a first-B lens group on an image side of the air space A, and
the first-B lens group includes at least one positive lens Z satisfying the following conditional expression:

$$60.00 < vd1Amax - vdLZ$$

where
vd1Amax is the highest of the Abbe numbers for d-line of lenses included in the first-A lens group, and
vdLZ is the Abbe number for d-line of the positive lens Z.
8. The optical system according to claim 1, wherein
the following conditional expression is satisfied:

$$55.00 < vd1Aave$$

where
vd1Aave is an average of the Abbe numbers for d-line of lenses included in the first-A lens group.
9. The optical system according to claim 1, wherein
the first lens group includes a first-B lens group disposed on an image side of the largest air space A in the first lens group, and
the first-B lens group includes at least one positive lens Z satisfying all of the following conditional expressions:

$$ndLZ + (0.01425 \times vdLZ) < 2.12$$

$$vdLZ < 35.00$$

$$0.702 < \theta gFLZ + (0.00316 \times vdLZ)$$

where
- ndLZ is the refractive index for d-line of the positive lens Z,
- vdLZ is the Abbe number for d-line of the positive lens Z, and
- θgFLZ is a partial dispersion ratio of the positive lens Z and is defined by the following equation:

$$\theta gFLZ = (ngLZ - nFLZ)/(nFLZ - nCLZ)$$

where the refractive indices for g-line, F-line, and C-line of the positive lens Z are denoted by ngLZ, nFLZ, and nCLZ, respectively.

10. The optical system according to claim 1, wherein the following conditional expression is satisfied:

$$0.00 < (L2R2 + L2R1)/(L2R2 - L2R1) < 3.50$$

where
- L2R1 is the radius of curvature of an object-side surface of a second lens disposed second from the object side in the first-A lens group, and
- L2R2 is the radius of curvature of an image-side surface of the second lens.

11. The optical system according to claim 1, wherein the following conditional expression is satisfied:

$$0.10 < f1/f < 0.60$$

where
- f1 is the focal length of the first lens group.

12. The optical system according to claim 1, wherein the following conditional expression is satisfied:

$$0.20 < (-fF)/f1 < 0.85$$

where
- fF is the focal length of the focusing group, and
- f1 is the focal length of the first lens group.

13. The optical system according to claim 1, wherein the following conditional expression is satisfied:

$$-1.50 < (-fF)/fR < 0.60$$

where
- fF is the focal length of the focusing group, and
- fR is the focal length of the rear group.

14. The optical system according to claim 1, wherein the following conditional expression is satisfied:

$$0.30 < dF/TL < 0.70$$

where
- dF is the distance on the optical axis from a surface closest to the object side in the optical system to a surface closest to the object side in the focusing group.

15. The optical system according to claim 1, wherein the following conditional expression is satisfied:

$$40.00 < vdFave$$

where
- vdFave is an average of the Abbe numbers for d-line of lenses included in the focusing group.

16. The optical system according to claim 1, wherein the following conditional expression is satisfied:

$$1.00° < 2\omega < 20.00°$$

where
- 2ω is the total angle of view of the optical system.

17. The optical system according to claim 1, wherein the following conditional expression is satisfied:

$$0.075 < Bf/f < 0.185$$

where
- Bf is the back focus of the optical system.

18. The optical system according to claim 1, wherein the rear group includes a vibration reduction lens group movable so that movement has a component in a direction perpendicular to the optical axis to correct an image blur.

19. An optical apparatus comprising the optical system according to claim 1.

20. An optical system comprising a plurality of lenses including:
- at least one positive lens component and a negative lens N, in order from an object side, and
- a first lens group including a first-A lens group disposed on the object side of the largest air space A IN the first lens group,
- wherein all of the following conditional expressions are satisfied:

$$1.00 < FNo \times (TL/f)^2 < 2.50$$

$$0.18 < dN/TL < 0.45$$

$$0.20 < (L1R2 + L1R1)/(L1R2 - L1R1) < 3.00$$

where
- FNo is the f-number of the optical system focusing on infinity,
- TL is the total optical length of the optical system focusing on infinity,
- f is the focal length of the optical system focusing on infinity,
- dN is the distance on an optical axis from a surface closest to the object side in the optical system to an object-side surface of the negative lens N,
- L1R1 is the raduis of curvature of an object-side surface of a first lens disposed closet to the object side in the first-A lens group, and
- L1R2 is the radius of curvature of an image-side surface of the first lens.

21. The optical system according to claim 20, further comprising a focusing group that moves along the optical axis at focusing, and a rear group, in order from the object side, wherein
the following conditional expression is satisfied:

$$0.30 < dA/dG1 < 0.85$$

where
- dA is the length on the optical axis of the air space A, and
- dG1 is the length on the optical axis of the first lens group.

22. The optical system according to claim 21, wherein the first lens group includes the positive lens component and the negative lens N.

23. The optical system according to claim 20, wherein the first lens group is closest to the object side, and the following conditional expression is satisfied:

$$0.30 < TL/f < 0.80.$$

24. A method for manufacturing an optical system including a plurality of lenses, the method comprising one of the following features A or B,
the feature A comprising:
- disposing a first lens group having positive refractive power, a focusing group that moves along an optical axis at focusing, and a rear group, in order from an object side;
- disposing a first-A lens group on the object side of the largest air space A in the first lens group; and
- arranging so that all of the following conditional expressions are satisfied:

$1.00 < FNo \times (TL/f)^2 < 2.50$ $0.30 < dA/dG1 < 0.85$ $0.20 < (L1R2+L1R1)/(L1R2-L1R1) < 3.00$ where
- FNo is the f-number of the optical system focusing on infinity,
- TL is the total optical length of the optical system focusing on infinity,
- f is the focal length of the optical system focusing on infinity,
- dA is the length on the optical axis of the air space A,
- dG1 is the length on the optical axis of the first lens group,
- L1R1 is the raduis of curvature of an object-side surface of a first lens disposed closet to the object side in the first-A lens group, and
- L1R2 is the radius of curvature of an image-side surface of the first lens, the feature B comprising:
- disposing at least one positive lens component and a negative lens N, in order from an object side; and
- disposing a first lens group including a first-A lens group disposed on the object side of the largest air space A in the first lens group; and arranging so that all of the following conditional expressions are satisfied:

$1.00 < FNo \times (TL/f)^2 < 2.50$ $0.18 < dN/TL < 0.45$ $0.20 < (L1R2+L1R1)/(L1R2-L1R1) < 3.00$ where
- FNo is the f-number of the optical system focusing on infinity,
- TL is the total optical length of the optical system focusing on infinity,
- f is the focal length of the optical system focusing on infinity,
- dN is the distance on an optical axis from a surface closest to the object side in the optical system to an object-side surface of the negative lens N,
- L1R1 is the raduis of curvature of an object-side surface of a first lens disposed closet to the object side in the first-A lens group, and
- L1R2 is the radius of curvature of an image-side surface of the first lens.

\* \* \* \* \*